(12) United States Patent
Chen et al.

(10) Patent No.: US 12,105,353 B2
(45) Date of Patent: Oct. 1, 2024

(54) OPTICAL IMAGING LENS SYSTEM, IMAGE CAPTURING UNIT AND ELECTRONIC DEVICE

(71) Applicant: LARGAN PRECISION CO., LTD., Taichung (TW)

(72) Inventors: Hung-Shuo Chen, Taichung (TW); Shu-Yun Yang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 18/377,246

(22) Filed: Oct. 5, 2023

(65) Prior Publication Data

US 2024/0053583 A1    Feb. 15, 2024

Related U.S. Application Data

(63) Continuation of application No. 17/751,610, filed on May 23, 2022, now Pat. No. 11,822,150, which is a (Continued)

(30) Foreign Application Priority Data

Mar. 31, 2017  (TW) .................................. 106111311

(51) Int. Cl.
*G02B 9/60* (2006.01)
*G02B 3/02* (2006.01)
(Continued)

(52) U.S. Cl.
CPC ................. *G02B 9/60* (2013.01); *G02B 3/02* (2013.01); *G02B 13/18* (2013.01); *H04N 23/55* (2023.01); *G02B 13/0045* (2013.01)

(58) Field of Classification Search
CPC .... G02B 13/0045; G02B 13/18; G02B 13/04; G02B 13/32; G02B 13/0015;
(Continued)

(56) References Cited

U.S. PATENT DOCUMENTS 1,833,593 A    11/1931    Rudolph
2,596,799 A    5/1952    Tillyer et al.
(Continued)

FOREIGN PATENT DOCUMENTS

CN    101387739 A    3/2009
CN    101387740 A    3/2009
(Continued)

OTHER PUBLICATIONS

TW Office Action dated Oct. 24, 2017 as received in Application No. 106111311.

*Primary Examiner* — Stephone B Allen
*Assistant Examiner* — Tamara Y. Washington
(74) *Attorney, Agent, or Firm* — Maschoff Brennan

(57) ABSTRACT

An optical imaging lens system includes five lens elements which are, in order from an object side to an image side, a first lens element, a second lens element, a third lens element, a fourth lens element and a fifth lens element. The first lens element has positive refractive power. The second lens element has negative refractive power. The third lens element has positive refractive power. The fourth lens element has negative refractive power. The fifth lens element with negative refractive power has an object-side surface being concave in a paraxial region thereof.

26 Claims, 32 Drawing Sheets

Related U.S. Application Data continuation of application No. 16/709,772, filed on Dec. 10, 2019, now Pat. No. 11,372,203, which is a continuation of application No. 15/707,861, filed on Sep. 18, 2017, now Pat. No. 10,545,315.

(51) Int. Cl.
*G02B 13/18* (2006.01)
*H04N 23/55* (2023.01)
*G02B 13/00* (2006.01)

(58) Field of Classification Search
CPC .... G02B 13/002; G02B 13/00; G02B 13/009; G02B 13/06; G02B 13/001; G02B 13/004; G02B 13/0055; G02B 13/006; G02B 13/0085; G02B 13/16; G02B 9/60; G02B 3/04; G02B 3/02; G02B 27/0025; G02B 27/0018; G02B 27/0101; G02B 27/1026; G02B 27/021; G02B 5/005; G02B 5/208; G02B 5/1895; G02B 1/041; G02B 7/08; G02B 7/021; G02B 15/14; G02B 15/173; G02B 9/34; G02B 9/62; H04N 5/2254; H04N 5/225; H04N 5/2253; H04N 5/2257; H04N 5/2252; H04N 5/335; H04N 9/317; H01L 27/14625
USPC ........ 359/641, 648–650, 672–706, 708, 716, 359/745, 748, 749, 754, 764, 784
See application file for complete search history.

(56) References Cited

U.S. PATENT DOCUMENTS

| | | | |
|---|---|---|---|
| 2,687,063 A | 8/1954 | Coleman |
| 3,272,072 A | 9/1966 | Ziegler |
| 3,418,037 A | 12/1968 | Welham |
| 3,887,269 A | 6/1975 | Nakagawa |
| 3,998,527 A | 12/1976 | Ikeda et al. |
| 4,383,739 A | 5/1983 | Bogath |
| 4,429,958 A | 2/1984 | Yamaguchi |
| 4,488,788 A | 12/1984 | Fujioka |
| 4,523,817 A | 6/1985 | Kikuchi |
| 4,576,448 A | 3/1986 | Ikari |
| 4,721,371 A | 1/1988 | Imai |
| 4,743,094 A | 5/1988 | Mercado |
| 4,757,354 A | 7/1988 | Sato et al. |
| 4,767,201 A | 8/1988 | Fujita et al. |
| 4,768,869 A | 9/1988 | Mercado |
| 4,790,638 A | 12/1988 | Iwasaki et al. |
| 4,802,717 A | 2/1989 | Kebo |
| 4,832,465 A | 5/1989 | Arai et al. |
| 4,834,515 A | 5/1989 | Mercado |
| 4,842,384 A | 6/1989 | Mercado |
| 4,934,801 A | 6/1990 | Mercado |
| 4,946,267 A | 8/1990 | Hoogland |
| 5,134,522 A | 7/1992 | Ueda |
| 6,104,541 A | 8/2000 | Otomo |
| 7,787,196 B2 | 8/2010 | Asami et al. |
| 8,724,238 B2 | 5/2014 | Tsai et al. |
| 9,348,117 B1 | 5/2016 | Chang et al. |
| 9,417,432 B2 | 8/2016 | Yuza |
| 9,581,789 B2 | 2/2017 | Liao et al. |
| 9,864,165 B2 | 1/2018 | Liao et al. |
| 9,989,741 B1 | 6/2018 | Sueh et al. |
| 10,120,164 B2 | 11/2018 | Dai et al. |
| 10,215,956 B2 | 2/2019 | Liao et al. |
| 10,330,893 B2 | 6/2019 | Kubota et al. |
| 10,353,177 B2 | 7/2019 | Liao et al. |
| 10,591,701 B2 | 3/2020 | Hsieh et al. |
| 2008/0239515 A1 | 10/2008 | Asami |
| 2009/0067065 A1 | 3/2009 | Suzuki et al. |
| 2012/0140104 A1 | 6/2012 | Ozaki |
| 2013/0033765 A1 | 2/2013 | Tsai et al. |
| 2013/0050846 A1 | 2/2013 | Huang |
| 2013/0258500 A1 | 10/2013 | Suzuki et al. |
| 2014/0153114 A1 | 6/2014 | Suzuki |
| 2014/0204480 A1 | 7/2014 | Jo et al. |
| 2014/0313599 A1 | 10/2014 | Kondo et al. |
| 2016/0011405 A1 | 1/2016 | Shinohara et al. |
| 2016/0048006 A1 | 2/2016 | Jo et al. |
| 2016/0209628 A1 | 7/2016 | Jo et al. |
| 2016/0216480 A1 | 7/2016 | Chen et al. |
| 2016/0238821 A1 | 8/2016 | Ciao et al. |
| 2016/0241756 A1 | 8/2016 | Chen |
| 2016/0320589 A1 | 11/2016 | Liao et al. |
| 2016/0341934 A1 | 11/2016 | Mercado |
| 2017/0023768 A1 | 1/2017 | Hsieh et al. |
| 2017/0102522 A1 | 4/2017 | Jo |
| 2017/0108665 A1 | 4/2017 | Huang |
| 2017/0212336 A1 | 7/2017 | Ko |
| 2017/0269328 A1 | 9/2017 | Jhang et al. |
| 2017/0269330 A1 | 9/2017 | Jhang et al. |
| 2017/0269331 A1 | 9/2017 | Jhang et al. |
| 2017/0269332 A1 | 9/2017 | Jhang et al. |
| 2017/0269333 A1 | 9/2017 | Jhang et al. |
| 2017/0276913 A1 | 9/2017 | Yao et al. |
| 2018/0045920 A1 | 2/2018 | Kubota et al. |
| 2018/0059370 A1 | 3/2018 | Chen et al. |
| 2018/0180847 A1 | 6/2018 | Yoo |
| 2018/0188491 A1 | 7/2018 | Chang et al. |
| 2018/0188492 A1 | 7/2018 | Chang et al. |
| 2018/0284394 A1 | 10/2018 | Chen et al. |
| 2019/0121088 A1 | 4/2019 | Shi et al. |
| 2019/0243106 A1 | 8/2019 | Xu et al. |
| 2019/0317299 A1 | 10/2019 | Kim |

FOREIGN PATENT DOCUMENTS

| | | |
|---|---|---|
| CN | 205049806 U | 2/2016 |
| CN | 106094163 A | 11/2016 |
| CN | 106094164 A | 11/2016 |
| CN | 106154493 A | 11/2016 |
| CN | 106154494 A | 11/2016 |
| CN | 106154515 A | 11/2016 |
| CN | 106569322 A | 4/2017 |
| JP | S50-145226 A | 11/1975 |
| JP | S57-40219 A | 3/1982 |
| JP | S58-62609 A | 4/1983 |
| JP | S58-219509 A | 12/1983 |
| JP | S60-23814 A | 2/1985 |
| JP | S60-165608 A | 8/1985 |
| JP | S60-191215 A | 9/1985 |
| JP | S61-59409 A | 3/1986 |
| JP | S62-39811 A | 2/1987 |
| JP | S63-96619 A | 4/1988 |
| JP | S64-44908 A | 2/1989 |
| JP | H01-179007 A | 7/1989 |
| JP | H07-318798 A | 12/1995 |
| JP | H09-113805 A | 5/1997 |
| JP | H11-271606 A | 10/1999 |
| JP | 2000-241701 A | 9/2000 |
| JP | 2001-166207 A | 6/2001 |
| JP | 2008-250136 A | 10/2008 |
| JP | 2009-069369 A | 4/2009 |
| JP | 2009-086644 A | 4/2009 |
| TW | I522646 B | 2/2016 |
| TW | I545365 B | 8/2016 |
| TW | I565966 B | 1/2017 |
| TW | 201704802 A | 2/2017 |
| WO | 2014/155467 A1 | 10/2014 |
| WO | 2016/197604 A1 | 12/2016 |
| WO | 2017/022670 A1 | 2/2017 |

OPTICAL IMAGING LENS SYSTEM, IMAGE CAPTURING UNIT AND ELECTRONIC DEVICE

RELATED APPLICATIONS

This application is a continuation patent application of U.S. application Ser. No. 17/751,610, filed on May 23, 2022, which is a continuation patent application of U.S. application Ser. No. 16/709,772, filed on Dec. 10, 2019, which is a continuation patent application of U.S. application Ser. No. 15/707,861, filed on Sep. 18, 2017, which claims priority to Taiwan Application 106111311, filed Mar. 31, 2017, which is incorporated by reference herein in its entirety.

BACKGROUND

Technical Field

The present disclosure relates to an optical imaging lens system, an image capturing unit and an electronic device, more particularly to an optical imaging lens system and an image capturing unit applicable to an electronic device.

Description of Related Art

In recent years, with the popularity of electronic devices having camera functionalities, the demand of miniaturized optical systems has been increasing. As the advanced semiconductor manufacturing technologies have reduced the pixel size of sensors, the compact optical systems have gradually evolved toward the field of higher megapixels. Since there is an increasing demand for the electronic devices featuring compactness and better imaging functionality, the compact optical systems featuring high image quality have become the mainstream product in the market.

With the increasing applications of optical systems, the product specifications are becoming more stringent. In the conventional optical system having small field of view and telephoto effect, it is difficult to miniaturize the size of the optical system due to the limited materials as well as the changes of the shape of the lens; in addition, it is difficult to obtain a balance between the improvement of assembling process and sensitivity. Therefore, an optical system having features of telephoto effect, miniaturized size, easy to assemble and high image quality is able to meet the requirements of the market in the future.

As a result, there is a need to develop an optical system with a proper arrangement of optical elements to achieve features of telephoto effect, miniaturized size, assembling convenience and high image quality, for various applications, such as intelligent electronic products, multi-lens devices, wearable devices, digital cameras, automotive devices, identification systems, entertainment devices, sports devices and home intelligent assistance systems.

SUMMARY

According to one aspect of the present disclosure, an optical imaging lens system includes five lens elements which are, in order from an object side to an image side, a first lens element, a second lens element, a third lens element, a fourth lens element and a fifth lens element. The first lens element has positive refractive power. The second lens element has negative refractive power. The third lens element has positive refractive power. The fourth lens element has negative refractive power. The fifth lens element has negative refractive power. When a central thickness of the fifth lens element is CT5, a refractive power of the second lens element is P2, a refractive power of the fourth lens element is P4, a refractive power of the fifth lens element is P5, an axial distance between the first lens element and the second lens element is T12, an axial distance between the second lens element and the third lens element is T23, an axial distance between the third lens element and the fourth lens element is T34, a curvature radius of an object-side surface of the fifth lens element is R9, and a curvature radius of an image-side surface of the fifth lens element is R10, the following conditions are satisfied:

$0.05 < CT5/T23 < 3.80;$ $P2+P4+P5 < -3.20;$ $1.10 < (P2+P4+P5)/P4 < 9.0;$ $0.60 < T34/T12 < 6.0;$ and $0.15 < |(R9+R10)/(R9-R10)| < 5.80.$ According to another aspect of the present disclosure, an image capturing unit includes the aforementioned optical imaging lens system and an image sensor, wherein the image sensor is disposed on an image surface of the optical imaging lens system.

According to still another aspect of the present disclosure, an electronic device includes the aforementioned image capturing unit.

According to yet another aspect of the present disclosure, an optical imaging lens system includes five lens elements which are, in order from an object side to an image side, a first lens element, a second lens element, a third lens element, a fourth lens element and a fifth lens element. The first lens element has positive refractive power. The second lens element has negative refractive power. The third lens element has positive refractive power. The fourth lens element has negative refractive power. The fifth lens element has negative refractive power. The optical imaging lens system further includes an aperture stop. When a central thickness of the fourth lens element is CT4, a central thickness of the fifth lens element is CT5, a refractive power of the second lens element is P2, a refractive power of the fourth lens element is P4, a refractive power of the fifth lens element is P5, an axial distance between the second lens element and the third lens element is T23, an axial distance between the third lens element and the fourth lens element is T34, an axial distance between the aperture stop and an object-side surface of the third lens element is DsR5, and an axial distance between the aperture stop and an image-side surface of the third lens element is DsR6, the following conditions are satisfied:

$0.10 < CT5/T23 < 3.0;$ $P2+P4+P5 < -3.35;$ $0.65 < CT4/T34 < 9.0;$ and $0 < |DsR5/DsR6| < 1.0.$ According to yet still another aspect of the present disclosure, an optical imaging lens system includes five lens elements which are, in order from an object side to an image side, a first lens element, a second lens element, a third lens element, a fourth lens element and a fifth lens element. The first lens element has positive refractive power. The second lens element has negative refractive power. The third lens element has positive refractive power. The fourth lens element has negative refractive power. The fifth lens element with negative refractive power has an object-side surface being concave in a paraxial region thereof. When a central thickness of the fifth lens element is CT5, an axial distance between the second lens element and the third lens element is T23, an Abbe number of the third lens element is V3, a focal length of the optical imaging lens system is f, a curvature radius of an object-side surface of the third lens element is R5, and a curvature radius of an image-side surface of the third lens element is R6, the following conditions are satisfied:

$0.05 < CT5/T23 < 3.80;$ $10.0 < V3 < 25.0;$ and $-10.0 < [(R5-R6)*f]/(R5*R6) < -1.70.$

BRIEF DESCRIPTION OF THE DRAWINGS

The disclosure can be better understood by reading the following detailed description of the embodiments, with reference made to the accompanying drawings as follows.

DETAILED DESCRIPTION

An optical imaging lens system includes five lens elements. The five lens elements are, in order from an object side to an image side, a first lens element, a second lens element, a third lens element, a fourth lens element and a fifth lens element.

There is an air gap in a paraxial region between every two of the five lens elements of the optical imaging lens system that are adjacent to each other; that is, each of the first through the fifth lens elements can be a single and non-cemented lens element. The manufacturing process of the cemented lenses is more complex than the non-cemented lenses, for instance, an image-side surface of one lens element and an object-side surface of the following lens element need to have accurate curvature to ensure these two lens elements to be highly cemented. However, during the cementing process, those two lens elements might not be highly cemented due to displacement and it is thereby not favorable for the image quality. Therefore, there can be an air gap in a paraxial region between each of the five adjacent lens elements in the present disclosure for solving the problem generated by the cemented lens elements.

The first lens element has positive refractive power. Therefore, it is favorable for providing sufficient light convergence to obtain a telephoto effect so as to reduce a total track length and miniaturize the size of the optical imaging lens system.

The second lens element has negative refractive power. Therefore, it is favorable for balancing the positive refractive power of the first lens element as well as correcting chromatic aberration.

The third lens element has positive refractive power. Therefore, it is favorable for cooperating with the first lens element to properly distribute the positive refractive power, thereby reducing the sensitivity of the optical imaging lens system.

Figure 29:
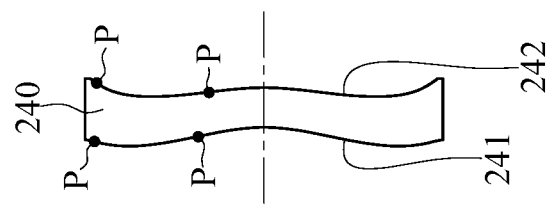
FIG. 29 is a schematic view of inflection point on the fourth lens element according to the 2nd embodiment of the present disclosure.

The fourth lens element has negative refractive power. Therefore, it is favorable for balancing the positive refractive power of the third lens element as well as correcting aberrations of the optical imaging lens system at the image side. In addition, either an object-side surface of the fourth lens element, an image-side surface of the fourth lens element or both the object-side surface and the image-side surface of the fourth lens element can have at least one inflection point; therefore, the shape of the fourth lens element is favorable for correcting off-axial aberrations at the image side, thereby improving image quality. Please refer to FIG. 29, which is a schematic view of inflection point on the fourth lens element according to the 2nd embodiment of the present disclosure. In FIG. 29, the object-side surface and the image-side surface of the fourth lens element both have at least one inflection point P.

The fifth lens element has negative refractive power; therefore, it is favorable for correcting astigmatism and obtaining a proper angle of incidence at the image surface so as to improve image quality at the periphery of the image. In addition, the fifth lens element can have an object-side surface being concave in a paraxial region thereof; therefore, it is favorable for designing the shape of the object-side surface of the fifth lens element so as to correct aberrations and maintain image quality. Furthermore, either the object-side surface of the fifth lens element, an image-side surface of the fifth lens element or both the object-side surface and the image-side surface of the fifth lens element can have at least one inflection point; therefore, it is favorable for adjusting the shape of the fifth lens element to capture peripheral light rays so as to prevent stray light due to large incident angle; also, it is favorable for controlling the angle of incidence at the image surface so as to maintain the brightness of the image, thereby improving the image quality.

When a central thickness of the fifth lens element is CT5, and an axial distance between the second lens element and the third lens element is T23, the following condition is satisfied: $0.05<CT5/T23<3.80$. Therefore, it is favorable for obtaining a proper central thickness of the fifth lens element and adjusting a ratio of the central thickness of the fifth lens element to the axial distance between the second lens element and the third lens element so as to miniaturize the optical imaging lens system and provide space for accommodating additional opto-mechanical components between the second lens element and the third lens element, thereby improving the image quality. Preferably, the following condition can also be satisfied:

$$0.10<CT5/T23<3.0.$$

When a refractive power of the second lens element is P2, a refractive power of the fourth lens element is P4, and a refractive power of the fifth lens element is P5, the following condition can be satisfied: $P2+P4+P5<-3.20$. Therefore, it is favorable for adjusting the distribution of the refractive power of the lens elements having negative refractive power to achieve telephoto effect, such that the optical imaging lens system is applicable to various electronic devices. Preferably, the following condition can also be satisfied: $P2+P4+P5<-3.35$. Specifically, P2 is a ratio of a focal length of the optical imaging lens system to a focal length of the second lens element, P4 is a ratio of the focal length of the optical imaging lens system to a focal length of the fourth lens element, and P5 is a ratio of the focal length of the optical imaging lens system to a focal length of the fifth lens element.

When the refractive power of the second lens element is P2, the refractive power of the fourth lens element is P4, and the refractive power of the fifth lens element is P5, the following condition can be satisfied: $1.10<(P2+P4+P5)/P4<9.0$. Therefore, it is favorable for adjusting the distribution of the refractive power of the lens elements having negative refractive power so as to reduce the sensitivity of the optical imaging lens system and correct aberrations. Preferably, the following condition can also be satisfied:

$$1.50<(P2+P4+P5)/P4<8.50.$$

When an axial distance between the first lens element and the second lens element is T12, and an axial distance between the third lens element and the fourth lens element is T34, the following condition can be satisfied: $0.60<T34/T12<6.0$. Therefore, it is favorable for controlling the ratio of the axial distances between each adjacent lens element so as to obtain a small field of view and sufficiently strong refractive power; also, it is favorable for maintaining assembly yield rate. Preferably, the following condition can also be satisfied:

$$0.75<T34/T12<5.80.$$

When a curvature radius of the object-side surface of the fifth lens element is R9, and a curvature radius of the image-side surface of the fifth lens element is R10, the following condition can be satisfied: $0.15<|(R9+R10)/(R9-R10)|<5.80$. Therefore, it is favorable for adjusting the shapes of the surfaces of the fifth lens element so as to maintain the refractive power of the fifth lens element and provide a sufficient back focal length to increase design flexibility. Preferably, the following condition can also be satisfied:

$$0.20<|(R9+R10)/(R9-R10)|<5.0.$$

When a central thickness of the fourth lens element is CT4, and the axial distance between the third lens element and the fourth lens element is T34, the following condition can be satisfied: $0.65<CT4/T34<9.0$. Therefore, it is favorable for obtaining a proper central thickness of the fourth lens element and adjusting a ratio of the central thickness of the fourth lens element to the axial distance between the third lens element and the fourth lens element, so as to improve the lens molding and the assembly yield rate, thereby improving the image quality. Preferably, the following condition can also be satisfied: $0.65<CT4/T34<4.80$. More preferably, the following condition can also be satisfied:

$$0.70<CT4/T34<4.0.$$

The optical imaging lens system further includes an aperture stop. When an axial distance between the aperture stop and an object-side surface of the third lens element is DsR5, and an axial distance between the aperture stop and an image-side surface of the third lens element is DsR6, the following condition can be satisfied: $0<|DsR5/DsR6|<1.0$. Therefore, it is favorable for controlling the position of the aperture stop to achieve telephoto effect, thereby improving the image-sensing efficiency of an image sensor.

When an Abbe number of the third lens element is V3, the following condition can be satisfied: $10.0<V3<25.0$. Therefore, the third lens element is made of high dispersion material (low Abbe number) so that the density difference between the interface of the third lens element and the air is large, and thus it is favorable for increasing the angle of refraction at the interface so as to generate the same refractive effect in a smaller space, thereby miniaturizing the optical imaging lens system.

When a focal length of the optical imaging lens system is f, a curvature radius of the object-side surface of the third lens element is R5, and a curvature radius of the image-side surface of the third lens element is R6, the following condition can be satisfied: $-10.0<[(R5-R6)*f]/(R5*R6)<-1.70$. Therefore, it is favorable for controlling the shapes of the surfaces of the third lens element so as to get a proper refractive power of the third lens element, thereby shortening the total track length of the optical imaging lens system for maintaining compactness.

When a curvature radius of the image-side surface of the fourth lens element is R8, and a curvature radius of the object-side surface of the fifth lens element is R9, the following condition can be satisfied: $|R9/R8|<12.0$. Therefore, it is favorable for adjusting the arrangement of the curvatures of the image-side surface of the fourth lens element and the object-side surface of the fifth lens element so as to get a structure having small field of view, thereby achieving telephoto effect. Preferably, the following condition can also be satisfied: $|R9/R8|<9.0$. More preferably, the following condition can also be satisfied:

$|R9/R8|<4.5$.

When the axial distance between the second lens element and the third lens element is T23, and the axial distance between the fourth lens element and the fifth lens element is T45, the following condition can be satisfied: $-0.35<(T23-T45)/(T23+T45)<0.50$. Therefore, it is favorable for arranging the ratio of the axial distance at the object side to the axial distance at the image side so as to improve the symmetry of the optical imaging lens system and reduce the sensitivity.

When a maximum effective radius of the image-side surface of the fifth lens element is Y52, and an entrance pupil diameter of the optical imaging lens system is EPD, the following condition can be satisfied: $0.70<Y52*2/EPD<1.20$. Therefore, it is favorable for controlling the ratio between the effective radius of the image-side surface of the fifth lens element to the entrance pupil diameter so as to miniaturize the optical imaging lens system and ensure the brightness being sufficient enough for telephoto, thereby increasing the range of application.

When a maximum effective radius among all surfaces of the five lens elements of the optical imaging lens system is Y max, the following condition can be satisfied: $0.70 \text{ [mm]}<Y\text{max}<5.0 \text{ [mm]}$. Therefore, it is favorable for controlling the maximum effective radius of each lens element so as to maintain the compactness of the optical imaging lens system for being adapted to various compact electronic devices. Preferably, the following condition can also be satisfied:

$1.0 \text{ [mm]}<Y\text{max}<3.0 \text{ [mm]}$.

When an axial distance between an object-side surface of the first lens element and an image surface is TL, and the focal length of the optical imaging lens system is f, the following condition can be satisfied: $0.70<TL/f<1.10$. Therefore, it is favorable for controlling the total track length and the focal length of the optical imaging lens system so as to obtain a balance between compactness and the telephoto effect.

When an axial distance between the image-side surface of the fifth lens element and the image surface is BL, and a sum of axial distances between every two of the five lens elements of the optical imaging lens system that are adjacent to each other is ΣAT, the following condition can be satisfied: $0.05<BL/\Sigma AT<4.0$. Therefore, it is favorable for controlling the ratio between the back focal length to the axial distances between each adjacent lens element so as to provide a sufficient space for accommodating additional opto-mechanical components, thereby improving the image quality and assembling convenience. Preferably, the following condition can also be satisfied:

$0.70<BL/\Sigma AT<3.20$.

According to the present disclosure, the aperture stop can be disposed between an object and the object-side surface of the third lens element. Therefore, it is favorable for controlling the position of the aperture stop to achieve the feature of telephoto effect so as to improve the image-sensing efficiency of the image sensor.

When a maximum image height of the optical imaging lens system is ImgH (i.e. half of a diagonal length of an effective photosensitive area of an image sensor), and the focal length of the optical imaging lens system is f, the following condition can be satisfied: $0.10<ImgH/f<0.50$. Therefore, it is favorable for the optical imaging lens system to obtain a telephoto effect so as to be applicable to various types of photography When an Abbe number of the second lens element is V2, and an Abbe number of the fourth lens element is V4, the following condition can be satisfied: $0<(V2+V4)/2<25.0$. Therefore, it is favorable for converging light rays that have different wavelengths so as to prevent image overlap.

When the axial distance between the second lens element and the third lens element can be larger than both the axial distance between the first lens element and the second lens element and the axial distance between the third lens element and the fourth lens element (i.e., T23>T12 and T23>T34), and an axial distance between the fourth lens element and the fifth lens element can be larger than both the axial distance between the first lens element and the second lens element and the axial distance between the third lens element and the fourth lens element (i.e., T45>T12 and T45>T34). Therefore, it is favorable for controlling the axial distances between the adjacent lens elements at both the image side and the object side so as to get a structure having small field of view, thereby improving the assembly yield rate and the image quality.

When the focal length of the optical imaging lens system is f, a focal length of the third lens element is f3, the following condition can be satisfied: $1.0<f/f3<5.0$. Therefore, it is favorable for strengthening the refractive power of the third lens element and moving the principle point of the optical imaging lens system toward the image side so as to provide a sufficient back focal length to increase the design flexibility.

When a maximum effective radius of the object-side surface of the first lens element is Y11, and the maximum effective radius of the image-side surface of the fifth lens element is Y52, the following condition can be satisfied: $0.70<Y52/Y11<1.10$. Therefore, it is favorable for obtaining a proper ratio of the effective radius of the lens element at the object side to the effective radius of the lens element at the image side. As a result, the outer diameter of the lens can be controlled so as to reduce the outer diameter of the lens barrel, thereby improving the design flexibility.

When the axial distance between the image-side surface of the fifth lens element and the image surface is BL, the axial distance between the second lens element and the third lens element is T23, and the sum of axial distances between every two of the five lens elements of the optical imaging lens system that are adjacent to each other is ΣAT, the following condition can be satisfied: 0.30>ΣAT/(T23+BL)<0.75. Therefore, it is favorable for adjusting the ratio of the axial distances between the adjacent lens elements to the back focal length of the optical imaging lens system and increasing the assembly yield rate; in addition, it is also favorable for adding various opto-mechanical components to increase the design flexibility, thereby being adapted to various electronic devices.

When the Abbe number of the second lens element is V2, the Abbe number of the third lens element is V3, and the Abbe number of the fourth lens element is V4, the following condition can be satisfied: 30.0<V2+V3+V4<95.0. Therefore, it is favorable for selecting materials of the lens elements so as to strengthening the refractive power of the lens elements to achieve telephoto effect and correct various aberrations.

When half of a maximum field of view of the optical imaging lens system is HFOV, the following condition can be satisfied: tan(HFOV)<0.30. Therefore, it is favorable for meeting the requirements of small field of view and telephoto effect, simultaneously.

When an axial distance between the aperture stop and the image-side surface of the fifth lens element is SD, and an axial distance between the object-side surface of the first lens element and the image-side surface of the fifth lens element is TD, the following condition can be satisfied: 0.70<SD/TD<1.0. Therefore, it is favorable for adjusting the position of the aperture stop so that there is a sufficient distance between an exit pupil of the optical imaging lens system and the image surface so as to achieve telecentric effect.

When the sum of axial distances between every two of the five lens elements of the optical imaging lens system that are adjacent to each other is ΣAT, and the central thickness of the third lens element is CT3, the following condition can be satisfied: 0.10<ΣAT/CT3<7.50. Therefore, it is favorable for obtaining a proper ratio of the central thickness of the third lens element to the axial distances between each adjacent lens element of the optical imaging lens system so as to strengthen the refractive power of the third lens element and reduce the sensitivity. As a result, the total track length is reduced and the optical imaging lens system is miniaturized.

Figure 30:
FIG. 30 is a schematic view of a reflector in the optical imaging lens system according to one embodiment of the present disclosure.
Figure 30:
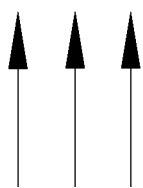
Figure 30:
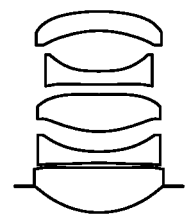
Figure 30:
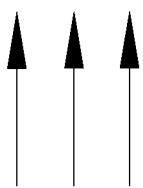
Figure 30:
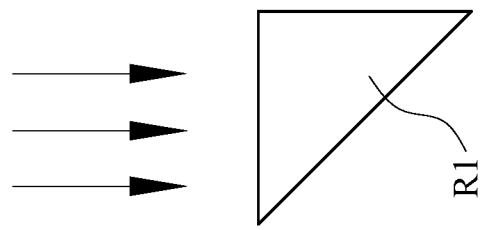
Figure 31:
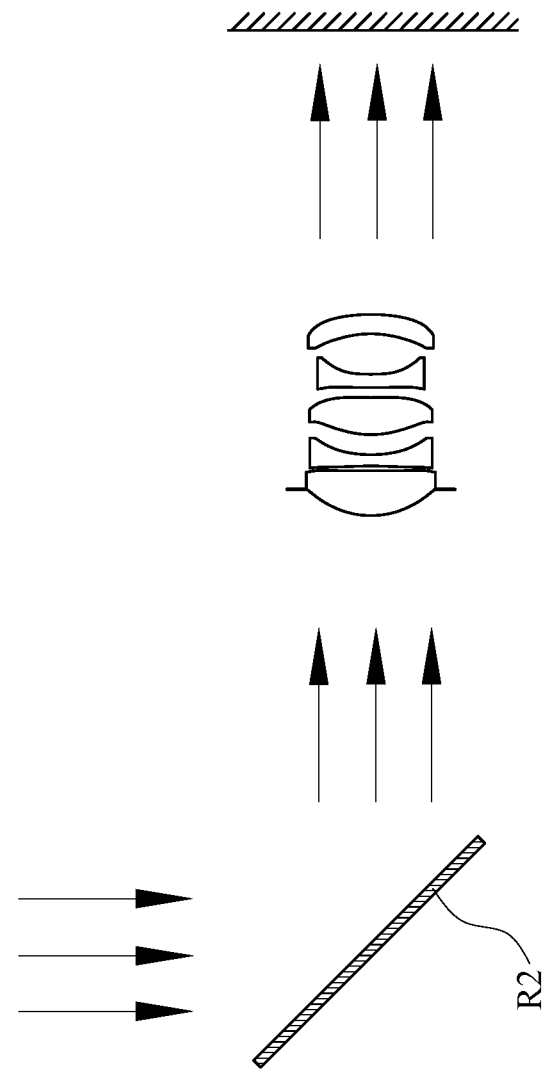
FIG. 31 is a schematic view of another reflector in the optical imaging lens system according to another embodiment of the present disclosure.
Figure 32:
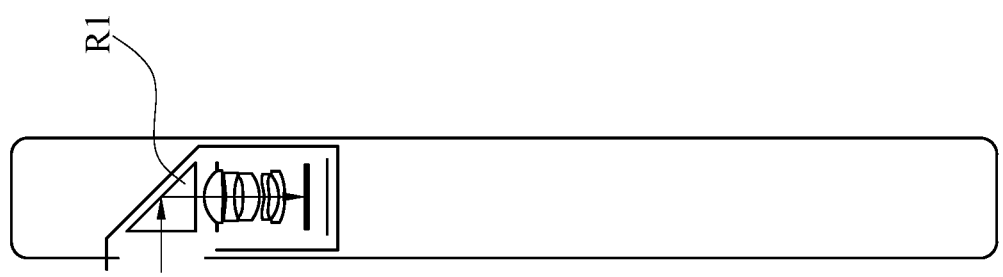
FIG. 32 is a schematic view of an optical imaging lens system with a reflector in an electronic device according to still another embodiment of the present disclosure.

According to the present disclosure, the optical imaging lens system can include at least one reflector. The reflector is favorable for changing the direction of light rays so as to improve space usage, so that the optical imaging lens system can be more flexible to design. Please refer to FIG. 30, which is a schematic view of a reflector in the optical imaging lens system according to one embodiment of the present disclosure. In FIG. 30, the reflector is a prism R1 disposed between an imaged object (not shown) and the optical imaging lens system (not numbered). However, the present disclosure is not limited to the quantity and position of the prism R1 in FIG. 30. Please refer to FIG. 31, which is a schematic view of another reflector in the optical imaging lens system according to another embodiment of the present disclosure. In FIG. 31, the reflector is a reflective mirror R2. Then, please refer to FIG. 32, which is a schematic view of an optical imaging lens system with a reflector in an electronic device according to still another embodiment of the present disclosure. As shown in FIG. 32, the direction of light rays can be changed by the reflector (prism R1) so that the total track length is prevented from being too long.

According to the present disclosure, the lens elements of the optical imaging lens system can be made of glass or plastic material. When the lens elements are made of glass material, the distribution of the refractive power of the optical imaging lens system may be more flexible to design. When the lens elements are made of plastic material, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof and to further decrease the required number of the lens elements. Therefore, the total track length of the optical imaging lens system can also be reduced.

According to the present disclosure, in the optical imaging lens system, the inflection point on the surfaces of the lens element is the junction between positive surface curvature and negative surface curvature.

According to the present disclosure, each of an object-side surface and an image-side surface of a lens element has a paraxial region and an off-axial region. The paraxial region refers to the region of the surface where light rays travel close to the optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image correction unit, such as a field flattener, can be optionally disposed between the lens elements of the optical imaging lens system and the image surface for correction of aberrations such as field curvature. The optical properties of the image correction unit, such as curvature, thickness, index of refraction, position and surface shape (convex or concave surface with spherical, aspheric, diffraction or Fresnel morphology), can be adjusted according to the demand of an image capturing unit. In generally, a preferable image correction unit is, for example, a thin transparent element having a concave object-side surface and a planar image-side surface, and the thin transparent element is disposed near the image surface.

According to the present disclosure, an image surface of the optical imaging lens system on a corresponding image sensor can be flat or curved, particularly a concave curved surface facing towards the object side of the optical imaging lens system.

According to the present disclosure, the optical imaging lens system can include at least one stop, such as an aperture stop, a glare stop or a field stop. Said glare stop or said field stop is allocated for eliminating the stray light and thereby improving image quality thereof.

According to the present disclosure, an aperture stop can be configured as a front stop or a middle stop. A front stop disposed between the object and the first lens element can produce a telecentric effect by providing a longer distance between an exit pupil and the image surface, thereby improving the image-sensing efficiency of an image sensor (for example, CCD or CMOS). A middle stop disposed between the first lens element and the image surface is favorable for enlarging the view angle and thereby provides a wider field of view.

According to the above description of the present disclosure, the following specific embodiments are provided for further explanation.

1st Embodiment

Figure 1:
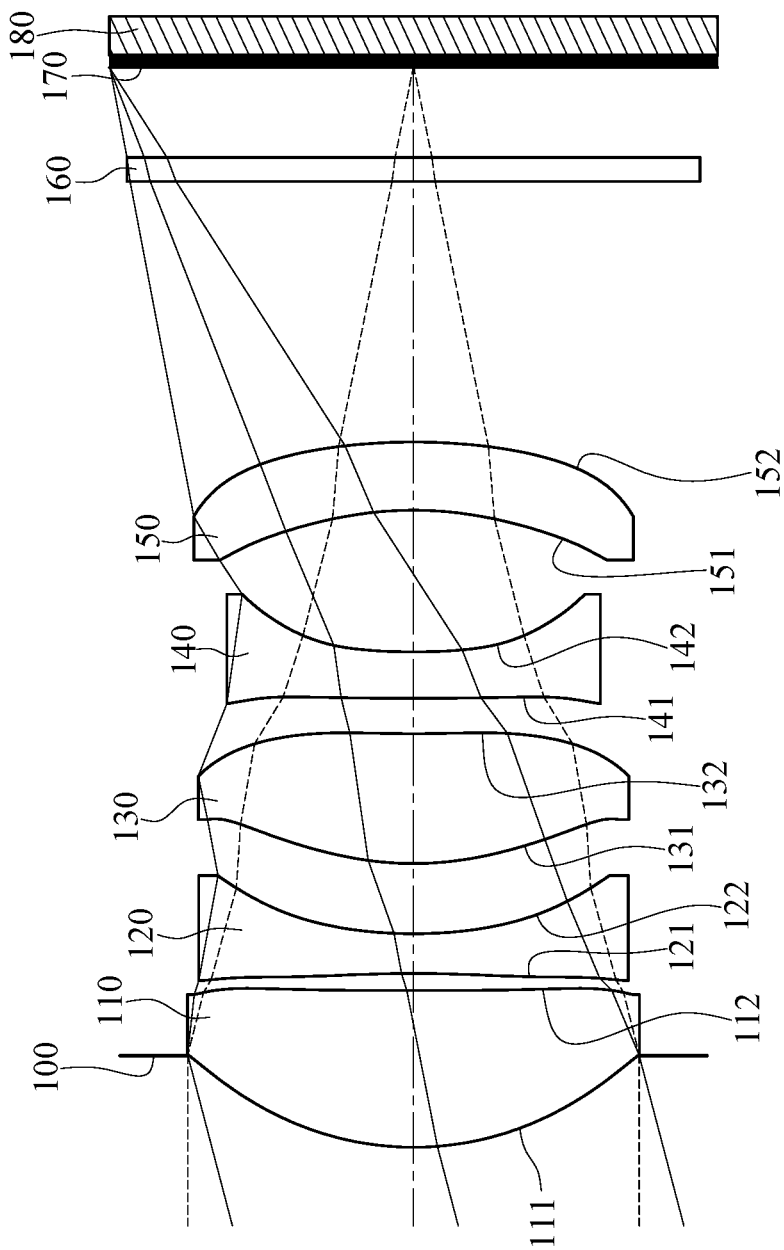
FIG. 1 is a schematic view of an image capturing unit according to the 1st embodiment of the present disclosure.
Figure 2:
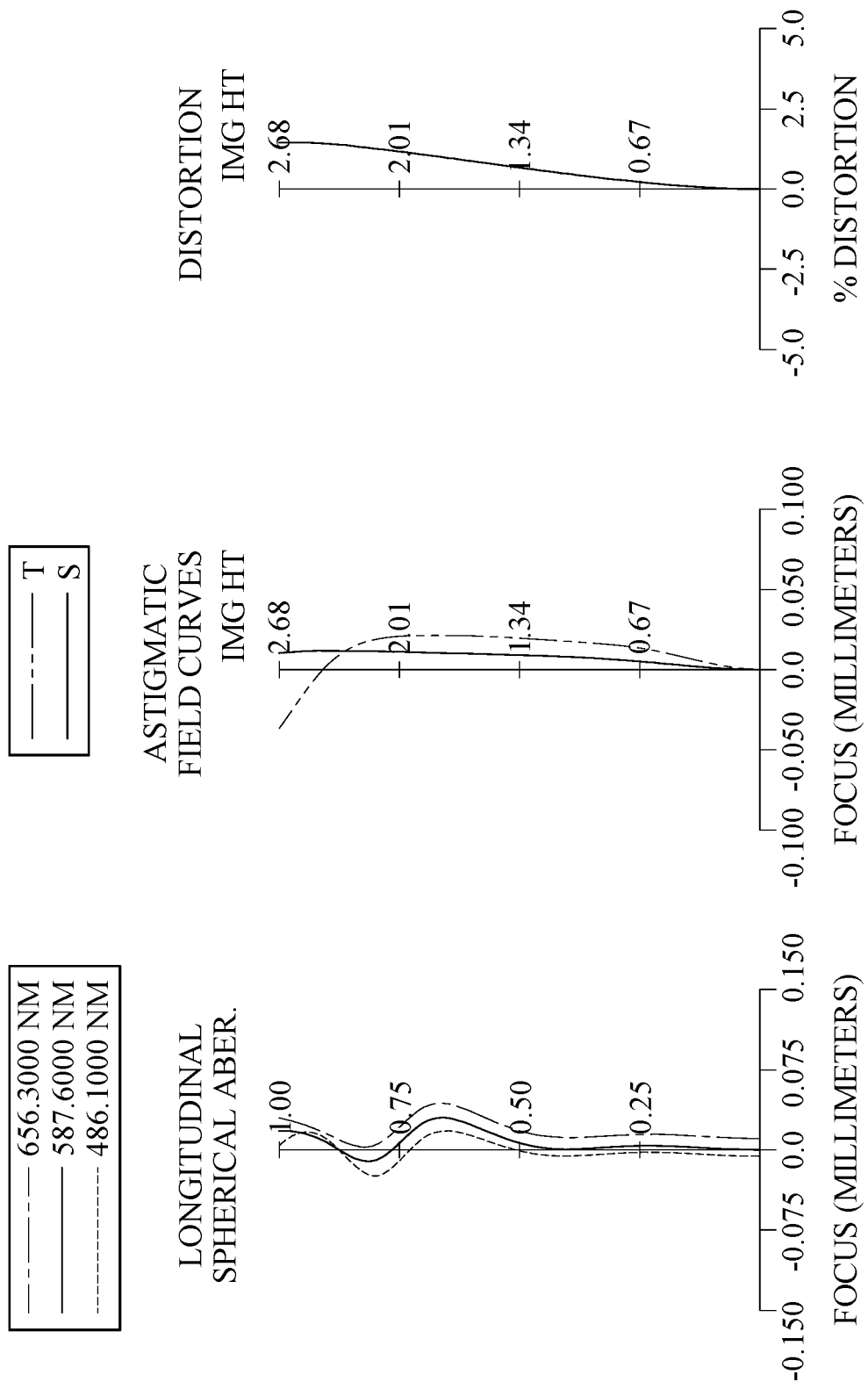
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging lens system (its reference numeral is omitted) of the present disclosure and an image sensor 180. The optical imaging lens system includes, in order from an object side to an image side, an aperture stop 100, a first lens element 110, a second lens element 120, a third lens element 130, a fourth lens element 140, a fifth lens element 150, a filter 160 and an image surface 170. The optical imaging lens system includes five lens elements (110, 120, 130, 140 and 150) with no additional lens element disposed between the first lens element 110 and the fifth lens element 150.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being concave in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. The object-side surface 141 of the fourth lens element 140 has at least one inflection point.

The fifth lens element 150 with negative refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric. The object-side surface 151 of the fifth lens element 150 has at least one inflection point.

The filter 160 is made of glass material and located between the fifth lens element 150 and the image surface 170, and will not affect the focal length of the optical imaging lens system. The image sensor 180 is disposed on or near the image surface 170 of the optical imaging lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,
X is the relative distance between a point on the aspheric surface spaced at a distance Y from an optical axis and the tangential plane at the aspheric surface vertex on the optical axis;
Y is the vertical distance from the point on the aspheric surface to the optical axis;
R is the curvature radius;
k is the conic coefficient; and
Ai is the i-th aspheric coefficient, and in the embodiments, i may be, but is not limited to, 4, 6, 8, 10, 12, 14 and 16.

In the optical imaging lens system of the image capturing unit according to the 1st embodiment, when a focal length of the optical imaging lens system is f, an f-number of the optical imaging lens system is Fno, and half of a maximum field of view of the optical imaging lens system is HFOV, these parameters have the following values: f=10.06 millimeters (mm); Fno=2.53; and HFOV=14.7 degrees (deg.).

When half of a maximum field of view of the optical imaging lens system is HFOV, the following condition is satisfied:

tan(HFOV)=0.26.

When an Abbe number of the third lens element 130 is V3, the following condition is satisfied:

V3=20.3.

When an Abbe number of the second lens element 120 is V2, and an Abbe number of the fourth lens element 140 is V4, the following condition is satisfied:

(V2+V4)/2=20.37.

When the Abbe number of the second lens element 120 is V2, the Abbe number of the third lens element 130 is V3, the Abbe number of the fourth lens element 140 is V4, the following condition is satisfied:

V2+V3+V4=61.1.

When a central thickness of the fifth lens element 150 is CT5, and an axial distance between the second lens element 120 and the third lens element 130 is T23, the following condition is satisfied: CT5/T23=0.97. In this embodiment, an axial distance between each adjacent lens element is the air gap in the axial direction therebetween.

When a central thickness of the fourth lens element 140 is CT4, and an axial distance between the third lens element 130 and the fourth lens element 140 is T34, the following condition is satisfied:

CT4/T34=1.32.

When an axial distance between the first lens element 110 and the second lens element 120 is T12, and the axial distance between the third lens element 130 and the fourth lens element 140 is T34, the following condition is satisfied:

T34/T12=2.06.

When the axial distance between the second lens element 120 and the third lens element 130 is T23, and an axial distance between the fourth lens element 140 and the fifth lens element 150 is T45, the following condition is satisfied:

(T23−T45)/(T23+T45)=−0.34.

When a sum of axial distances between every two of the five lens elements (110, 120, 130, 140 and 150) of the optical imaging lens system that are adjacent to each other is ΣAT, and a central thickness of the third lens element 130 is CT3, the following condition is satisfied:

ΣAT/CT3=2.03.

When the sum of axial distances between every two of the five lens elements (110, 120, 130, 140 and 150) of the optical imaging lens system that are adjacent to each other is ΣAT, the axial distance between the second lens element 120 and the third lens element 130 is T23, and an axial distance between the image-side surface 152 of the fifth lens element 150 and the image surface 170 is BL, the following condition is satisfied:

ΣAT/(T23+BL)=0.59.

When the axial distance between the image-side surface 152 of the fifth lens element 150 and the image surface 170 is BL, and the sum of axial distances between every two of the five lens elements (110, 120, 130, 140 and 150) of the optical imaging lens system that are adjacent to each other is ΣAT, the following condition is satisfied:

BL/ΣAT=1.42.

When a curvature radius of the image-side surface 142 of the fourth lens element 140 is R8, and a curvature radius of the object-side surface 151 of the fifth lens element 150 is R9, the following condition is satisfied:

|R9/R8|=0.52.

When the curvature radius of the object-side surface 151 of the fifth lens element 150 is R9, and a curvature radius of the image-side surface 152 of the fifth lens element 150 is R10, the following condition is satisfied:

|(R9+R10)/(R9−R10)|=3.71.

When the focal length of the optical imaging lens system is f, a curvature radius of the object-side surface 131 of the third lens element 130 is R5, and a curvature radius of the image-side surface 132 of the third lens element 130 is R6, the following condition is satisfied:

[(R5−R6)*f]/(R5*R6)=−2.68.

When an axial distance between the aperture stop 100 and the image-side surface 152 of the fifth lens element 150 is SD, and an axial distance between the object-side surface 111 of the first lens element 110 and the image-side surface 152 of the fifth lens element 150 is TD, the following condition is satisfied:

SD/TD=0.87.

When a maximum effective radius of the image-side surface 152 of the fifth lens element 150 is Y52, and an entrance pupil diameter of the optical imaging lens system is EPD, the following condition is satisfied:

Y52*2/EPD=0.97.

When a maximum effective radius of the object-side surface 111 of the first lens element 110 is Y11, and the maximum effective radius of the image-side surface 152 of the fifth lens element 150 is Y52, the following condition is satisfied:

Y52/Y11=0.97.

When the focal length of the optical imaging lens system is f, a focal length of the third lens element 130 is f3, the following conditions are satisfied:

f/f3=1.86.

When a maximum image height of the optical imaging lens system is ImgH, and the focal length of the optical imaging lens system is f, the following condition is satisfied:

ImgH/f=0.27.

When an axial distance between the object-side surface 111 of the first lens element 110 and the image surface 170 is TL, and the focal length of the optical imaging lens system is f, the following condition is satisfied:

TL/f=0.95.

When a refractive power of the second lens element 120 is P2, a refractive power of the fourth lens element 140 is P4, and a refractive power of the fifth lens element 150 is P5, the following condition is satisfied:

P2+P4+P5=−3.74.

When the refractive power of the second lens element 120 is P2, the refractive power of the fourth lens element 140 is P4, and the refractive power of the fifth lens element 150 is P5, the following condition is satisfied:

(P2+P4+P5)/P4=4.71.

When an axial distance between the aperture stop 100 and the object-side surface 131 of the third lens element 130 is DsR5, and an axial distance between the aperture stop 100 and the image-side surface 132 of the third lens element 130 is DsR6, the following condition is satisfied:

|DsR5/DsR6|=0.60.

When a maximum effective radius among all surfaces of the five lens elements (110, 120, 130, 140 and 150) of the optical imaging lens system is Y max, the following condition is satisfied: Y max=1.99 mm. In this embodiment, the maximum effective radius of the object-side surface 111 of the first lens element 110 is larger than the maximum effective radii of the other object-side surfaces (121-151) and the image-side surfaces (112-152), and thus Y max=Y11.

The detailed optical data of the 1st embodiment are shown in Table 1 and the aspheric surface data are shown in Table 2 below.

TABLE 1

1st Embodiment
f = 10.06 mm, Fno = 2.53, HFOV = 14.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.808 | | | | |
| 2 | Lens 1 | 2.680 | (ASP) | 1.382 | Plastic | 1.545 | 56.1 | 4.98 |
| 3 | | 166.667 | (ASP) | 0.151 | | | | |
| 4 | Lens 2 | −10.027 | (ASP) | 0.350 | Plastic | 1.661 | 20.3 | −4.37 |
| 5 | | 4.107 | (ASP) | 0.619 | | | | |
| 6 | Lens 3 | 2.809 | (ASP) | 1.145 | Plastic | 1.661 | 20.3 | 5.40 |
| 7 | | 11.097 | (ASP) | 0.311 | | | | |
| 8 | Lens 4 | 25.535 | (ASP) | 0.411 | Plastic | 1.660 | 20.4 | −12.68 |
| 9 | | 6.263 | (ASP) | 1.249 | | | | |
| 10 | Lens 5 | −3.247 | (ASP) | 0.601 | Plastic | 1.535 | 56.3 | −15.69 |
| 11 | | −5.639 | (ASP) | 2.299 | | | | |
| 12 | Filter | Plano | | 0.210 | Glass | 1.517 | 64.2 | — |
| 13 | | Plano | | 0.792 | | | | |
| 14 | Image | Plano | | — | | | | |

Note:
Reference wavelength is 587.6 nm (d-line).

TABLE 2

Aspheric Coefficients

| | | | Surface # | | |
|---|---|---|---|---|---|
| | 2 | 3 | 4 | 5 | 6 |
| k = | 6.8143E−02 | 9.9000E+01 | 1.8080E+01 | −9.4425E+00 | −4.4848E−01 |
| A4 = | −1.2797E−03 | 1.0353E−02 | 3.3283E−02 | 3.2409E−02 | −2.1200E−02 |
| A6 = | −1.3782E−04 | −8.5238E−03 | −1.5992E−02 | −5.4476E−03 | 3.4993E−03 |
| A8 = | −6.7307E−05 | 5.8963E−03 | 1.0155E−02 | 4.5472E−03 | −1.1536E−03 |
| A10 = | −1.1565E−04 | −2.3375E−03 | −3.9903E−03 | −1.2916E−03 | 1.3536E−03 |
| A12 = | 5.9405E−05 | 3.3548E−04 | 6.3680E−04 | −1.5843E−04 | −6.0121E−04 |
| A14 = | −1.0084E−05 | −1.0487E−05 | −2.5252E−05 | 6.9581E−05 | 5.8356E−05 |

| | | | Surface # | | |
|---|---|---|---|---|---|
| | 7 | 8 | 9 | 10 | 11 |
| k = | 2.4912E+01 | 2.9588E+01 | −5.9436E+01 | 2.8444E−02 | −5.3476E+01 |
| A4 = | −6.8039E−02 | −1.2587E−02 | 9.4191 E−02 | −1.5451E−03 | −4.6683E−02 |
| A6 = | −1.9459E−03 | 1.3403E−02 | 2.5158E−02 | 3.6235E−02 | 3.5797E−02 |
| A8 = | 1.9634E−02 | −2.1359E−02 | −6.9367E−02 | −4.8980E−02 | −3.0715E−02 |
| A10 = | −1.1151E−02 | 2.8515E−02 | 8.9210E−02 | 3.5045E−02 | 1.6353E−02 |
| A12 = | 2.5337E−03 | −2.2030E−02 | −6.6405E−02 | −1.3572E−02 | −5.2859E−03 |
| A14 = | −2.1575E−04 | 7.6117E−03 | 2.4080E−02 | 2.5186E−03 | 9.1816E−04 |
| A16 = | — | −9.4089E−04 | −3.2920E−03 | −1.6398E−04 | −6.7387E−05 |

In Table 1, the curvature radius, the thickness and the focal length are shown in millimeters (mm). Surface numbers 0-14 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the terms in the tables are the same as Table 1 and Table 2 of the 1st embodiment. Therefore, an explanation in this regard will not be provided again.

2nd Embodiment

Figure 3:
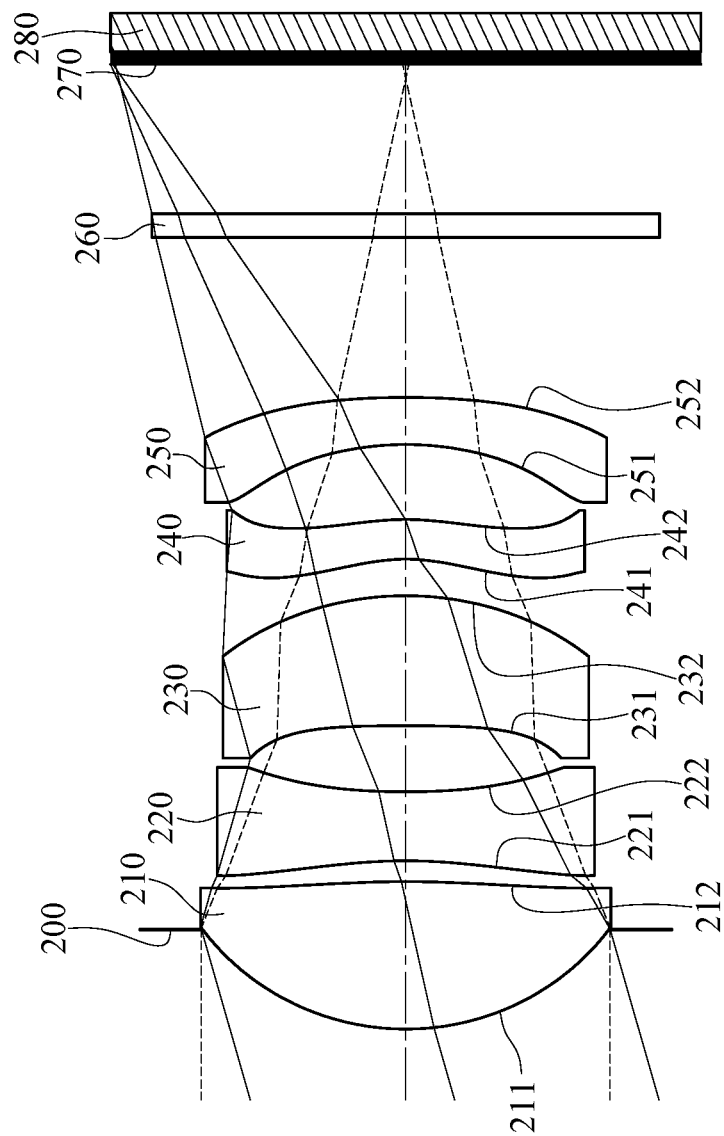
FIG. 3 is a schematic view of an image capturing unit according to the 2nd embodiment of the present disclosure.
Figure 4:
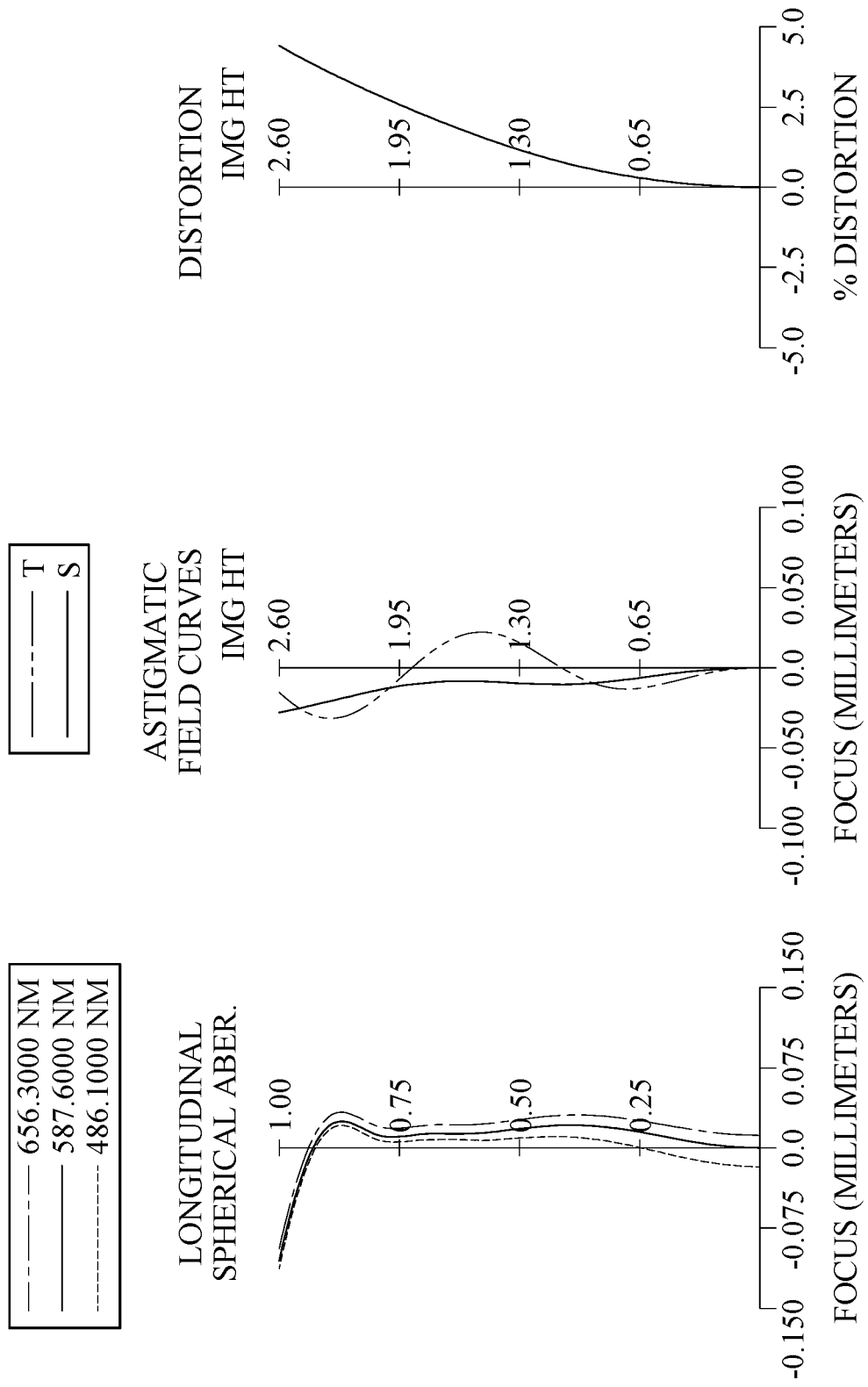
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging lens system (its reference numeral is omitted) of the present disclosure and an image sensor 280. The optical imaging lens system includes, in order from an object side to an image side, an aperture stop 200, a first lens element 210, a second lens element 220, a third lens element 230, a fourth lens element 240, a fifth lens element 250, a filter 260 and an image surface 270. The optical imaging lens system includes five lens elements (210, 220, 230, 240 and 250) with no additional lens element disposed between the first lens element 210 and the fifth lens element 250.

The first lens element 210 with positive refractive power has an object-side surface 211 being convex in a paraxial region thereof and an image-side surface 212 being convex in a paraxial region thereof. The first lens element 210 is made of plastic material and has the object-side surface 211 and the image-side surface 212 being both aspheric.

The second lens element 220 with negative refractive power has an object-side surface 221 being concave in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being concave in a paraxial region thereof and an image-side surface 232 being convex in a paraxial region thereof. The third lens element 230 is made of plastic material and has the object-side surface 231 and the image-side surface 232 being both aspheric.

The fourth lens element 240 with negative refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric. Both the object-side surface 241 and the image-side surface 242 of the fourth lens element 240 have at least one inflection point.

The fifth lens element 250 with negative refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric. The object-side surface 251 of the fifth lens element 250 has at least one inflection point.

The filter 260 is made of glass material and located between the fifth lens element 250 and the image surface 270, and will not affect the focal length of the optical imaging lens system. The image sensor 280 is disposed on or near the image surface 270 of the optical imaging lens system.

The detailed optical data of the 2nd embodiment are shown in Table 3 and the aspheric surface data are shown in Table 4 below.

TABLE 3

2nd Embodiment
f = 8.64 mm, Fno = 2.40, HFOV = 16.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.877 | | | | |
| 2 | Lens 1 | 2.287 | (ASP) | 1.300 | Plastic | 1.545 | 56.0 | 3.52 |
| 3 | | −9.458 | (ASP) | 0.184 | | | | |
| 4 | Lens 2 | −4.406 | (ASP) | 0.608 | Plastic | 1.614 | 26.0 | −4.22 |
| 5 | | 6.613 | (ASP) | 0.583 | | | | |
| 6 | Lens 3 | −19.608 | (ASP) | 1.147 | Plastic | 1.660 | 20.4 | 4.52 |
| 7 | | −2.649 | (ASP) | 0.322 | | | | |
| 8 | Lens 4 | −1.571 | (ASP) | 0.350 | Plastic | 1.660 | 20.4 | −8.91 |
| 9 | | −2.334 | (ASP) | 0.661 | | | | |
| 10 | Lens 5 | −2.629 | (ASP) | 0.416 | Plastic | 1.584 | 28.2 | −7.65 |
| 11 | | −6.760 | (ASP) | 1.410 | | | | |
| 12 | Filter | Plano | | 0.210 | Glass | 1.517 | 64.2 | — |
| 13 | | Plano | | 1.317 | | | | |
| 14 | Image | Plano | | — | | | | |

Note:
Reference wavelength is 587.6 nm (d-line).

TABLE 4

Aspheric Coefficients

| | Surface # | | | | |
|---|---|---|---|---|---|
| | 2 | 3 | 4 | 5 | 6 |
| k = | 1.1864E−01 | −2.8283E+01 | 4.3618E+00 | −1.5721E+01 | 8.2431E+01 |
| A4 = | −1.3043E−03 | 1.8347E−02 | 5.8974E−02 | 4.4120E−02 | −3.2486E−02 |
| A6 = | 3.7119E−05 | −1.0917E−02 | −2.8925E−02 | −2.3382E−02 | −1.3734E−02 |
| A8 = | 5.4734E−05 | 5.6941E−03 | 1.5658E−02 | 8.5472E−03 | −4.6701E−03 |
| A10 = | −1.4204E−04 | −1.2594E−03 | −4.1953E−03 | 2.1054E−03 | 5.7307E−03 |
| A12 = | 7.6470E−05 | −6.0769E−05 | 3.2054E−04 | −2.5206E−03 | −2.4650E−03 |
| A14 = | −1.4190E−05 | 4.4367E−05 | 5.9197E−05 | 4.5843E−04 | 6.4276E−05 |

| | Surface # | | | | |
|---|---|---|---|---|---|
| | 7 | 8 | 9 | 10 | 11 |
| k = | −1.1310E+01 | −1.0146E+01 | −1.8629E+01 | 8.9187E−01 | 5.2134E+00 |
| A4 = | −3.8938E−02 | 5.2709E−02 | 8.3166E−02 | 4.9502E−02 | 1.0817E−02 |
| A6 = | −1.3054E−02 | 9.9933E−03 | −4.3330E−03 | −8.3356E−02 | −3.3438E−02 |
| A8 = | 1.9843E−02 | −5.2207E−02 | −6.8813E−02 | 6.2984E−02 | 2.4194E−02 |
| A10 = | −1.0895E−02 | 6.3131E−02 | 9.3478E−02 | −3.1019E−02 | −1.0452E−02 |

TABLE 4-continued

| Aspheric Coefficients | | | | | |
|---|---|---|---|---|---|
| A12 = | 2.9641E−03 | −3.5972E−02 | −5.8410E−02 | 1.0223E−02 | 2.7873E−03 |
| A14 = | −3.2953E−04 | 1.0303E−02 | 1.8853E−02 | −1.7347E−03 | −3.8778E−04 |
| A16 = | — | −1.2101E−03 | −2.4621E−03 | 1.4443E−04 | 1.7882E−05 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 8.64 | |R9/R8| | 1.13 |
| Fno | 2.40 | |(R9 + R10)/(R9 − R10)| | 2.27 |
| HFOV [deg.] | 16.0 | [(R5 − R6) * f]/(R5 * R6) | −2.82 |
| tan(HFOV) | 0.29 | SD/TD | 0.84 |
| V3 | 20.4 | Y52 * 2/EPD | 0.98 |
| (V2 + V4)/2 | 23.19 | Y52/Y11 | 0.98 |
| V2 + V3 + V4 | 66.8 | f/f3 | 1.91 |
| CT5/T23 | 0.71 | ImgH/f | 0.30 |
| CT4/T34 | 1.09 | TL/f | 0.98 |
| T34/T12 | 1.75 | P2 + P4 + P5 | −4.15 |
| (T23 − T45)/(T23 + T45) | −0.06 | (P2 + P4 + P5)/P4 | 4.28 |
| ΣAT/CT3 | 1.53 | |DsR5/DsR6| | 0.61 |
| ΣAT/(T23 + BL) | 0.50 | Ymax [mm] | 1.81 |
| BL/ΣAT | 1.68 | — | — |

3rd Embodiment

Figure 5:
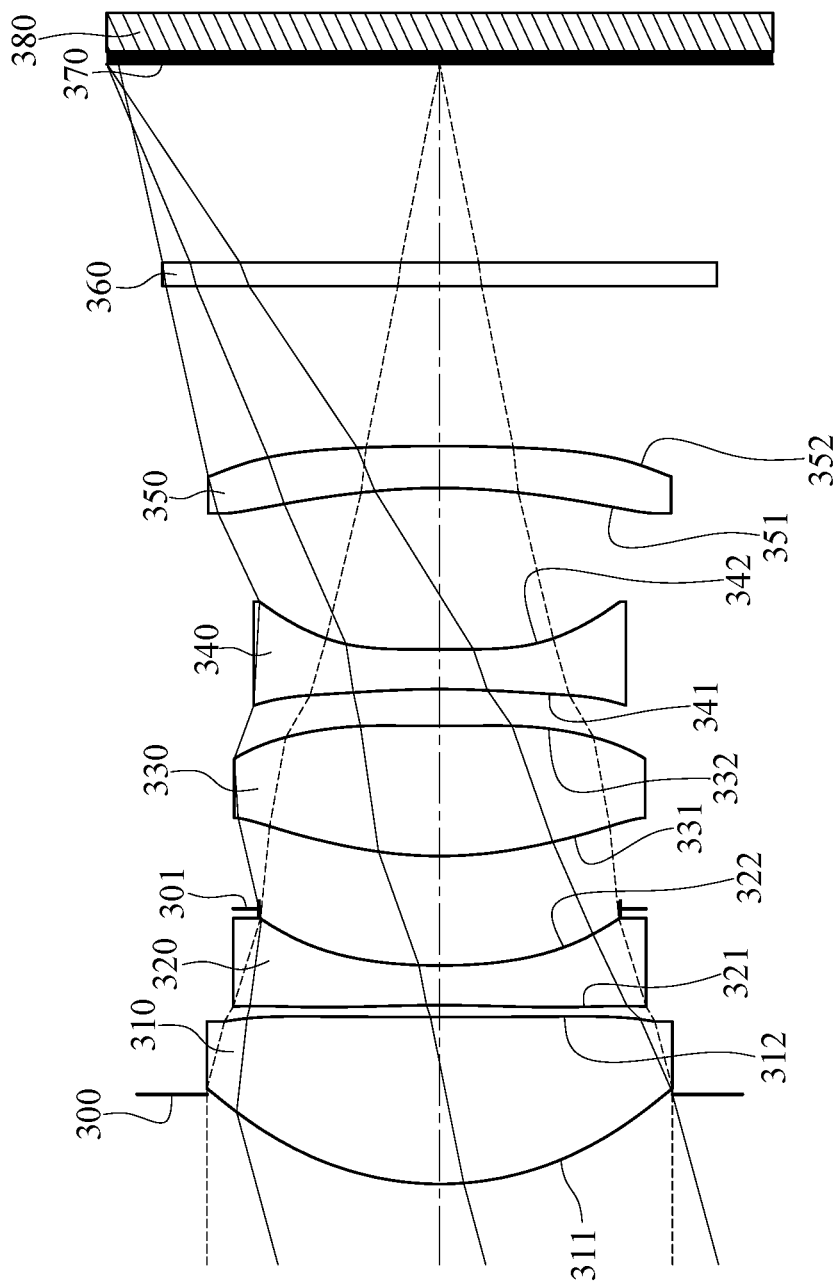
FIG. 5 is a schematic view of an image capturing unit according to the 3rd embodiment of the present disclosure.
Figure 6:
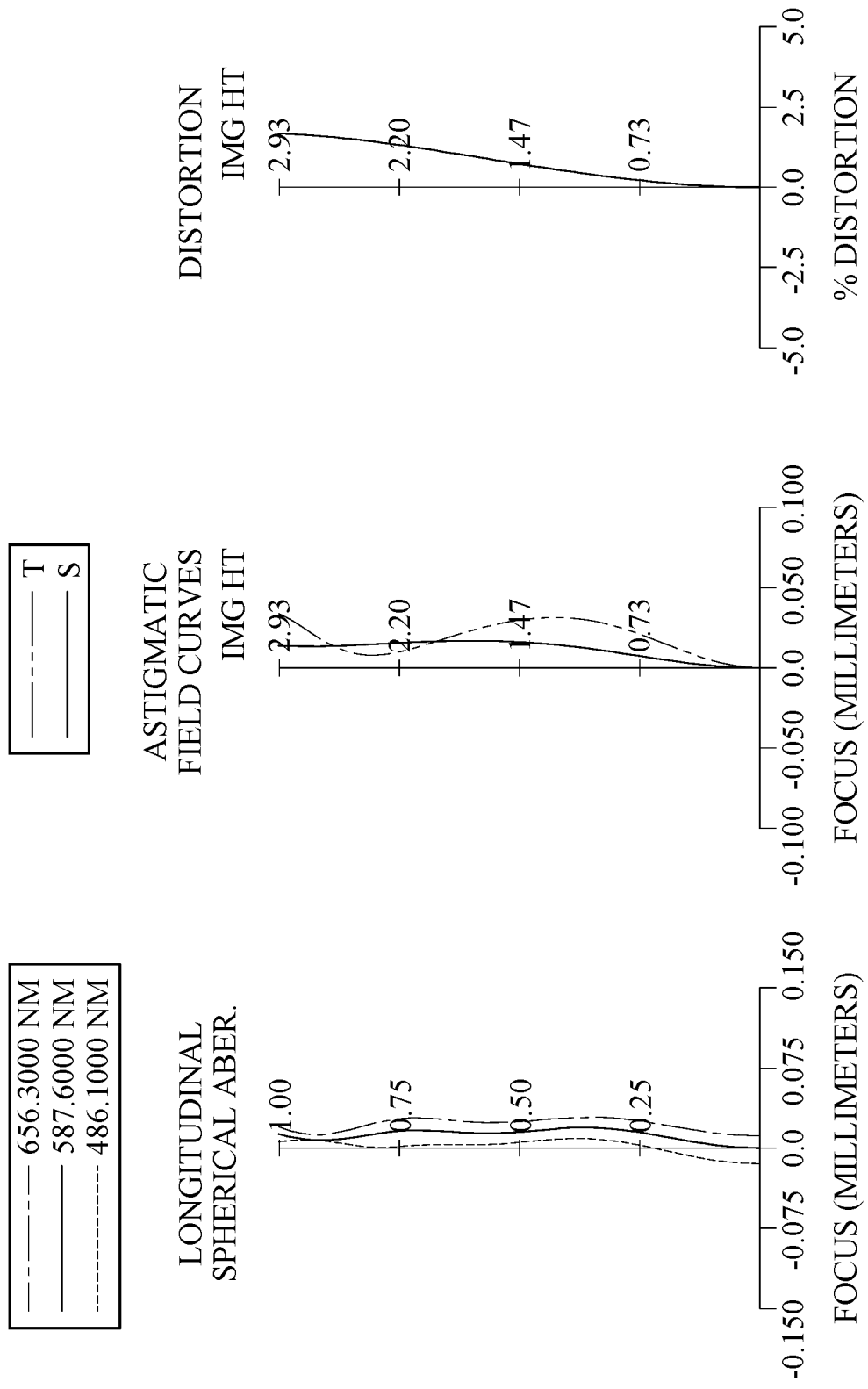
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging lens system (its reference numeral is omitted) of the present disclosure and an image sensor 380. The optical imaging lens system includes, in order from an object side to an image side, an aperture stop 300, a first lens element 310, a second lens element 320, a stop 301, a third lens element 330, a fourth lens element 340, a fifth lens element 350, a filter 360 and an image surface 370. The optical imaging lens system includes five lens elements (310, 320, 330, 340 and 350) with no additional lens element disposed between the first lens element 310 and the fifth lens element 350.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being concave in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric.

The fourth lens element 340 with negative refractive power has an object-side surface 341 being concave in a paraxial region thereof and an image-side surface 342 being concave in a paraxial region thereof. The fourth lens element 340 is made of plastic material and has the object-side surface 341 and the image-side surface 342 being both aspheric. Both the object-side surface 341 and the image-side surface 342 of the fourth lens element 340 have at least one inflection point.

The fifth lens element 350 with negative refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric. Both the object-side surface 351 and the image-side surface 352 of the fifth lens element 350 have at least one inflection point.

The filter 360 is made of glass material and located between the fifth lens element 350 and the image surface 370, and will not affect the focal length of the optical imaging lens system. The image sensor 380 is disposed on or near the image surface 370 of the optical imaging lens system.

The detailed optical data of the 3rd embodiment are shown in Table 5 and the aspheric surface data are shown in Table 6 below.

TABLE 5

3rd Embodiment
f = 10.66 mm, Fno = 2.60, HFOV = 15.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.790 | | | | |
| 2 | Lens 1 | 2.730 | (ASP) | 1.472 | Plastic | 1.545 | 56.1 | 5.11 |
| 3 | | 116.070 | (ASP) | 0.105 | | | | |
| 4 | Lens 2 | −12.093 | (ASP) | 0.350 | Plastic | 1.650 | 21.5 | −5.44 |
| 5 | | 5.065 | (ASP) | 0.500 | | | | |

TABLE 5-continued

3rd Embodiment
f = 10.66 mm, Fno = 2.60, HFOV = 15.1 deg.

| Surface # | | Curvature Radius | | Thickness | Material | Index | Abbe # | Focal Length |
|---|---|---|---|---|---|---|---|---|
| 6 | Stop | Plano | | 0.465 | | | | |
| 7 | Lens 3 | 3.596 | (ASP) | 1.147 | Plastic | 1.661 | 20.3 | 6.73 |
| 8 | | 16.427 | (ASP) | 0.325 | | | | |
| 9 | Lens 4 | −8.240 | (ASP) | 0.350 | Plastic | 1.650 | 21.5 | −11.66 |
| 10 | | 96.880 | (ASP) | 1.424 | | | | |
| 11 | Lens 5 | −5.528 | (ASP) | 0.369 | Plastic | 1.544 | 56.0 | −14.27 |
| 12 | | −19.635 | (ASP) | 1.410 | | | | |
| 13 | Filter | Plano | | 0.210 | Glass | 1.517 | 64.2 | — |
| 14 | | Plano | | 1.748 | | | | |
| 15 | Image | Plano | | — | | | | |

Note:
Reference wavelength is 587.6 nm (d-line).
An effective radius of the stop 301 (Surface 6) is 1.592 mm.

TABLE 6

Aspheric Coefficients

| Surface # | | | | |
|---|---|---|---|---|
| 2 | 3 | 4 | 5 | 7 |
| k = 1.1192E−01 | 9.9000E+01 | 3.2676E+01 | −2.6508E+00 | 2.2456E−02 |
| A4 = −2.4039E−03 | 9.0957E−04 | 3.5776E−02 | 3.7183E−02 | −1.8518E−02 |
| A6 = −1.6877E−04 | −2.4411E−03 | −1.5527E−02 | −8.5438E−03 | 2.2959E−03 |
| A8 = 1.7397E−06 | 2.5999E−03 | 8.7099E−03 | 3.2840E−03 | −1.3568E−03 |
| A10 = −1.0874E−04 | −1.4785E−03 | −3.3283E−03 | 8.0673E−04 | 2.0251E−03 |
| A12 = 3.5560E−05 | 3.0961E−04 | 5.6853E−04 | −9.4958E−04 | −8.1672E−04 |
| A14 = −4.8703E−06 | −2.1629E−05 | −2.9162E−05 | 1.6947E−04 | 9.1456E−05 |

| Surface # | | | | |
|---|---|---|---|---|
| 8 | 9 | 10 | 11 | 12 |
| k = 1.5454E+01 | −8.8330E+01 | 9.9000E+01 | −1.1384E+00 | −7.5350E+01 |
| A4 = −7.3697E−02 | −7.4618E−03 | 9.3335E−02 | 1.3864E−02 | −2.9684E−03 |
| A6 = 3.7837E−03 | 2.7355E−02 | 1.6385E−02 | −2.1183E−03 | −3.4395E−03 |
| A8 = 1.9443E−02 | −2.7695E−02 | −2.1821E−02 | −2.8341E−03 | 3.3512E−04 |
| A10 = −1.1253E−02 | 2.1637E−02 | 5.9019E−03 | 2.6159E−03 | 3.5944E−05 |
| A12 = 2.5222E−03 | −1.3512E−02 | −3.2238E−03 | −1.0303E−03 | 1.9237E−05 |
| A14 = −2.0948E−04 | 4.3687E−03 | 1.9042E−03 | 2.0047E−04 | −1.6377E−05 |
| A16 = — | −5.2847E−04 | −3.5040E−04 | −1.4683E−05 | 2.5465E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | |
|---|---|
| f [mm] | 10.66 |
| Fno | 2.60 |
| HFOV [deg.] | 15.1 |
| tan(HFOV) | 0.27 |
| V3 | 20.3 |
| (V2 + V4)/2 | 21.47 |
| V2 + V3 + V4 | 63.3 |
| CT5/T23 | 0.38 |
| |R9/R8| | 0.06 |
| |(R9 + R10)/(R9 − R10)| | 1.78 |
| [(R5 − R6) * f]/(R5 * R6) | −2.32 |
| SD/TD | 0.88 |
| Y52 * 2/EPD | 0.99 |
| Y52/Y11 | 0.99 |
| f/f3 | 1.58 |
| ImgH/f | 0.28 |

| 3rd Embodiment | | | |
|---|---|---|---|
| CT4/T34 | 1.08 | TL/f | 0.93 |
| T34/T12 | 3.10 | P2 + P4 + P5 | −3.62 |
| (T23 − T45)/(T23 + T45) | −0.19 | (P2 + P4 + P5)/P4 | 3.96 |
| ΣAT/CT3 | 2.46 | |DsR5/DsR6| | 0.65 |
| ΣAT/(T23 + BL) | 0.65 | Ymax [mm] | 2.05 |
| BL/ΣAT | 1.19 | — | — |

4th Embodiment

Figure 7:
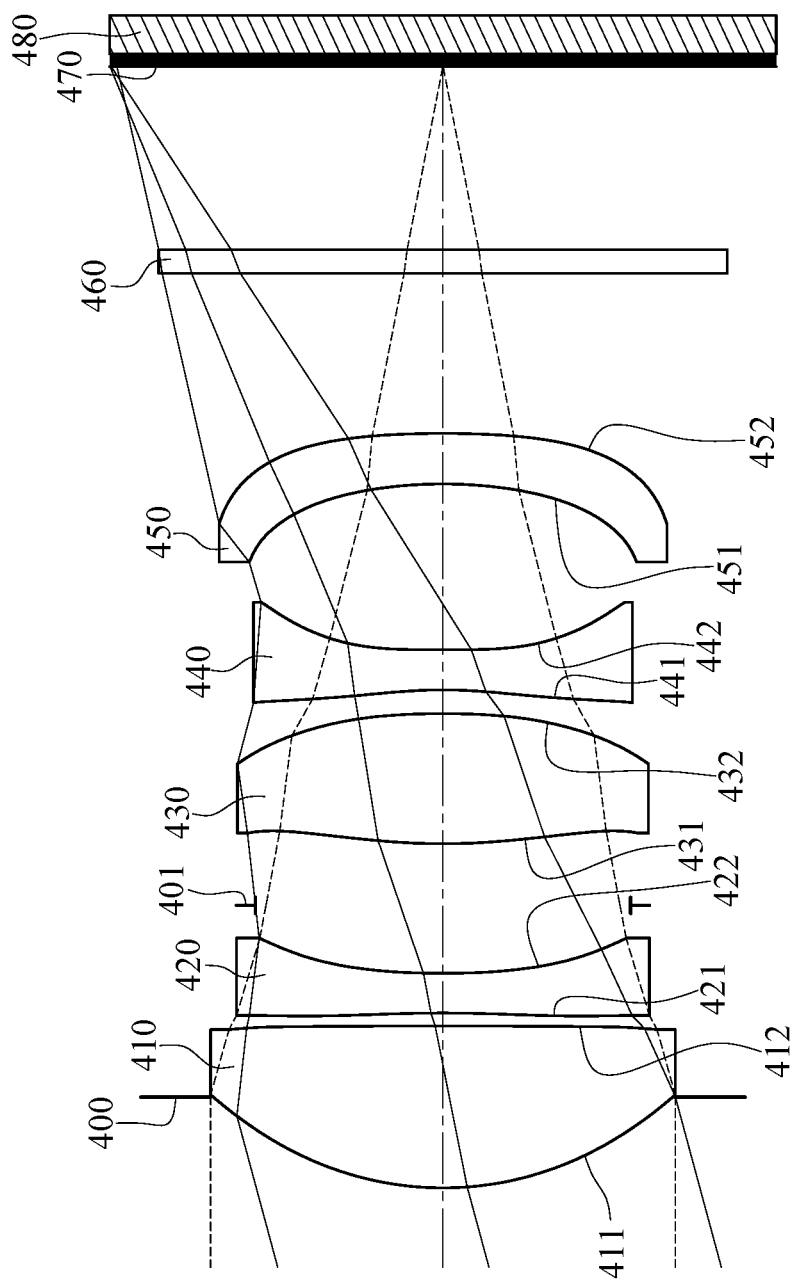
FIG. 7 is a schematic view of an image capturing unit according to the 4th embodiment of the present disclosure.
Figure 8:
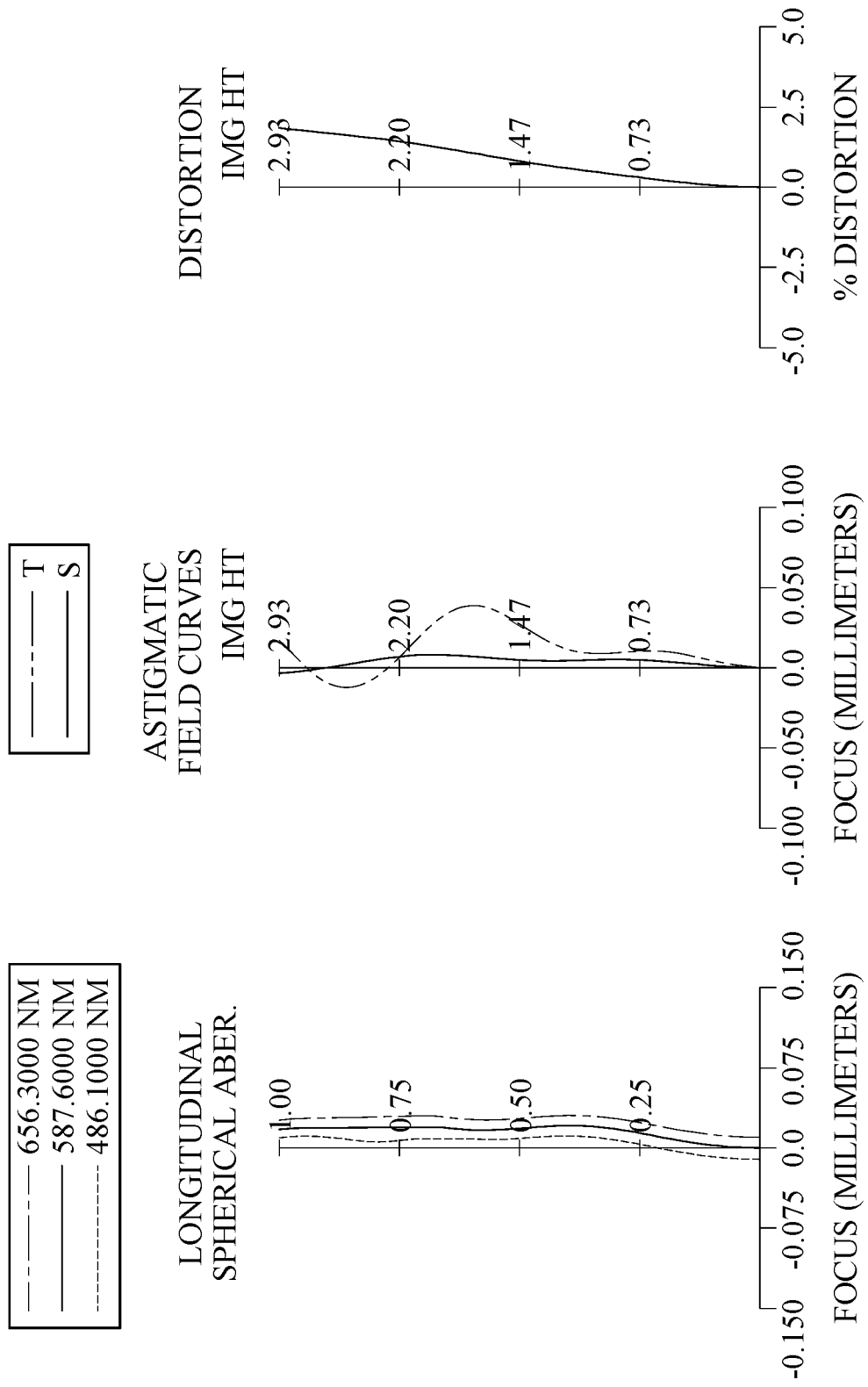
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging lens system (its reference numeral is omitted) of the present disclosure and an image sensor 480. The optical imaging lens system includes, in order from an object side to an image side, an aperture stop 400, a first lens element 410, a second lens element 420, a stop 401, a third lens element 430, a fourth lens element 440, a fifth lens element 450, a filter 460 and an image surface 470. The optical imaging lens system includes five lens elements (410, 420, 430, 440 and 450) with no additional lens element disposed between the first lens element 410 and the fifth lens element 450.

The first lens element 410 with positive refractive power has an object-side surface 411 being convex in a paraxial region thereof and an image-side surface 412 being convex in a paraxial region thereof. The first lens element 410 is made of plastic material and has the object-side surface 411 and the image-side surface 412 being both aspheric.

The second lens element 420 with negative refractive power has an object-side surface 421 being concave in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric.

The fourth lens element 440 with negative refractive power has an object-side surface 441 being concave in a paraxial region thereof and an image-side surface 442 being concave in a paraxial region thereof. The fourth lens element 440 is made of plastic material and has the object-side surface 441 and the image-side surface 442 being both aspheric. Both the object-side surface 441 and the image-side surface 442 of the fourth lens element 440 have at least one inflection point.

The fifth lens element 450 with negative refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric.

The filter 460 is made of glass material and located between the fifth lens element 450 and the image surface 470, and will not affect the focal length of the optical imaging lens system. The image sensor 480 is disposed on or near the image surface 470 of the optical imaging lens system.

The detailed optical data of the 4th embodiment are shown in Table 7 and the aspheric surface data are shown in Table 8 below.

TABLE 7

4th Embodiment
f = 10.64 mm, Fno = 2.60, HFOV = 15.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.800 | | | | |
| 2 | Lens 1 | 2.845 | (ASP) | 1.428 | Plastic | 1.545 | 56.1 | 5.07 |
| 3 | | −77.399 | (ASP) | 0.114 | | | | |
| 4 | Lens 2 | −11.514 | (ASP) | 0.350 | Plastic | 1.650 | 21.5 | −6.78 |
| 5 | | 7.232 | (ASP) | 0.600 | | | | |
| 6 | Stop | Plano | | 0.543 | | | | |
| 7 | Lens 3 | 5.576 | (ASP) | 1.147 | Plastic | 1.661 | 20.3 | 5.23 |
| 8 | | −8.330 | (ASP) | 0.210 | | | | |
| 9 | Lens 4 | −4.022 | (ASP) | 0.354 | Plastic | 1.650 | 21.5 | −5.76 |
| 10 | | 57.201 | (ASP) | 1.462 | | | | |
| 11 | Lens 5 | −4.175 | (ASP) | 0.446 | Plastic | 1.544 | 56.0 | −14.41 |
| 12 | | −9.265 | (ASP) | 1.410 | | | | |
| 13 | Filter | Plano | | 0.210 | Glass | 1.517 | 64.2 | — |
| 14 | | Plano | | 1.615 | | | | |
| 15 | Image | Plano | | — | | | | |

Note:
Reference wavelength is 587.6 nm (d-line).
An effective radius of the stop 401 (Surface 6) is 1.652 mm.

TABLE 8

Aspheric Coefficients

| | Surface # | | | | |
|---|---|---|---|---|---|
| | 2 | 3 | 4 | 5 | 7 |
| k = | 1.3055E−01 | −9.9000E+01 | 2.2373E+01 | −1.5381E+01 | −2.4334E+00 |
| A4 = | −1.7456E−03 | 5.6829E−03 | 2.7893E−02 | 2.8517E−02 | −1.7864E−02 |
| A6 = | 1.5490E−04 | −4.8483E−03 | −1.0592E−02 | −4.7839E−03 | 2.8872E−03 |
| A8 = | −2.6536E−04 | 2.3540E−03 | 4.9360E−03 | 1.7526E−03 | −3.0046E−03 |
| A10 = | 3.2931E−05 | −5.3228E−04 | −1.1786E−03 | 7.3012E−04 | 2.6509E−03 |
| A12 = | 2.7701E−06 | −4.8238E−06 | 7.3310E−06 | −7.3245E−04 | −1.1357E−03 |
| A14 = | −1.3683E−06 | 1.0156E−05 | 2.2380E−05 | 1.2962E−04 | 1.5606E−04 |

TABLE 8-continued

Aspheric Coefficients

| Surface # | | | | |
|---|---|---|---|---|
| 8 | 9 | 10 | 11 | 12 |
| k = −9.9000E+01 | −4.8049E+01 | −9.9000E+01 | 4.4010E+00 | 1.9381E+01 |
| A4 = −7.5631E−02 | −7.3537E−03 | 1.3057E−01 | −1.1383E−02 | −1.6587E−02 |
| A6 = 3.7874E−02 | 6.6338E−02 | −3.7850E−02 | 3.7220E−02 | 1.0011E−02 |
| A8 = −1.2384E−02 | −8.4519E−02 | −5.4509E−03 | −7.0828E−02 | −1.7604E−02 |
| A10 = 1.8004E−03 | 5.7729E−02 | 9.1511E−03 | 6.5383E−02 | 1.2965E−02 |
| A12 = −5.2570E−05 | −2.3587E−02 | −3.6534E−03 | −3.3398E−02 | −5.2242E−03 |
| A14 = −8.4016E−06 | 5.3967E−03 | 9.9616E−04 | 8.9300E−03 | 1.0920E−03 |
| A16 = — | −5.2856E−04 | −1.5587E−04 | −9.8021E−04 | −9.4178E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 10.64 | |R9/R8| | 0.07 |
| Fno | 2.60 | |(R9 + R10)/(R9 − R10)| | 2.64 |
| HFOV [deg.] | 15.1 | [(R5 − R6) * f]/(R5 * R6) | −3.19 |
| tan(HFOV) | 0.27 | SD/TD | 0.88 |
| V3 | 20.3 | Y52 * 2/EPD | 0.96 |
| (V2 + V4)/2 | 21.47 | Y52/Y11 | 0.96 |
| V2 + V3 + V4 | 63.3 | f/f3 | 2.04 |
| CT5/T23 | 0.39 | ImgH/f | 0.28 |
| CT4/T34 | 1.69 | TL/f | 0.93 |
| T34/T12 | 1.84 | P2 + P4 + P5 | −4.15 |
| (T23 − T45)/(T23 + T45) | −0.12 | (P2 + P4 + P5)/P4 | 2.25 |
| ΣAT/CT3 | 2.55 | |DsR5/DsR6| | 0.66 |
| ΣAT/(T23 + BL) | 0.67 | Ymax [mm] | 2.05 |
| BL/ΣAT | 1.10 | — | — |

5th Embodiment

Figure 9:
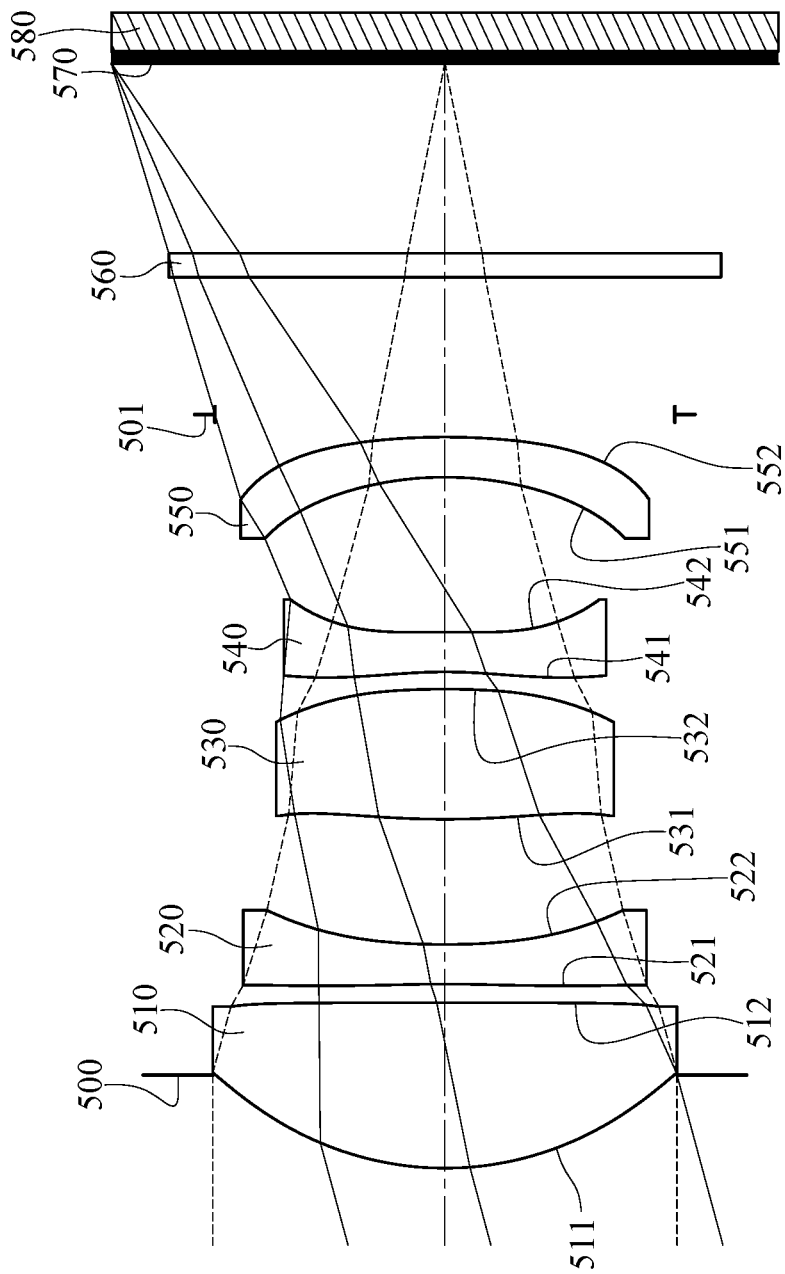
FIG. 9 is a schematic view of an image capturing unit according to the 5th embodiment of the present disclosure.
Figure 10:
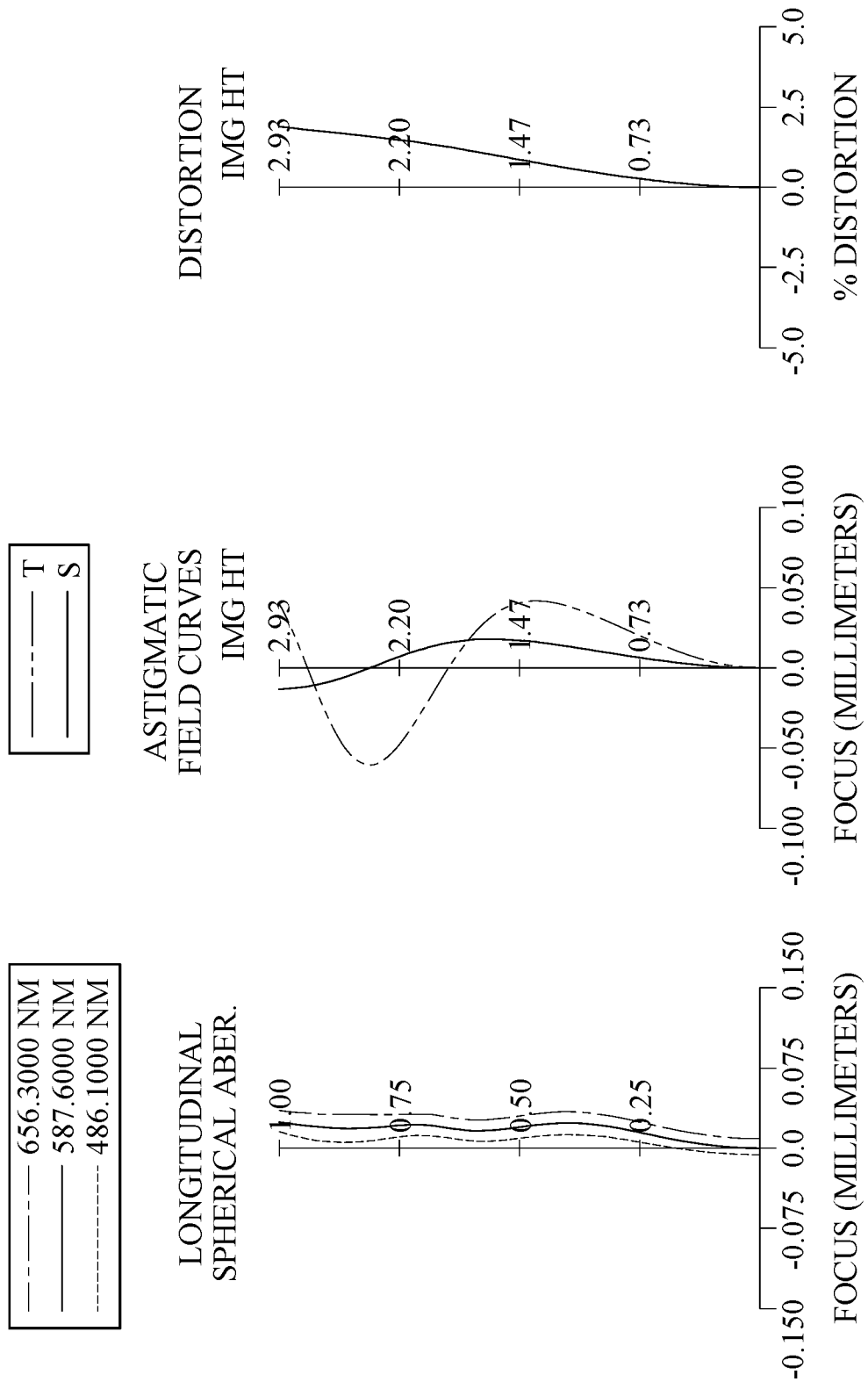
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging lens system (its reference numeral is omitted) of the present disclosure and an image sensor 580. The optical imaging lens system includes, in order from an object side to an image side, an aperture stop 500, a first lens element 510, a second lens element 520, a third lens element 530, a fourth lens element 540, a fifth lens element 550, a stop 501, a filter 560 and an image surface 570. The optical imaging lens system includes five lens elements (510, 520, 530, 540 and 550) with no additional lens element disposed between the first lens element 510 and the fifth lens element 550.

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric.

The second lens element 520 with negative refractive power has an object-side surface 521 being concave in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric.

The fourth lens element 540 with negative refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric. Both the object-side surface 541 and the image-side surface 542 of the fourth lens element 540 have at least one inflection point.

The fifth lens element 550 with negative refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric.

The filter 560 is made of glass material and located between the fifth lens element 550 and the image surface 570, and will not affect the focal length of the optical imaging lens system. The image sensor 580 is disposed on or near the image surface 570 of the optical imaging lens system.

The detailed optical data of the 5th embodiment are shown in Table 9 and the aspheric surface data are shown in Table 10 below.

TABLE 9

5th Embodiment
f = 10.63 mm, Fno = 2.60, HFOV = 15.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.822 | | | | |
| 2 | Lens 1 | 2.777 | (ASP) | 1.460 | Plastic | 1.545 | 56.1 | 4.90 |
| 3 | | −56.414 | (ASP) | 0.163 | | | | |
| 4 | Lens 2 | −12.212 | (ASP) | 0.350 | Plastic | 1.650 | 21.5 | −6.70 |
| 5 | | 6.857 | (ASP) | 1.104 | | | | |
| 6 | Lens 3 | 7.505 | (ASP) | 1.147 | Plastic | 1.661 | 20.3 | 6.06 |
| 7 | | −8.063 | (ASP) | 0.152 | | | | |
| 8 | Lens 4 | −4.297 | (ASP) | 0.350 | Plastic | 1.650 | 21.5 | −7.79 |
| 9 | | −29.279 | (ASP) | 1.368 | | | | |
| 10 | Lens 5 | −2.945 | (ASP) | 0.353 | Plastic | 1.544 | 56.0 | −10.75 |
| 11 | | −6.183 | (ASP) | 0.200 | | | | |
| 12 | Stop | Plano | | 1.210 | | | | |
| 13 | Filter | Plano | | 0.210 | Glass | 1.517 | 64.2 | — |
| 14 | | Plano | | 1.670 | | | | |
| 15 | Image | Plano | | — | | | | |

Note:
Reference wavelength is 587.6 nm (d-line).
An effective radius of the stop 501 (Surface 12) is 2.026 mm.

TABLE 10

Aspheric Coefficients

| | Surface # | | | | |
|---|---|---|---|---|---|
| | 2 | 3 | 4 | 5 | 6 |
| k = | 1.0085E−01 | −8.8285E+01 | 1.8008E+01 | −1.2653E+01 | −1.2999E+01 |
| A4 = | −1.6373E−03 | 1.5529E−02 | 4.9104E−02 | 4.4573E−02 | −1.2690E−02 |
| A6 = | −2.5578E−04 | −1.4081E−02 | −3.4273E−02 | −1.8800E−02 | −2.0317E−03 |
| A8 = | 2.1467E−04 | 5.6798E−03 | 1.5477E−02 | 4.5619E−03 | −4.7841E−03 |
| A10 = | −2.1877E−04 | −9.1757E−04 | −3.4125E−03 | 2.2085E−03 | 4.4446E−03 |
| A12 = | 6.7100E−05 | −3.0022E−05 | 1.9087E−04 | −1.5980E−03 | −1.7841E−03 |
| A14 = | −7.9093E−06 | 1.4775E−05 | 2.2587E−05 | 2.5802E−04 | 2.4215E−04 |

| | Surface # | | | | |
|---|---|---|---|---|---|
| | 7 | 8 | 9 | 10 | 11 |
| k = | −1.4014E+01 | −3.5382E+01 | 4.0736E+01 | 1.3090E+00 | 9.6966E+00 |
| A4 = | −4.7043E−02 | 4.8117E−02 | 1.4355E−01 | 1.8383E−02 | 3.7337E−03 |
| A6 = | −8.2687E−03 | 5.0751E−03 | −6.7256E−03 | −6.5361E−03 | −1.1946E−02 |
| A8 = | 2.2468E−02 | −5.2636E−02 | −7.5732E−02 | −8.1590E−03 | 5.7353E−03 |
| A10 = | −1.2730E−02 | 6.4163E−02 | 9.4516E−02 | 9.8842E−03 | −2.8746E−03 |
| A12 = | 3.1254E−03 | −3.7305E−02 | −5.8658E−02 | −4.9333E−03 | 1.1103E−03 |
| A14 = | −2.9320E−04 | 1.0700E−02 | 1.8878E−02 | 1.2040E−03 | −2.5463E−04 |
| A16 = | — | −1.2133E−03 | −2.4621E−03 | −1.2283E−04 | 2.3203E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 10.63 | \|R9/R8\| | 0.10 |
| Fno | 2.60 | \|(R9 + R10)/(R9 − R10)\| | 2.82 |
| HFOV [deg.] | 15.1 | [(R5 − R6) * f]/(R5 * R6) | −2.74 |
| tan(HFOV) | 0.27 | SD/TD | 0.87 |
| V3 | 20.3 | Y52 * 2/EPD | 0.88 |
| (V2 + V4)/2 | 21.47 | Y52/Y11 | 0.88 |
| V2 + V3 + V4 | 63.3 | f/f3 | 1.75 |
| CT5/T23 | 0.32 | ImgH/f | 0.28 |
| CT4/T34 | 2.30 | TL/f | 0.92 |
| T34/T12 | 0.93 | P2 + P4 + P5 | −3.94 |
| (T23 − T45)/(T23 + T45) | −0.11 | (P2 + P4 + P5)/P4 | 2.89 |
| | | \|DsR5/DsR6\| | 0.66 |
| ΣAT/CT3 | 2.43 | Ymax [mm] | 2.05 |
| ΣAT/(T23 + BL) | 0.63 | — | — |
| BL/ΣAT | 1.18 | | |

6th Embodiment

Figure 11:
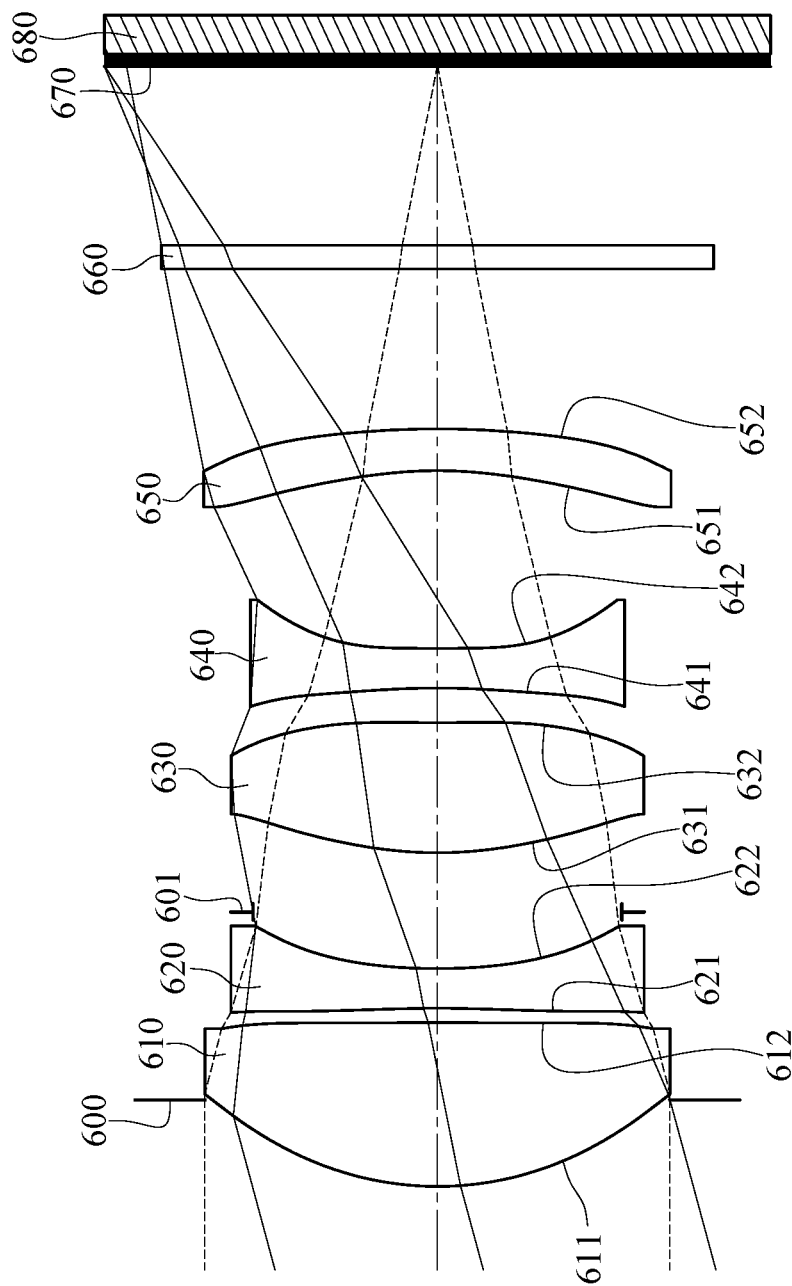
FIG. 11 is a schematic view of an image capturing unit according to the 6th embodiment of the present disclosure.
Figure 12:
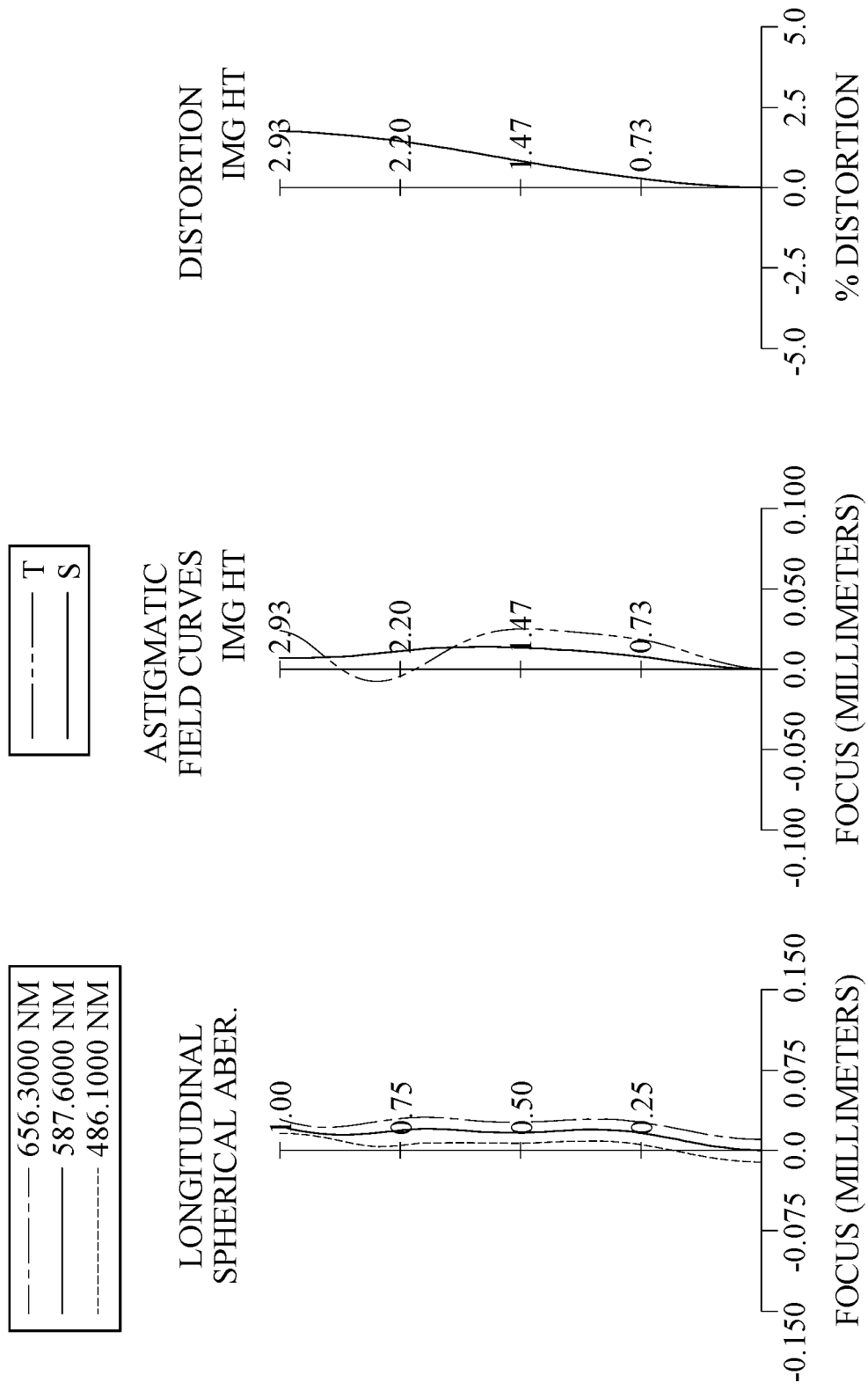
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging lens system (its reference numeral is omitted) of the present disclosure and an image sensor 680. The optical imaging lens system includes, in order from an object side to an image side, an aperture stop 600, a first lens element 610, a second lens element 620, a stop 601, a third lens element 630, a fourth lens element 640, a fifth lens element 650, a filter 660 and an image surface 670. The optical imaging lens system includes five lens elements (610, 620, 630, 640 and 650) with no additional lens element disposed between the first lens element 610 and the fifth lens element 650.

The first lens element 610 with positive refractive power has an object-side surface 611 being convex in a paraxial region thereof and an image-side surface 612 being convex in a paraxial region thereof. The first lens element 610 is made of plastic material and has the object-side surface 611 and the image-side surface 612 being both aspheric.

The second lens element 620 with negative refractive power has an object-side surface 621 being concave in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric.

The fourth lens element 640 with negative refractive power has an object-side surface 641 being concave in a paraxial region thereof and an image-side surface 642 being concave in a paraxial region thereof. The fourth lens element 640 is made of plastic material and has the object-side surface 641 and the image-side surface 642 being both aspheric. The image-side surface 642 of the fourth lens element 640 has at least one inflection point.

The fifth lens element 650 with negative refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric. Both the object-side surface 651 and the image-side surface 652 of the fifth lens element 650 have at least one inflection point.

The filter 660 is made of glass material and located between the fifth lens element 650 and the image surface 670, and will not affect the focal length of the optical imaging lens system. The image sensor 680 is disposed on or near the image surface 670 of the optical imaging lens system.

The detailed optical data of the 6th embodiment are shown in Table 11 and the aspheric surface data are shown in Table 12 below.

TABLE 11

6th Embodiment
f = 10.65 mm, Fno = 2.60, HFOV = 15.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.762 | | | | |
| 2 | Lens 1 | 2.815 | (ASP) | 1.444 | Plastic | 1.545 | 56.1 | 5.05 |
| 3 | | −100.000 | (ASP) | 0.127 | | | | |
| 4 | Lens 2 | −11.298 | (ASP) | 0.350 | Plastic | 1.650 | 21.5 | −5.54 |
| 5 | | 5.352 | (ASP) | 0.500 | | | | |
| 6 | Stop | Plano | | 0.522 | | | | |
| 7 | Lens 3 | 3.596 | (ASP) | 1.147 | Plastic | 1.661 | 20.3 | 6.40 |
| 8 | | 21.072 | (ASP) | 0.305 | | | | |
| 9 | Lens 4 | −6.687 | (ASP) | 0.350 | Plastic | 1.650 | 21.5 | −9.62 |
| 10 | | 100.000 | (ASP) | 1.567 | | | | |
| 11 | Lens 5 | −3.784 | (ASP) | 0.369 | Plastic | 1.544 | 56.0 | −14.73 |
| 12 | | −7.418 | (ASP) | 1.410 | | | | |
| 13 | Filter | Plano | | 0.210 | Glass | 1.517 | 64.2 | — |
| 14 | | Plano | | 1.576 | | | | |
| 15 | Image | Plano | | — | | | | |

Note:
Reference wavelength is 587.6 nm (d-line).
An effective radius of the stop 601 (Surface 6) is 1.624 mm.

TABLE 12

Aspheric Coefficients

| Surface # | 2 | 3 | 4 | 5 | 7 |
|---|---|---|---|---|---|
| k = | 1.1423E−01 | −9.9000E+01 | 2.6036E+01 | −8.3070E+00 | 8.8027E−02 |
| A4 = | −1.6866E−03 | 8.0709E−03 | 3.1773E−02 | 2.9646E−02 | −1.7960E−02 |
| A6 = | −2.7196E−04 | −8.9250E−03 | −1.5896E−02 | −5.1749E−02 | 2.6060E−03 |
| A8 = | 3.8999E−05 | 5.8174E−03 | 1.0151E−02 | 4.1801E−03 | −8.5209E−04 |
| A10 = | −1.1163E−04 | −2.2895E−03 | −4.0265E−03 | −1.0770E−03 | 1.3589E−03 |
| A12 = | 3.6237E−05 | 4.1122E−04 | 7.2383E−04 | −2.0363E−04 | −6.0964E−04 |
| A14 = | −4.8056E−06 | −2.6927E−05 | −4.3800E−05 | 7.2916E−05 | 7.1742E−05 |

| Surface # | 8 | 9 | 10 | 11 | 12 |
|---|---|---|---|---|---|
| k = | 7.1458E+01 | −6.8802E+01 | −9.9000E+01 | −3.7126E+00 | −9.9000E+01 |
| A4 = | −6.5719E−02 | 6.0341E−03 | 1.0802E−01 | 2.6427E−02 | −1.2072E−02 |
| A6 = | −5.7726E−04 | 8.4751E−03 | −1.4390E−02 | −1.3575E−02 | 5.8496E−03 |
| A8 = | 2.0246E−02 | −2.0185E−02 | −1.9600E−02 | 4.2795E−03 | −5.4540E−03 |
| A10 = | −1.1223E−02 | 2.0883E−02 | 1.1567E−02 | −1.0931E−03 | 2.1381E−03 |
| A12 = | 2.4997E−03 | −1.3145E−02 | −6.0163E−03 | 2.3963E−04 | −4.3621E−04 |
| A14 = | −2.0789E−04 | 4.0944E−03 | 2.3090E−03 | −3.5102E−05 | 3.9671E−05 |
| A16 = | — | −4.8260E−04 | −3.5758E−04 | 3.0120E−06 | −6.3329E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 10.65 | |R9/R8| | 0.04 |
| Fno | 2.60 | |(R9 + R10)/(R9 − R10)| | 3.08 |
| HFOV [deg.] | 15.1 | [(R5 − R6) * f]/(R5 * R6) | −2.46 |
| tan(HFOV) | 0.27 | SD/TD | 0.89 |
| V3 | 20.3 | Y52 * 2/EPD | 1.00 |
| (V2 + V4)/2 | 21.47 | Y52/Y11 | 1.00 |
| V2 + V3 + V4 | 63.3 | f/f3 | 1.67 |
| CT5/T23 | 0.36 | ImgH/f | 0.28 |
| CT4/T34 | 1.15 | TL/f | 0.93 |
| T34/T12 | 2.40 | P2 + P4 + P5 | −3.75 |
| (T23 − T45)/(T23 + T45) | −0.21 | (P2 + P4 + P5)/P4 | 3.39 |
| ΣAT/CT3 | 2.63 | |DsR5/DsR6| | 0.66 |
| ΣAT/(T23 + BL) | 0.72 | Ymax [mm] | 2.06 |
| BL/ΣAT | 1.06 | — | — |

7th Embodiment

Figure 13:
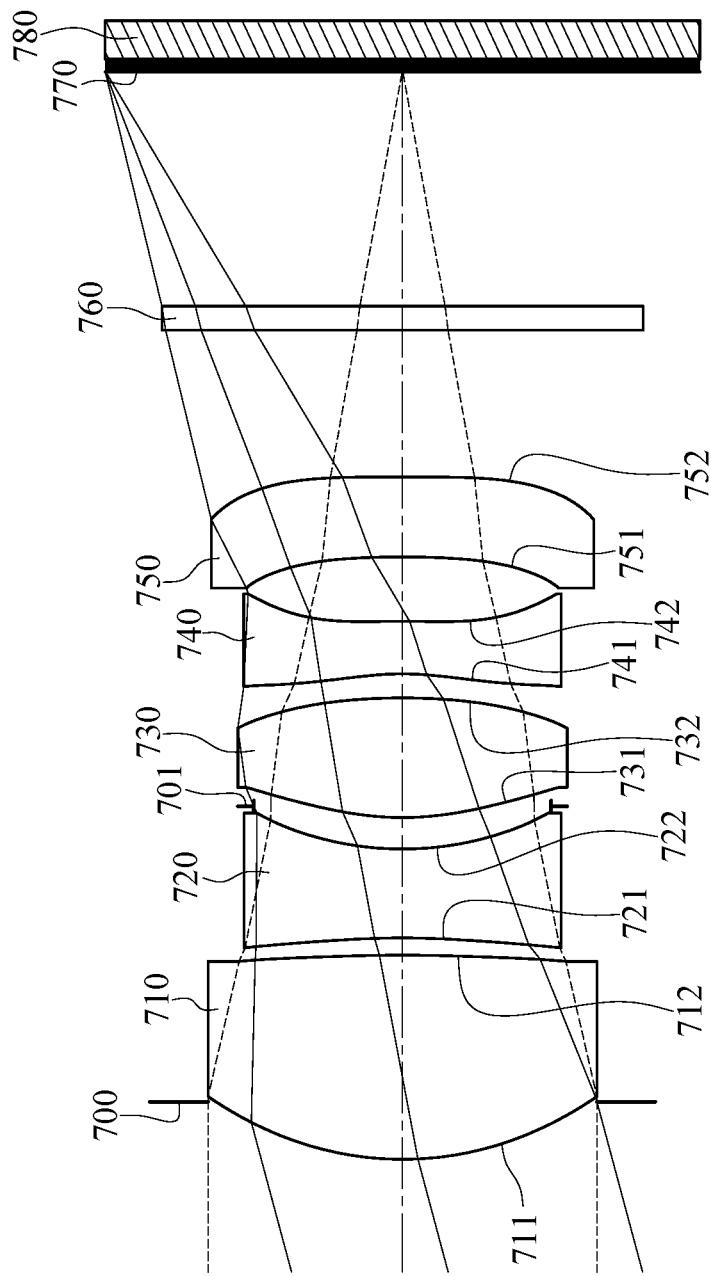
FIG. 13 a schematic view of an image capturing unit according to the 7th embodiment of the present disclosure.
Figure 14:
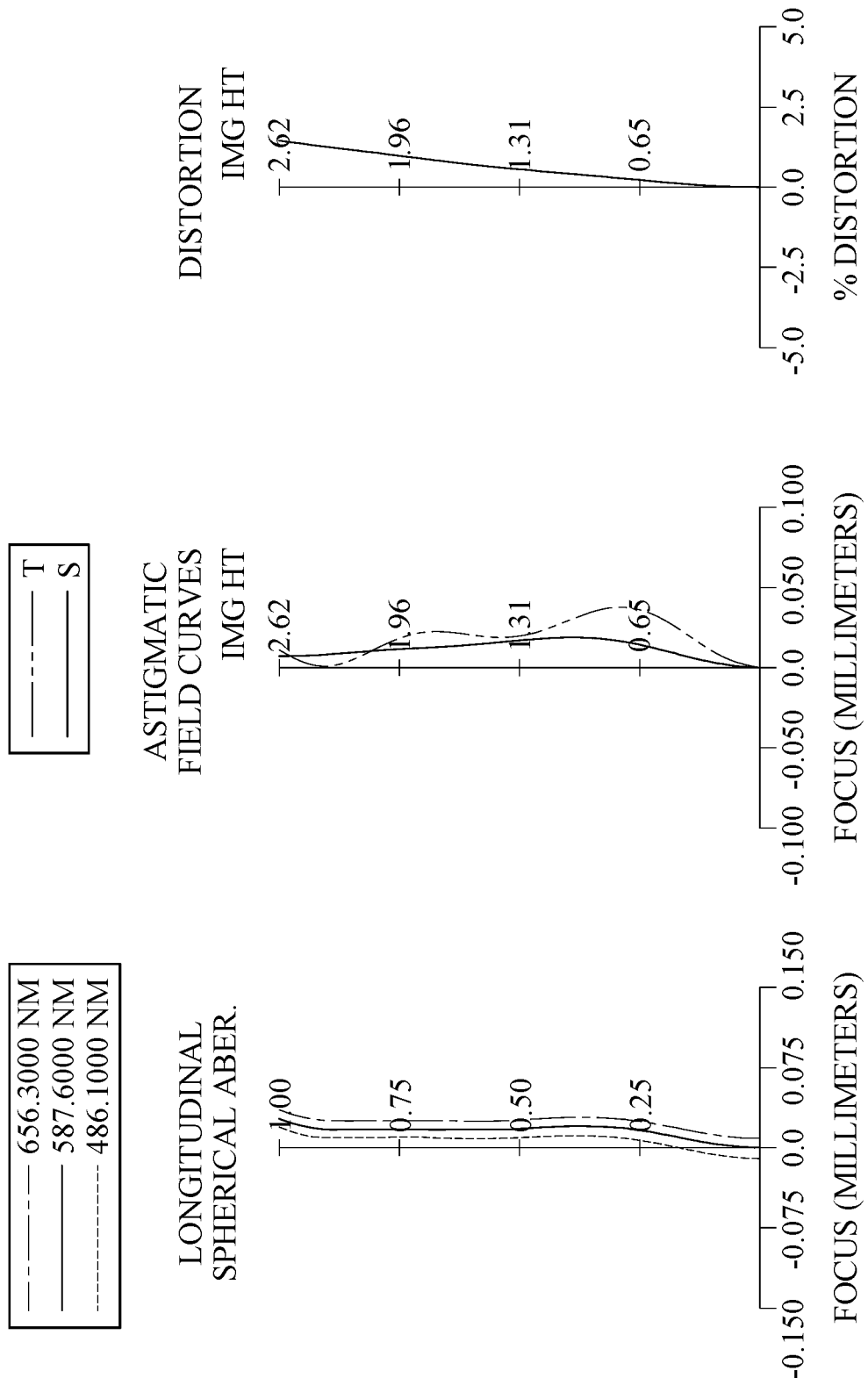
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging lens system (its reference numeral is omitted) of the present disclosure and an image sensor 780. The optical imaging lens system includes, in order from an object side to an image side, an aperture stop 700, a first lens element 710, a second lens element 720, a stop 701, a third lens element 730, a fourth lens element 740, a fifth lens element 750, a filter 760 and an image surface 770. The optical imaging lens system includes five lens elements (710, 720, 730, 740 and 750) with no additional lens element disposed between the first lens element 710 and the fifth lens element 750.

The first lens element 710 with positive refractive power has an object-side surface 711 being convex in a paraxial region thereof and an image-side surface 712 being convex in a paraxial region thereof. The first lens element 710 is made of plastic material and has the object-side surface 711 and the image-side surface 712 being both aspheric.

The second lens element 720 with negative refractive power has an object-side surface 721 being concave in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric.

The fourth lens element 740 with negative refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric. Both the object-side surface 741 and the image-side surface 742 of the fourth lens element 740 have at least one inflection point.

The fifth lens element 750 with negative refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric.

The filter 760 is made of glass material and located between the fifth lens element 750 and the image surface 770, and will not affect the focal length of the optical imaging lens system. The image sensor 780 is disposed on or near the image surface 770 of the optical imaging lens system.

The detailed optical data of the 7th embodiment are shown in Table 13 and the aspheric surface data are shown in Table 14 below.

TABLE 13

7th Embodiment
f = 9.59 mm, Fno = 2.80, HFOV = 15.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.507 | | | | |
| 2 | Lens 1 | 2.833 | (ASP) | 1.800 | Plastic | 1.545 | 56.1 | 4.44 |
| 3 | | −12.825 | (ASP) | 0.152 | | | | |
| 4 | Lens 2 | −6.882 | (ASP) | 0.784 | Plastic | 1.650 | 21.5 | −2.93 |
| 5 | | 2.751 | (ASP) | 0.378 | | | | |
| 6 | Stop | Plano | | −0.100 | | | | |
| 7 | Lens 3 | 2.608 | (ASP) | 1.055 | Plastic | 1.661 | 20.3 | 2.80 |
| 8 | | −5.325 | (ASP) | 0.212 | | | | |
| 9 | Lens 4 | −2.512 | (ASP) | 0.463 | Plastic | 1.661 | 20.3 | −4.94 |
| 10 | | −11.760 | (ASP) | 0.568 | | | | |
| 11 | Lens 5 | −8.702 | (ASP) | 0.705 | Plastic | 1.544 | 56.0 | −16.74 |
| 12 | | −200.000 | (ASP) | 1.296 | | | | |
| 13 | Filter | Plano | | 0.210 | Glass | 1.517 | 64.2 | — |
| 14 | | Plano | | 2.067 | | | | |
| 15 | Image | Plano | | — | | | | |

Note:
Reference wavelength is 587.6 nm (d-line).
An effective radius of the stop 701 (Surface 6) is 1.309 mm.

TABLE 14

Aspheric Coefficients

| | Surface # | | | | |
|---|---|---|---|---|---|
| | 2 | 3 | 4 | 5 | 7 |
| k = | 1.0977E−01 | −9.9000E+01 | 1.2786E+01 | −1.0111E+01 | −5.8464E+00 |
| A4 = | −1.8577E−03 | 2.1274E−02 | 4.6530E−02 | 5.0047E−02 | −5.0344E−03 |
| A6 = | −5.0615E−04 | −2.0590E−02 | −3.1468E−02 | −2.4214E−02 | −1.9332E−03 |
| A8 = | 7.6452E−05 | 1.0844E−02 | 1.8955E−02 | 1.4457E−02 | −2.4973E−03 |
| A10 = | −7.0711E−05 | −4.3536E−03 | −7.7852E−03 | −2.2696E−03 | 2.1585E−03 |
| A12 = | 1.7927E−05 | 1.1390E−03 | 1.9417E−03 | −5.0344E−04 | 1.1041E−03 |
| A14 = | −2.2843E−06 | −1.3220E−04 | −2.0365E−04 | 3.2834E−05 | −7.0965E−04 |

| | Surface # | | | | |
|---|---|---|---|---|---|
| | 8 | 9 | 10 | 11 | 12 |
| k = | −9.9000E+01 | −1.7855E+01 | 5.1400E+01 | 2.4796E+01 | 9.9000E+01 |
| A4 = | −7.4083E−02 | 8.2239E−02 | 2.0057E−01 | −2.8513E−02 | −4.4281E−02 |
| A6 = | 6.7875E−02 | −3.7149E−02 | −1.1926E−01 | 4.4313E−03 | 1.1817E−03 |
| A8 = | −8.1614E−02 | −1.2474E−02 | 9.0324E−02 | −4.0148E−02 | 3.4416E−03 |
| A10 = | 6.0252E−02 | 1.5056E−02 | −8.5890E−02 | 7.1412E−02 | −3.4632E−03 |
| A12 = | −2.1699E−02 | 6.1341E−03 | 6.6129E−02 | −6.3208E−02 | 1.3159E−03 |
| A14 = | 2.8953E−03 | −8.7437E−03 | −2.7788E−02 | 2.8417E−02 | −2.1773E−04 |
| A16 = | — | 2.0515E−03 | 4.5595E−03 | −5.1721E−03 | 2.9690E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 9.59 | |R9/R8| | 0.74 |
| Fno | 2.80 | |(R9 + R10)/(R9 − R10)| | 1.09 |
| HFOV [deg.] | 15.0 | [(R5 − R6) * f]/(R5 * R6) | −5.48 |
| tan(HFOV) | 0.27 | SD/TD | 0.92 |
| V3 | 20.3 | Y52 * 2/EPD | 0.98 |
| (V2 + V4)/2 | 20.91 | Y52/Y11 | 0.98 |
| V2 + V3 + V4 | 62.2 | f/f3 | 3.43 |
| CT5/T23 | 2.54 | ImgH/f | 0.27 |
| CT4/T34 | 2.18 | TL/f | 1.00 |
| T34/T12 | 1.39 | P2 + P4 + P5 | −5.79 |
| (T23 − T45)/ (T23 + T45) | −0.34 | (P2 + P4 + P5)/P4 | 2.98 |
| | | |DsR5/DsR6| | 0.70 |
| ΣAT/CT3 | 1.15 | Ymax [mm] | 1.71 |
| ΣAT/(T23 + BL) | 0.31 | — | — |
| BL/ΣAT | 2.95 | | |

8th Embodiment

Figure 15:
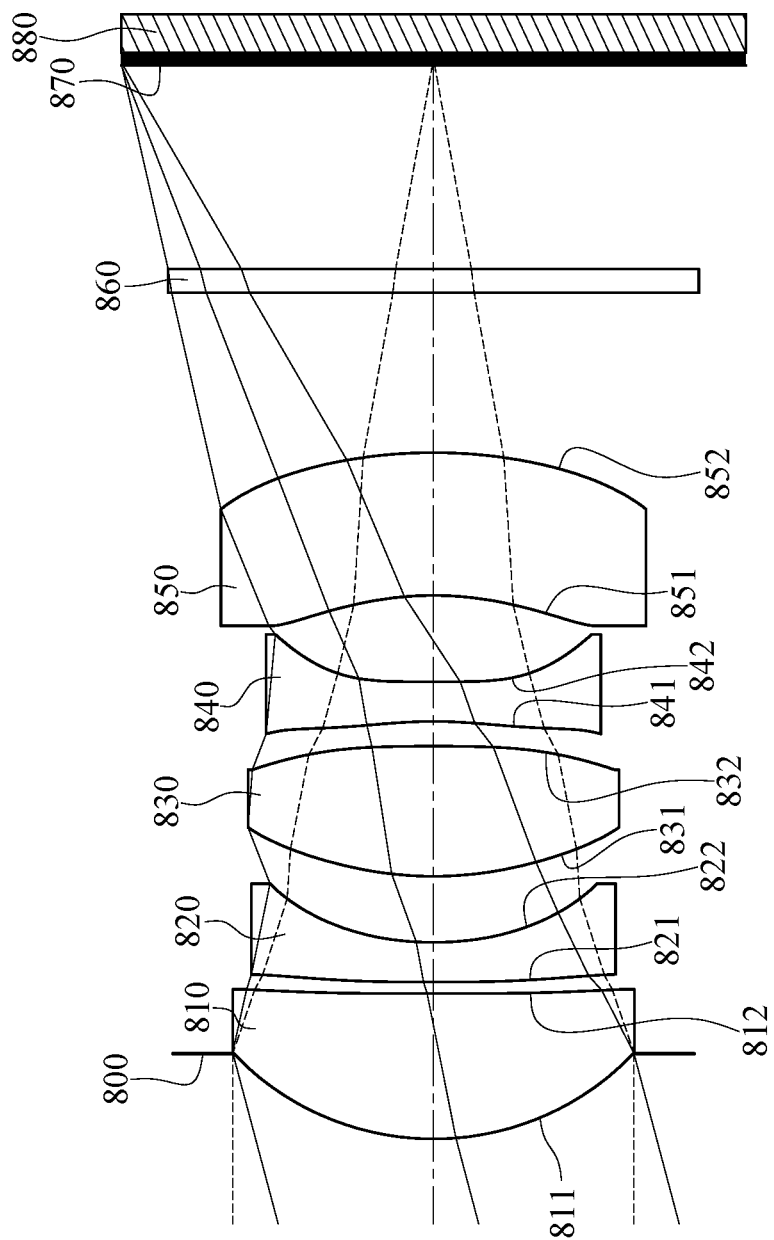
FIG. 15 a schematic view of an image capturing unit according to the 8th embodiment of the present disclosure.
Figure 16:
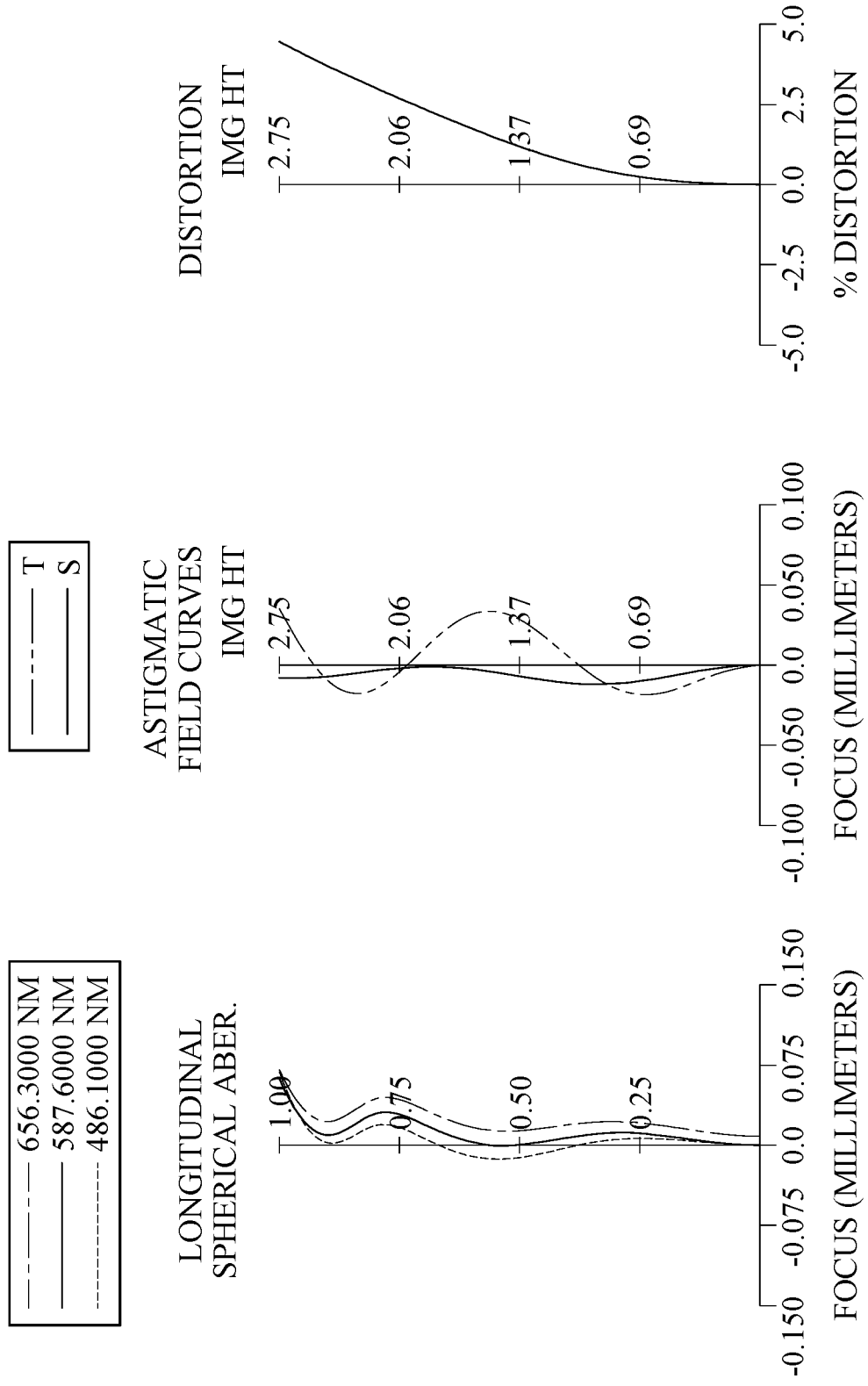
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical imaging lens system (its reference numeral is omitted) of the present disclosure and an image sensor 880. The optical imaging lens system includes, in order from an object side to an image side, an aperture stop 800, a first lens element 810, a second lens element 820, a third lens element 830, a fourth lens element 840, a fifth lens element 850, a filter 860, and an image surface 870. The optical imaging lens system includes five lens elements (810, 820, 830, 840 and 850) with no additional lens element disposed between the first lens element 810 and the fifth lens element 850.

The first lens element 810 with positive refractive power has an object-side surface 811 being convex in a paraxial region thereof and an image-side surface 812 being convex in a paraxial region thereof. The first lens element 810 is made of plastic material and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric.

The fourth lens element 840 with negative refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric. Both the object-side surface 841 and the image-side surface 842 of the fourth lens element 840 have at least one inflection point.

The fifth lens element 850 with negative refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric. The object-side surface 851 of the fifth lens element 850 has at least one inflection point.

The filter 860 is made of glass material and located between the fifth lens element 850 and the image surface 870, and will not affect the focal length of the optical imaging lens system. The image sensor 880 is disposed on or near the image surface 870 of the optical imaging lens system.

The detailed optical data of the 8th embodiment are shown in Table 15 and the aspheric surface data are shown in Table 16 below.

TABLE 15

8th Embodiment
f = 9.89 mm, Fno = 2.80, HFOV = 14.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.751 | | | | |
| 2 | Lens 1 | 2.442 | (ASP) | 1.283 | Plastic | 1.545 | 56.1 | 4.39 |
| 3 | | −90.909 | (ASP) | 0.100 | | | | |
| 4 | Lens 2 | 47.619 | (ASP) | 0.350 | Plastic | 1.660 | 20.4 | −4.41 |
| 5 | | 2.733 | (ASP) | 0.583 | | | | |
| 6 | Lens 3 | 3.202 | (ASP) | 1.147 | Plastic | 1.671 | 19.3 | 4.38 |
| 7 | | −30.802 | (ASP) | 0.219 | | | | |
| 8 | Lens 4 | −3.798 | (ASP) | 0.350 | Plastic | 1.660 | 20.4 | −5.94 |
| 9 | | −123.457 | (ASP) | 0.761 | | | | |
| 10 | Lens 5 | −2.881 | (ASP) | 1.259 | Plastic | 1.544 | 56.0 | −20.30 |
| 11 | | −4.498 | (ASP) | 1.410 | | | | |
| 12 | Filter | Plano | | 0.210 | Glass | 1.517 | 64.2 | — |

TABLE 15-continued

8th Embodiment
f = 9.89 mm, Fno = 2.80, HFOV = 14.9 deg.

| Surface # | | Curvature Radius | Thickness | Material | Index | Abbe # | Focal Length |
|---|---|---|---|---|---|---|---|
| 13 | | Plano | 1.795 | | | | |
| 14 | Image | Plano | — | | | | |

Note:
Reference wavelength is 587.6 nm (d-line).

TABLE 16

Aspheric Coefficients

| | Surface # | | | | |
|---|---|---|---|---|---|
| | 2 | 3 | 4 | 5 | 6 |
| k = | 1.0451E−01 | −9.0000E+01 | 4.0120E+01 | −2.8343E+00 | −1.2561E+00 |
| A4 = | −1.3419E−03 | 2.3581E−02 | 3.7673E−02 | 4.9739E−02 | −1.6580E−03 |
| A6 = | −1.6155E−04 | −1.4959E−02 | −2.8161E−02 | −1.8754E−02 | −1.6343E−05 |
| A8 = | 2.7971E−04 | 5.6791E−03 | 9.4943E−03 | 7.0650E−03 | −4.3484E−03 |
| A10 = | −2.0738E−04 | −9.4292E−04 | −3.1066E−04 | 2.4433E−03 | 4.7253E−03 |
| A12 = | 6.4984E−05 | −6.0987E−05 | −7.7497E−04 | −1.9690E−03 | −1.5493E−03 |
| A14 = | −6.8927E−06 | 2.8801E−05 | 1.5370E−04 | 3.7353E−04 | 1.7894E−04 |

| | Surface # | | | | |
|---|---|---|---|---|---|
| | 7 | 8 | 9 | 10 | 11 |
| k = | −9.8538E+01 | −2.9489E+01 | 9.8576E+01 | 3.9427E−01 | 2.6901E+00 |
| A4 = | −4.5069E−02 | 4.9568E−02 | 1.7142E−01 | 2.6882E−02 | 3.3059E−03 |
| A6 = | −7.7786E−03 | 6.7221E−03 | −8.5227E−05 | −4.0059E−02 | −3.1898E−03 |
| A8 = | 2.3271E−02 | −5.4686E−02 | −7.9438E−02 | 9.9393E−02 | 3.9660E−03 |
| A10 = | −1.2662E−02 | 6.2766E−02 | 9.3026E−02 | −1.2532E−01 | −3.0742E−03 |
| A12 = | 2.8955E−03 | −3.7478E−02 | −5.8280E−02 | 8.3916E−02 | 1.1770E−03 |
| A14 = | −2.2973E−04 | 1.0866E−02 | 1.8851E−02 | −2.7852E−02 | −2.1949E−04 |
| A16 = | — | −1.2105E−03 | −2.4621E−03 | 3.6804E−03 | 1.5669E−05 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 9.89 | |R9/R8| | 0.02 |
| Fno | 2.80 | |(R9 + R10)/(R9 − R10)| | 4.56 |
| HFOV [deg.] | 14.9 | [(R5 − R6) * f]/(R5 * R6) | −3.41 |
| tan(HFOV) | 0.27 | SD/TD | 0.88 |
| V3 | 19.3 | Y52 * 2/EPD | 1.06 |
| (V2 + V4)/2 | 20.40 | Y52/Y11 | 1.06 |
| V2 + V3 + V4 | 60.1 | f/f3 | 2.26 |
| CT5/T23 | 2.16 | ImgH/f | 0.28 |
| CT4/T34 | 1.60 | TL/f | 0.96 |
| T34/T12 | 2.19 | P2 + P4 + P5 | −4.39 |
| (T23 − T45)/(T23 + T45) | −0.13 | (P2 + P4 + P5)/P4 | 2.64 |
| | | |DsR5/DsR6| | 0.58 |
| ΣAT/CT3 | 1.45 | Ymax [mm] | 1.87 |
| ΣAT/(T23 + BL) | 0.42 | — | — |
| BL/ΣAT | 2.05 | | |

9th Embodiment

Figure 17:
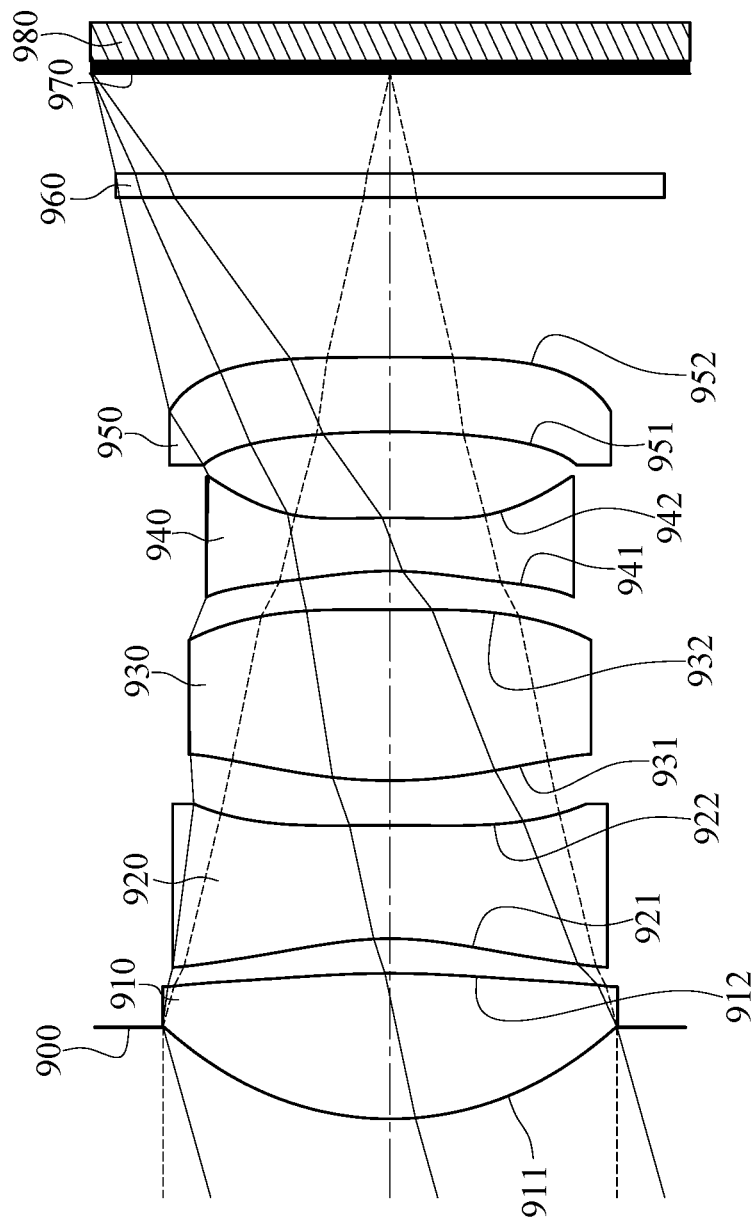
FIG. 17 a schematic view of an image capturing unit according to the 9th embodiment of the present disclosure.
Figure 18:
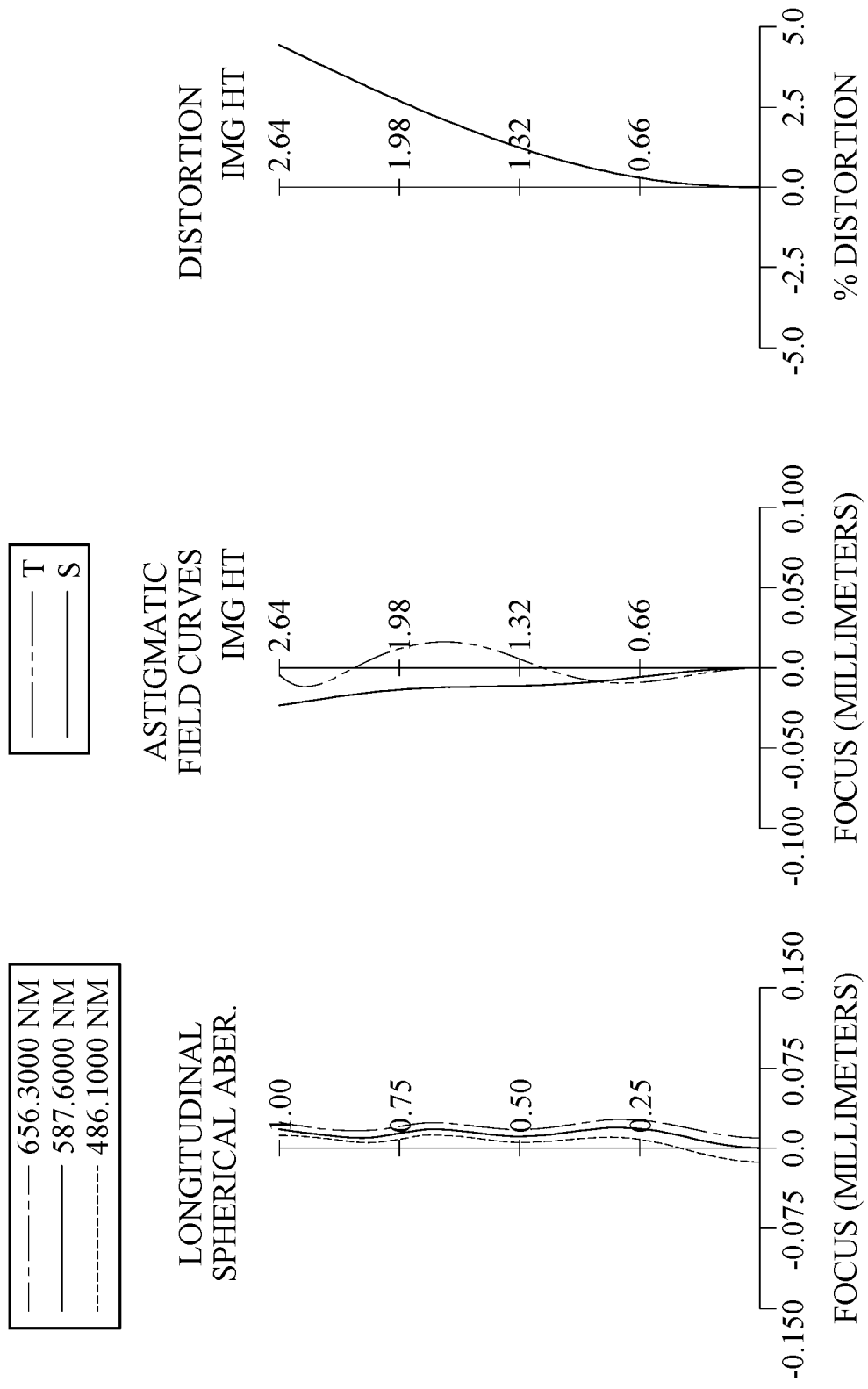
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical imaging lens system (its reference numeral is omitted) of the present disclosure and an image sensor 980. The optical imaging lens system includes, in order from an object side to an image side, an aperture stop 900, a first lens element 910, a second lens element 920, a third lens element 930, a fourth lens element 940, a fifth lens element 950, a filter 960 and an image surface 970. The optical imaging lens system includes five lens elements (910, 920, 930, 940 and 950) with no additional lens element disposed between the first lens element 910 and the fifth lens element 950.

The first lens element 910 with positive refractive power has an object-side surface 911 being convex in a paraxial region thereof and an image-side surface 912 being convex in a paraxial region thereof. The first lens element 910 is made of plastic material and has the object-side surface 911 and the image-side surface 912 being both aspheric.

The second lens element 920 with negative refractive power has an object-side surface 921 being concave in a paraxial region thereof and an image-side surface 922 being convex in a paraxial region thereof. The second lens element 920 is made of plastic material and has the object-side surface 921 and the image-side surface 922 being both aspheric.

The third lens element 930 with positive refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric.

The fourth lens element 940 with negative refractive power has an object-side surface 941 being concave in a paraxial region thereof and an image-side surface 942 being convex in a paraxial region thereof. The fourth lens element 940 is made of plastic material and has the object-side surface 941 and the image-side surface 942 being both aspheric. Both the object-side surface 941 and the image-side surface 942 of the fourth lens element 940 have at least one inflection point.

The fifth lens element 950 with negative refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric.

The filter 960 is made of glass material and located between the fifth lens element 950 and the image surface 970, and will not affect the focal length of the optical imaging lens system. The image sensor 980 is disposed on or near the image surface 970 of the optical imaging lens system.

The detailed optical data of the 9th embodiment are shown in Table 17 and the aspheric surface data are shown in Table 18 below.

TABLE 17

9th Embodiment
f = 9.00 mm, Fno = 2.25, HFOV = 15.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.807 | | | | |
| 2 | Lens 1 | 2.738 | (ASP) | 1.284 | Plastic | 1.511 | 56.8 | 4.22 |
| 3 | | −8.518 | (ASP) | 0.306 | | | | |
| 4 | Lens 2 | −2.918 | (ASP) | 1.000 | Plastic | 1.634 | 23.8 | −5.58 |
| 5 | | −18.868 | (ASP) | 0.394 | | | | |
| 6 | Lens 3 | 4.429 | (ASP) | 1.508 | Plastic | 1.660 | 20.4 | 6.91 |
| 7 | | 134.307 | (ASP) | 0.340 | | | | |
| 8 | Lens 4 | −3.054 | (ASP) | 0.469 | Plastic | 1.650 | 21.5 | −7.66 |
| 9 | | −8.371 | (ASP) | 0.760 | | | | |
| 10 | Lens 5 | −7.692 | (ASP) | 0.656 | Plastic | 1.559 | 40.4 | −15.11 |
| 11 | | −89.593 | (ASP) | 1.410 | | | | |
| 12 | Filter | Plano | | 0.210 | Glass | 1.517 | 64.2 | — |
| 13 | | Plano | | 0.882 | | | | |
| 14 | Image | Plano | | — | | | | |

Note:
Reference wavelength is 587.6 nm (d-line).

TABLE 18

Aspheric Coefficients

| | Surface # | | | | |
|---|---|---|---|---|---|
| | 2 | 3 | 4 | 5 | 6 |
| k = | 1.8406E−01 | −3.6574E+01 | 6.2547E−01 | −1.6772E+01 | −3.1624E+00 |
| A4 = | −2.6161E−03 | 1.1277E−02 | 7.7195E−02 | 5.7841E−02 | −9.3268E−04 |
| A6 = | 1.0647E−04 | −4.0369E−03 | −2.6627E−02 | −2.3758E−02 | −9.1633E−03 |
| A8 = | −4.7111E−04 | 1.7179E−03 | 9.9047E−03 | 9.9296E−03 | 4.2294E−03 |
| A10 = | 1.9887E−04 | −6.0016E−04 | −2.6124E−03 | −3.0119E−03 | −8.9168E−04 |
| A12 = | −4.3517E−05 | 8.4118E−05 | 3.9878E−04 | 5.8673E−04 | 8.6734E−05 |
| A14 = | 2.2783E−06 | −2.4799E−06 | −2.1904E−05 | −5.1416E−05 | −8.1290E−06 |

| | Surface # | | | | |
|---|---|---|---|---|---|
| | 7 | 8 | 9 | 10 | 11 |
| k = | −6.5735E+01 | −2.6005E+01 | 2.2654E+00 | −9.7075E+01 | 1.2138E+01 |
| A4 = | −5.0116E−02 | −2.8978E−03 | 1.5384E−01 | −2.4496E−02 | −2.1601E−02 |
| A6 = | 4.9886E−03 | 6.1140E−02 | −2.2486E−02 | 3.6873E−02 | 1.0481E−02 |
| A8 = | 6.3177E−03 | −8.3143E−02 | −1.3624E−02 | −6.7218E−02 | −1.7885E−02 |
| A10 = | −3.6171E−03 | 5.7320E−02 | 7.8498E−03 | 6.2703E−02 | 1.3157E−02 |
| A12 = | 7.6489E−04 | −2.3824E−02 | −2.8277E−03 | −3.2703E−02 | −5.2381E−03 |
| A14 = | −6.1604E−05 | 5.4925E−03 | 9.8286E−04 | 8.8816E−03 | 1.0679E−03 |
| A16 = | — | −5.3732E−04 | −1.6156E−04 | −9.8464E−04 | −8.8984E−05 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 9.00 | |R9/R8| | 0.92 |
| Fno | 2.25 | |(R9 + R10)/(R9 − R10)| | 1.19 |
| HFOV [deg.] | 15.6 | [(R5 − R6) * f]/(R5 * R6) | −1.97 |
| tan(HFOV) | 0.28 | SD/TD | 0.88 |
| V3 | 20.4 | Y52 * 2/EPD | 0.97 |
| (V2 + V4)/2 | 22.66 | Y52/Y11 | 0.97 |
| V2 + V3 + V4 | 65.7 | f/f3 | 1.30 |
| CT5/T23 | 1.66 | ImgH/f | 0.29 |
| CT4/T34 | 1.38 | TL/f | 1.02 |
| T34/T12 | 1.11 | P2 + P4 + P5 | −3.38 |
| (T23 − T45)/(T23 + T45) | −0.32 | (P2 + P4 + P5)/P4 | 2.88 |
| | | |DsR5/DsR6| | 0.59 |
| ΣAT/CT3 | 1.19 | Ymax [mm] | 2.00 |
| ΣAT/(T23 + BL) | 0.62 | — | — |
| BL/ΣAT | 1.39 | | |

10th Embodiment

Figure 19:
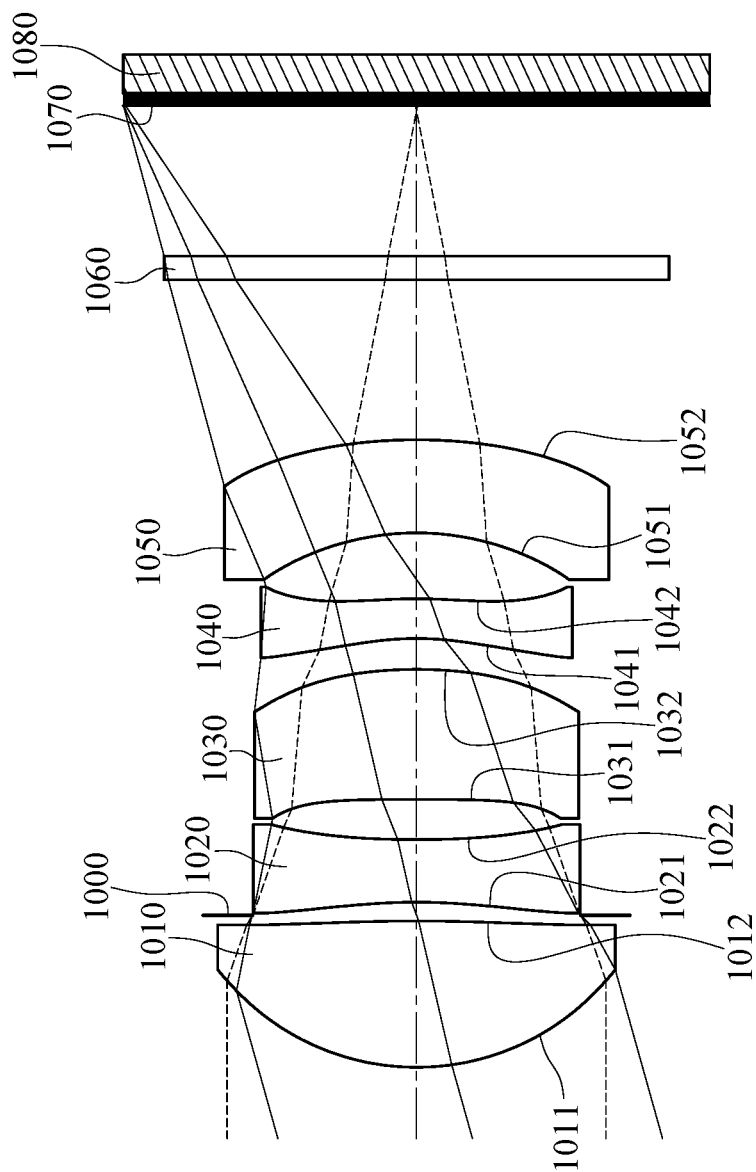
FIG. 19 a schematic view of an image capturing unit according to the 10th embodiment of the present disclosure.
Figure 20:
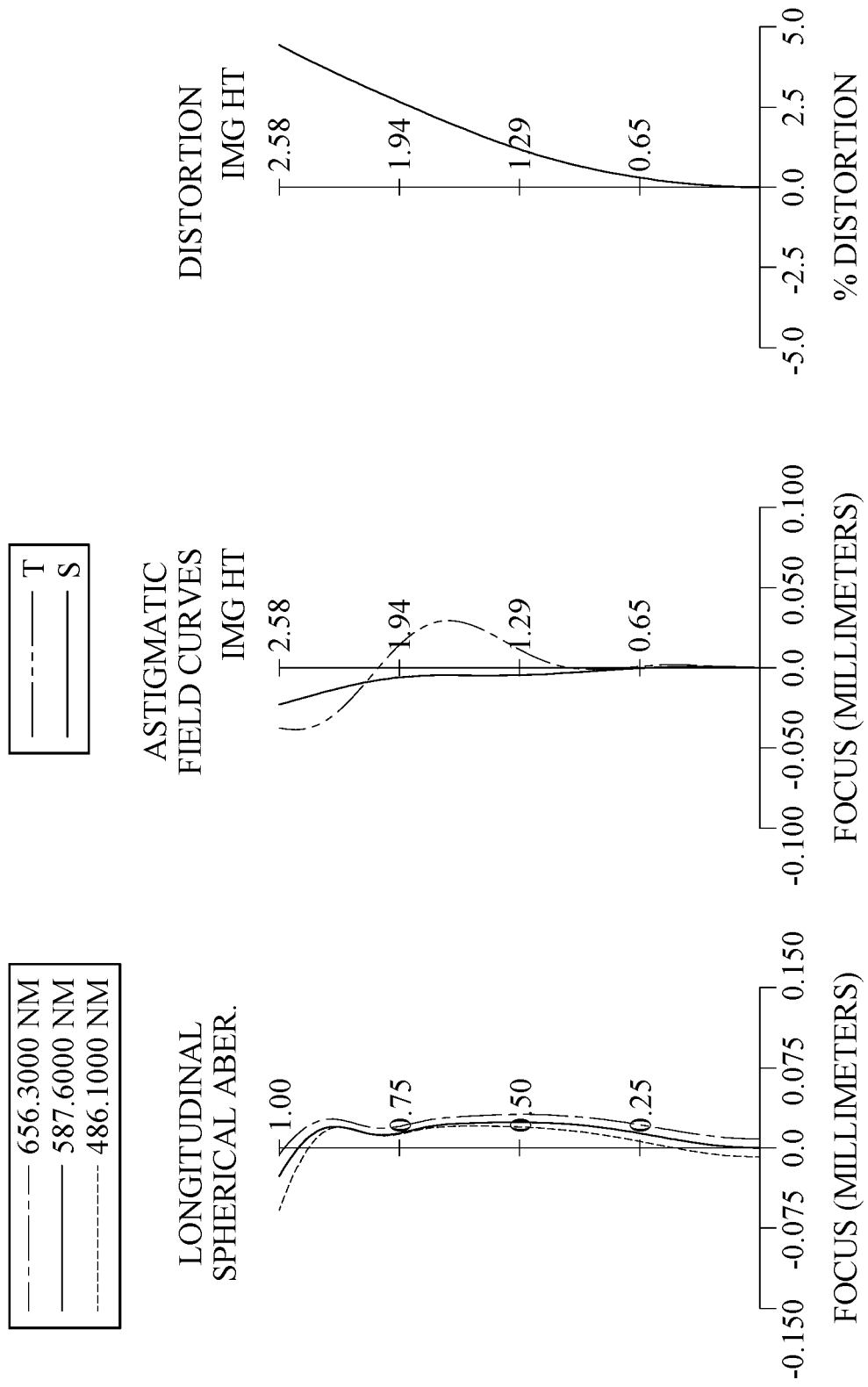
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the optical imaging lens system (its reference numeral is omitted) of the present disclosure and an image sensor 1080. The optical imaging lens system includes, in order from an object side to an image side, a first lens element 1010, an aperture stop 1000, a second lens element 1020, a third lens element 1030, a fourth lens element 1040, a fifth lens element 1050, a filter 1060 and an image surface 1070. The optical imaging lens system includes five lens elements (1010, 1020, 1030, 1040 and 1050) with no additional lens element disposed between the first lens element 1010 and the fifth lens element 1050.

The first lens element 1010 with positive refractive power has an object-side surface 1011 being convex in a paraxial region thereof and an image-side surface 1012 being convex in a paraxial region thereof. The first lens element 1010 is made of plastic material and has the object-side surface 1011 and the image-side surface 1012 being both aspheric.

The second lens element 1020 with negative refractive power has an object-side surface 1021 being concave in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with positive refractive power has an object-side surface 1031 being concave in a paraxial region thereof and an image-side surface 1032 being convex in a paraxial region thereof. The third lens element 1030 is made of plastic material and has the object-side surface 1031 and the image-side surface 1032 being both aspheric.

The fourth lens element 1040 with negative refractive power has an object-side surface 1041 being concave in a paraxial region thereof and an image-side surface 1042 being convex in a paraxial region thereof. The fourth lens element 1040 is made of plastic material and has the object-side surface 1041 and the image-side surface 1042 being both aspheric. Both the object-side surface 1041 and the image-side surface 1042 of the fourth lens element 1040 have at least one inflection point.

The fifth lens element 1050 with negative refractive power has an object-side surface 1051 being concave in a paraxial region thereof and an image-side surface 1052 being convex in a paraxial region thereof. The fifth lens element 1050 is made of plastic material and has the object-side surface 1051 and the image-side surface 1052 being both aspheric.

The filter 1060 is made of glass material and located between the fifth lens element 1050 and the image surface 1070, and will not affect the focal length of the optical imaging lens system. The image sensor 1080 is disposed on or near the image surface 1070 of the optical imaging lens system.

The detailed optical data of the 10th embodiment are shown in Table 19 and the aspheric surface data are shown in Table 20 below.

TABLE 19

10th Embodiment
f = 8.78 mm, Fno = 2.63, HFOV = 15.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.210 | (ASP) | 1.290 | Plastic | 1.545 | 56.0 | 3.60 |
| 2 | | −13.835 | (ASP) | 0.050 | | | | |
| 3 | Ape. Stop | Plano | | 0.116 | | | | |
| 4 | Lens 2 | −4.937 | (ASP) | 0.552 | Plastic | 1.614 | 26.0 | −5.32 |
| 5 | | 10.036 | (ASP) | 0.354 | | | | |
| 6 | Lens 3 | −60.972 | (ASP) | 1.147 | Plastic | 1.660 | 20.4 | 6.34 |
| 7 | | −3.943 | (ASP) | 0.273 | | | | |
| 8 | Lens 4 | −2.475 | (ASP) | 0.350 | Plastic | 1.650 | 21.5 | −8.84 |
| 9 | | −4.587 | (ASP) | 0.581 | | | | |
| 10 | Lens 5 | −2.325 | (ASP) | 0.821 | Plastic | 1.614 | 26.0 | −8.98 |
| 11 | | −4.563 | (ASP) | 1.410 | | | | |

TABLE 19-continued

10th Embodiment
f = 8.78 mm, Fno = 2.63, HFOV = 15.6 deg.

| Surface # | | Curvature Radius | Thickness | Material | Index | Abbe # | Focal Length |
|---|---|---|---|---|---|---|---|
| 12 | Filter | Plano | 0.210 | Glass | 1.517 | 64.2 | — |
| 13 | | Plano | 1.325 | | | | |
| 14 | Image | Plano | — | | | | |

Note:
Reference wavelength is 587.6 nm (d-line).

TABLE 20

Aspheric Coefficients

| | Surface # | | | | |
|---|---|---|---|---|---|
| | 1 | 2 | 4 | 5 | 6 |
| k = | 1.3278E−01 | −1.9251E+01 | 7.4853E+00 | −2.9864E+01 | 9.9000E+01 |
| A4 = | −1.4579E−03 | 1.8162E−02 | 5.8158E−02 | 4.1913E−02 | −2.8900E−02 |
| A6 = | −1.3302E−04 | −1.0955E−02 | −2.8813E−02 | −2.5270E−02 | −1.4928E−02 |
| A8 = | 1.6058E−05 | 5.5663E−03 | 1.6246E−02 | 7.9759E−03 | −5.8608E−03 |
| A10 = | −1.1063E−04 | −1.4406E−03 | −4.0417E−03 | 2.3843E−03 | 6.2617E−03 |
| A12 = | 7.9940E−05 | −1.2070E−04 | 2.9266E−05 | −2.3645E−03 | −3.0531E−03 |
| A14 = | −2.4617E−05 | 1.0660E−04 | 2.2912E−04 | 5.6435E−04 | 3.0917E−04 |

| | Surface # | | | | |
|---|---|---|---|---|---|
| | 7 | 8 | 9 | 10 | 11 |
| k = | −1.2068E+01 | −1.3017E+01 | −3.0454E+01 | 6.5875E−01 | 4.3954E+00 |
| A4 = | −4.2942E−02 | 3.6606E−02 | 1.1098E−01 | 2.0625E−01 | 1.9551E−03 |
| A6 = | −1.4294E−02 | 5.5550E−03 | −5.3459E−03 | 4.4711E−02 | 7.3256E−03 |
| A8 = | 1.8803E−02 | −5.3289E−02 | −7.0668E−02 | −1.5333E−01 | −1.1096E−02 |
| A10 = | −1.1041E−02 | 6.2893E−02 | 9.2955E−02 | 2.1453E−01 | 5.7783E−03 |
| A12 = | 3.3258E−03 | −3.6845E−02 | −5.8182E−02 | −1.6024E−01 | −9.9452E−04 |
| A14 = | −3.3392E−04 | 1.0934E−02 | 1.8869E−02 | 6.2521E−02 | −1.1117E−04 |
| A16 = | — | −1.2101E−03 | −2.4622E−03 | −9.9427E−03 | 3.8822E−05 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 8.78 | |R9/R8| | 0.51 |
| Fno | 2.63 | |(R9 + R10)/(R9 − R10)| | 3.08 |
| HFOV [deg.] | 15.6 | [(R5 − R6) * f]/(R5 * R6) | −2.08 |
| tan(HFOV) | 0.28 | SD/TD | 0.76 |
| V3 | 20.4 | Y52 * 2/EPD | 1.02 |
| (V2 + V4)/2 | 23.72 | Y52/Y11 | 0.97 |
| V2 + V3 + V4 | 67.8 | f/f3 | 1.39 |
| CT5/T23 | 2.32 | ImgH/f | 0.29 |
| CT4/T34 | 1.28 | TL/f | 0.97 |
| T34/T12 | 1.64 | P2 + P4 + P5 | −3.62 |
| (T23 − T45)/(T23 + T45) | −0.24 | (P2 + P4 + P5)/P4 | 3.65 |
| | | |DsR5/DsR6| | 0.47 |
| ΣAT/CT3 | 1.20 | Ymax [mm] | 1.75 |
| ΣAT/(T23 + BL) | 0.42 | — | — |
| BL/ΣAT | 2.14 | | |

11th Embodiment

Figure 21:
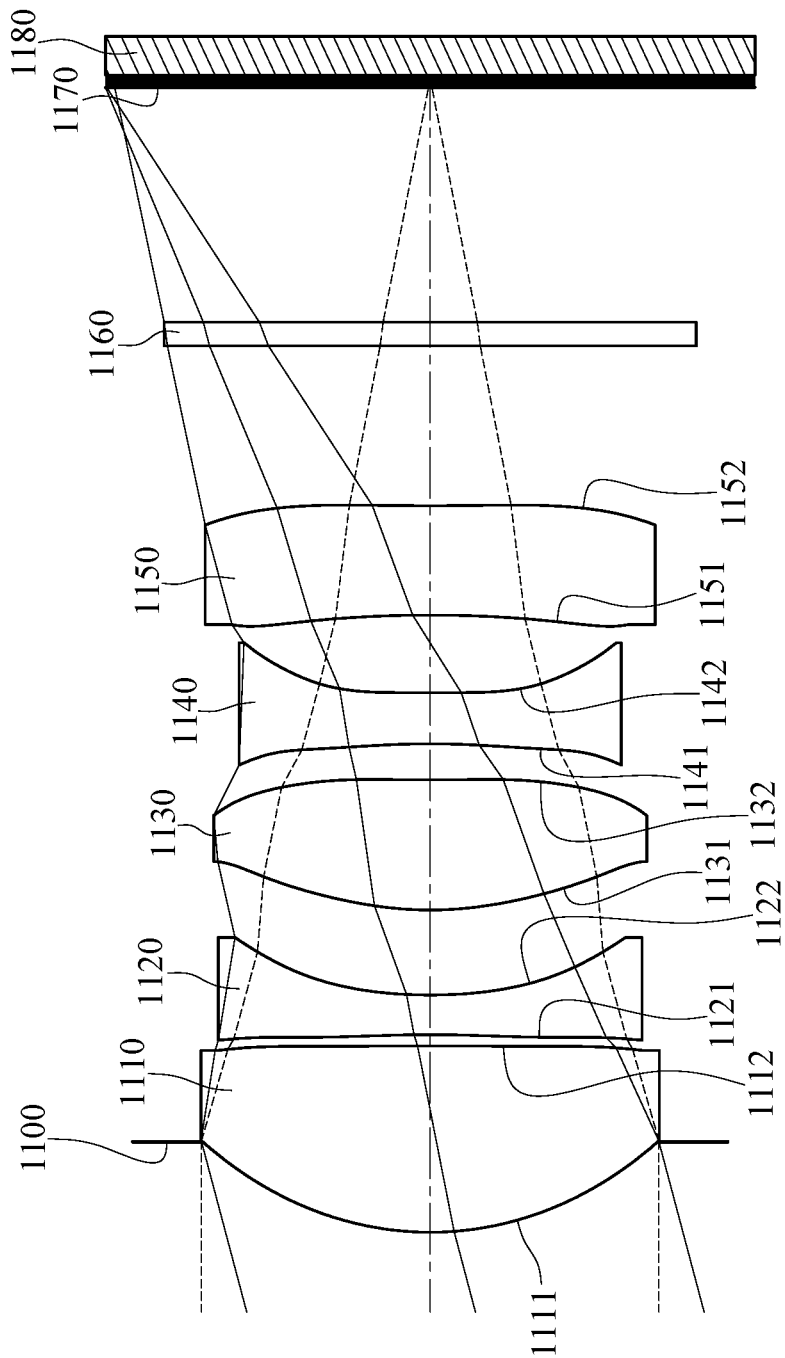
FIG. 21 a schematic view of an image capturing unit according to the 11th embodiment of the present disclosure.
Figure 22:
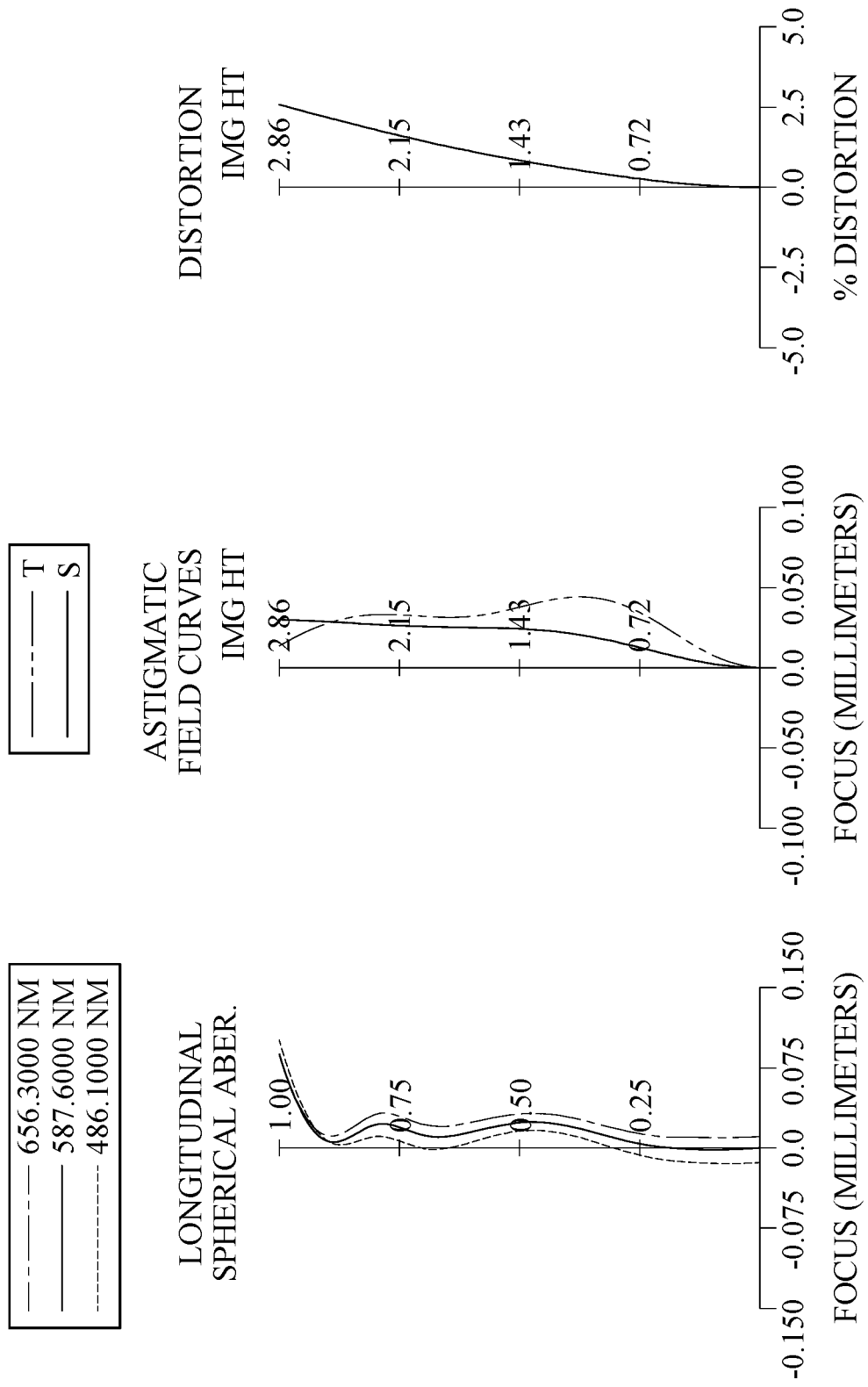
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the optical imaging lens system (its reference numeral is omitted) of the present disclosure and an image sensor 1180. The optical imaging lens system includes, in order from an object side to an image side, an aperture stop 1100, a first lens element 1110, a second lens element 1120, a third lens element 1130, a fourth lens element 1140, a fifth lens element 1150, a filter 1160 and an image surface 1170. The optical imaging lens system includes five lens elements (1110, 1120, 1130, 1140 and 1150) with no additional lens element disposed between the first lens element 1110 and the fifth lens element 1150.

The first lens element 1110 with positive refractive power has an object-side surface 1111 being convex in a paraxial region thereof and an image-side surface 1112 being convex in a paraxial region thereof. The first lens element 1110 is made of plastic material and has the object-side surface 1111 and the image-side surface 1112 being both aspheric.

The second lens element 1120 with negative refractive power has an object-side surface 1121 being concave in a paraxial region thereof and an image-side surface 1122 being concave in a paraxial region thereof. The second lens element 1120 is made of plastic material and has the object-side surface 1121 and the image-side surface 1122 being both aspheric.

The third lens element 1130 with positive refractive power has an object-side surface 1131 being convex in a paraxial region thereof and an image-side surface 1132 being concave in a paraxial region thereof. The third lens element 1130 is made of plastic material and has the object-side surface 1131 and the image-side surface 1132 being both aspheric.

The fourth lens element 1140 with negative refractive power has an object-side surface 1141 being concave in a paraxial region thereof and an image-side surface 1142 being convex in a paraxial region thereof. The fourth lens element 1140 is made of plastic material and has the object-side surface 1141 and the image-side surface 1142 being both aspheric. Both the object-side surface 1141 and the image-side surface 1142 of the fourth lens element 1140 have at least one inflection point.

The fifth lens element 1150 with negative refractive power has an object-side surface 1151 being concave in a paraxial region thereof and an image-side surface 1152 being concave in a paraxial region thereof. The fifth lens element 1150 is made of plastic material and has the object-side surface 1151 and the image-side surface 1152 being both aspheric. Both the object-side surface 1151 and the image-side surface 1152 of the fourth lens element 1150 have at least one inflection point.

The filter 1160 is made of glass material and located between the fifth lens element 1150 and the image surface 1170, and will not affect the focal length of the optical imaging lens system. The image sensor 1180 is disposed on or near the image surface 1170 of the optical imaging lens system.

The detailed optical data of the 11th embodiment are shown in Table 21 and the aspheric surface data are shown in Table 22 below.

TABLE 21

11th Embodiment
f = 10.48 mm, Fno = 2.60, HFOV = 14.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.798 | | | | |
| 2 | Lens 1 | 2.793 | (ASP) | 1.642 | Plastic | 1.545 | 56.1 | 5.03 |
| 3 | | −118.779 | (ASP) | 0.100 | | | | |
| 4 | Lens 2 | −10.757 | (ASP) | 0.350 | Plastic | 1.650 | 21.5 | −4.74 |
| 5 | | 4.373 | (ASP) | 0.750 | | | | |
| 6 | Lens 3 | 3.133 | (ASP) | 1.147 | Plastic | 1.660 | 20.4 | 5.82 |
| 7 | | 14.528 | (ASP) | 0.318 | | | | |
| 8 | Lens 4 | −7.457 | (ASP) | 0.452 | Plastic | 1.650 | 21.5 | −12.4 |
| 9 | | −100.925 | (ASP) | 0.683 | | | | |
| 10 | Lens 5 | −11.940 | (ASP) | 0.965 | Plastic | 1.559 | 40.4 | −14.12 |
| 11 | | 23.946 | (ASP) | 1.410 | | | | |
| 12 | Filter | Plano | | 0.210 | Glass | 1.517 | 64.2 | — |
| 13 | | Plano | | 2.068 | | | | |
| 14 | Image | Plano | | — | | | | |

Note:
Reference wavelength is 587.6 nm (d-line).

TABLE 22

Aspheric Coefficients

| | Surface # | | | | |
|---|---|---|---|---|---|
| | 2 | 3 | 4 | 5 | 6 |
| k = | 2.8570E−01 | −9.0000E+01 | 2.2880E+01 | −6.5829E+00 | −9.8749E−02 |
| A4 = | −2.6424E−03 | 2.6021E−03 | 3.6630E−02 | 3.7829E−02 | −2.4803E−02 |
| A6 = | −1.7393E−03 | −2.2120E−03 | −1.5789E−02 | −9.1105E−03 | 3.8452E−03 |
| A8 = | 1.0152E−03 | 2.6920E−03 | 8.5342E−03 | 3.5219E−03 | −1.0777E−03 |
| A10 = | −4.4337E−04 | −1.5363E−03 | −3.3320E−03 | 6.6004E−04 | 2.0340E−03 |
| A12 = | 8.7790E−05 | 2.8361E−04 | 5.4095E−04 | −9.7701E−04 | −8.2549E−04 |
| A14 = | −7.4898E−06 | −1.2293E−05 | −2.0229E−05 | 1.8308E−04 | 8.7567E−05 |

| | Surface # | | | | |
|---|---|---|---|---|---|
| | 7 | 8 | 9 | 10 | 11 |
| k = | 5.0584E+01 | −5.8248E+01 | −9.0000E+01 | −2.7540E+00 | −1.4934E+01 |
| A4 = | −6.9153E−02 | −1.6129E−04 | 8.8939E−02 | −1.0753E−02 | −2.1219E−02 |
| A6 = | 3.4484E−03 | 2.6980E−02 | 1.9816E−02 | 1.7748E−02 | 3.9494E−03 |
| A8 = | 1.9235E−02 | −2.8114E−02 | −2.2144E−02 | −2.4147E−02 | −2.2284E−03 |
| A10 = | −1.1320E−02 | 2.1469E−02 | 5.5771E−03 | 1.9960E−02 | 9.3755E−04 |
| A12 = | 2.5213E−03 | −1.3612E−02 | −3.2832E−03 | −9.1361E−03 | −2.3047E−04 |

TABLE 22-continued

| Aspheric Coefficients | | | | |
|---|---|---|---|---|
| A14 = | −2.0791E−04 | 4.3378E−03 | 1.9273E−03 | 2.1949E−03 | 2.7898E−05 |
| A16 = | — | −5.0510E−04 | −3.3685E−04 | −2.0992E−04 | −1.1351E−06 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 10.48 | |R9/R8| | 0.12 |
| Fno | 2.60 | |(R9 + R10)/(R9 − R10)| | 0.33 |
| HFOV [deg.] | 14.9 | [(R5 − R6) * f]/(R5 * R6) | −2.62 |
| tan(HFOV) | 0.27 | SD/TD | 0.88 |
| V3 | 20.4 | Y52 * 2/EPD | 0.98 |
| (V2 + V4)/2 | 21.47 | Y52/Y11 | 0.98 |
| V2 + V3 + V4 | 63.3 | f/f3 | 1.80 |
| CT5/T23 | 1.29 | ImgH/f | 0.27 |
| CT4/T34 | 1.42 | TL/f | 0.96 |
| T34/T12 | 3.18 | P2 + P4 + P5 | −3.80 |
| (T23 − T45)/(T23 + T45) | 0.05 | (P2 + P4 + P5)/P4 | 4.50 |
| | | |DsR5/DsR6| | 0.64 |
| ΣAT/CT3 | 1.61 | Ymax [mm] | 2.02 |
| ΣAT/(T23 + BL) | 0.42 | — | — |
| BL/ΣAT | 2.00 | | |

12th Embodiment

Figure 23:
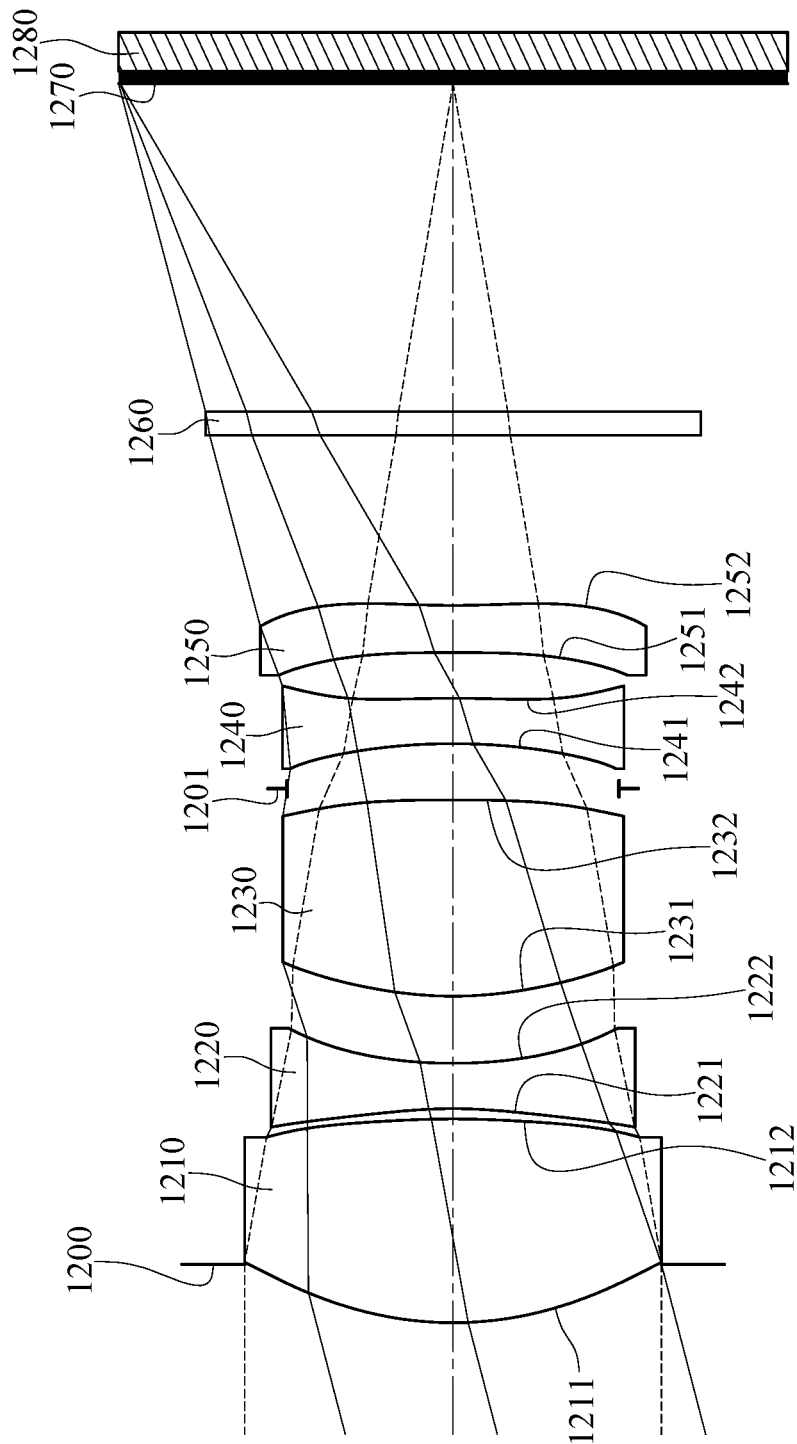
FIG. 23 a schematic view of an image capturing unit according to the 12th embodiment of the present disclosure.
Figure 24:
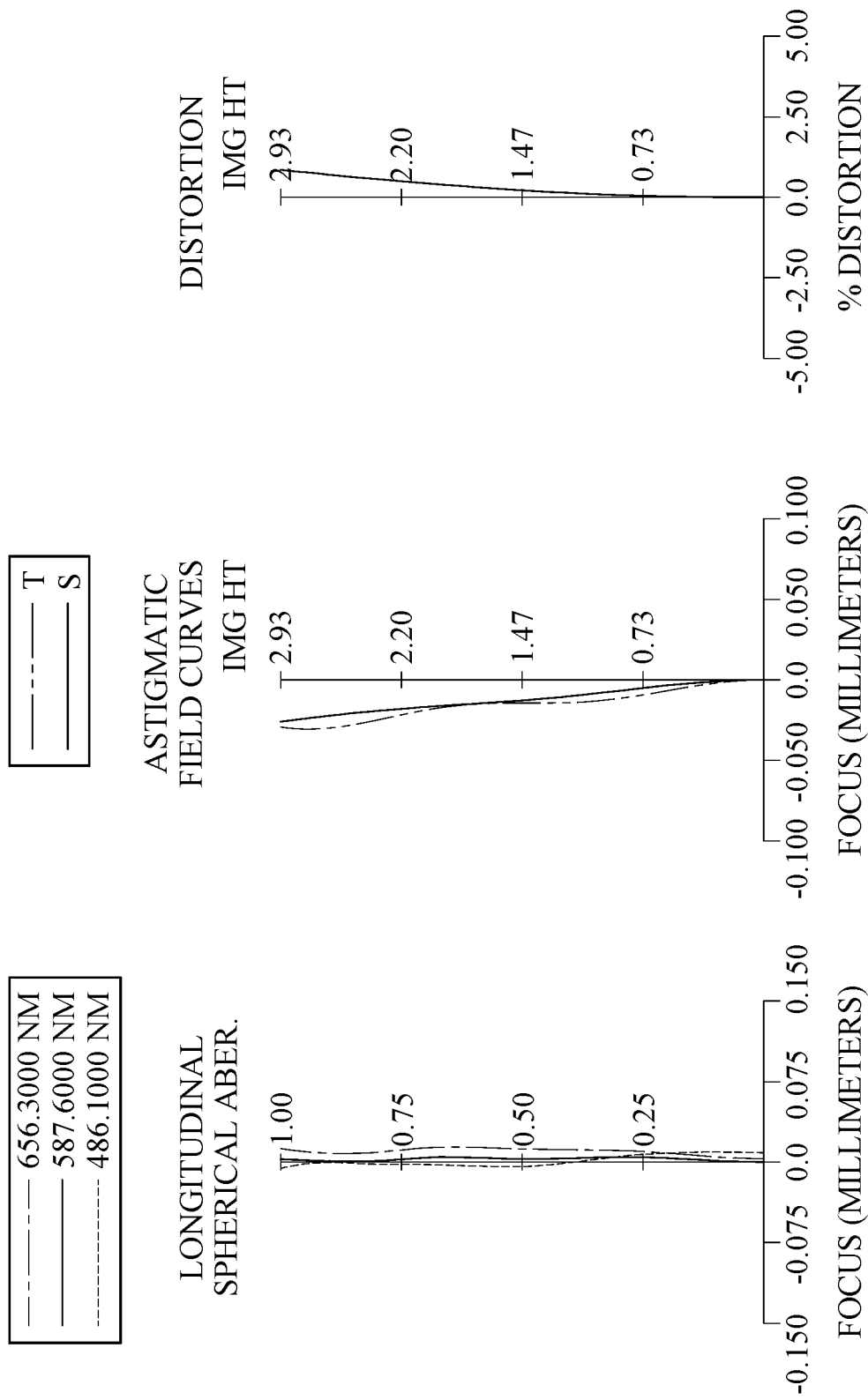
FIG. 24 shows spherical aberration curves, astigmatic field curves and a distortion curve of the image capturing unit according to the 12th embodiment.

FIG. 23 is a schematic view of an image capturing unit according to the 12th embodiment of the present disclosure. FIG. 24 shows, in order from left to right, spherical aberration curves, astigmatic field curves and a distortion curve of the image capturing unit according to the 12th embodiment. In FIG. 23, the image capturing unit includes the optical imaging lens system (its reference numeral is omitted) of the present disclosure and an image sensor 1180. The optical imaging lens system includes, in order from an object side to an image side, an aperture stop 1200, a first lens element 1210, a second lens element 1220, a third lens element 1230, a stop 1201, a fourth lens element 1240, a fifth lens element 1250, a filter 1260 and an image surface 1270. The optical imaging lens system includes five lens elements (1210, 1220, 1230, 1240 and 1250) with no additional lens element disposed between the first lens element 1210 and the fifth lens element 1250.

The first lens element 1210 with positive refractive power has an object-side surface 1211 being convex in a paraxial region thereof and an image-side surface 1212 being convex in a paraxial region thereof. The first lens element 1210 is made of plastic material and has the object-side surface 1211 and the image-side surface 1212 being both aspheric.

The second lens element 1220 with negative refractive power has an object-side surface 1221 being concave in a paraxial region thereof and an image-side surface 1222 being concave in a paraxial region thereof. The second lens element 1220 is made of plastic material and has the object-side surface 1221 and the image-side surface 1222 being both aspheric.

The third lens element 1230 with positive refractive power has an object-side surface 1231 being convex in a paraxial region thereof and an image-side surface 1232 being convex in a paraxial region thereof. The third lens element 1230 is made of plastic material and has the object-side surface 1231 and the image-side surface 1232 being both aspheric.

The fourth lens element 1240 with negative refractive power has an object-side surface 1241 being concave in a paraxial region thereof and an image-side surface 1242 being convex in a paraxial region thereof. The fourth lens element 1240 is made of plastic material and has the object-side surface 1241 and the image-side surface 1242 being both aspheric. The image-side surface 1242 of the fourth lens element 1240 has at least one inflection point.

The fifth lens element 1250 with negative refractive power has an object-side surface 1251 being concave in a paraxial region thereof and an image-side surface 1252 being concave in a paraxial region thereof. The fifth lens element 1250 is made of plastic material and has the object-side surface 1251 and the image-side surface 1252 being both aspheric. The image-side surface 1252 of the fourth lens element 1250 has at least one inflection point.

The filter 1260 is made of glass material and located between the fifth lens element 1250 and the image surface 1270, and will not affect the focal length of the optical imaging lens system. The image sensor 1280 is disposed on or near the image surface 1270 of the optical imaging lens system.

The detailed optical data of the 12th embodiment are shown in Table 23 and the aspheric surface data are shown in Table 24 below.

TABLE 23

12th Embodiment
f = 11.20 mm, Fno = 3.05, HFOV = 14.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.515 | | | | |
| 2 | Lens 1 | 3.117 | (ASP) | 1.797 | Plastic | 1.545 | 56.1 | 4.31 |
| 3 | | −7.595 | (ASP) | 0.091 | | | | |
| 4 | Lens 2 | −4.133 | (ASP) | 0.400 | Plastic | 1.639 | 23.5 | −3.29 |
| 5 | | 4.427 | (ASP) | 0.592 | | | | |
| 6 | Lens 3 | 3.431 | (ASP) | 1.730 | Plastic | 1.661 | 20.3 | 4.75 |

TABLE 23-continued

12th Embodiment
f = 11.20 mm, Fno = 3.05, HFOV = 14.6 deg.

| Surface # | | Curvature Radius | | Thickness | Material | Index | Abbe # | Focal Length |
|---|---|---|---|---|---|---|---|---|
| 7 | | −29.602 | (ASP) | 0.100 | | | | |
| 8 | Stop | Plano | | 0.397 | | | | |
| 9 | Lens 4 | −5.474 | (ASP) | 0.400 | Plastic | 1.661 | 20.3 | −17.22 |
| 10 | | −10.858 | (ASP) | 0.403 | | | | |
| 11 | Lens 5 | −28.112 | (ASP) | 0.416 | Plastic | 1.584 | 28.2 | −10.34 |
| 12 | | 7.735 | (ASP) | 1.500 | | | | |
| 13 | Filter | Plano | | 0.210 | Glass | 1.517 | 64.2 | — |
| 14 | | Plano | | 2.891 | | | | |
| 15 | Image | Plano | | — | | | | |

Note:
Reference wavelength is 587.6 nm (d-line).
An effective radius of the stop 1201 (Surface 8) is 1.462 mm.

TABLE 24

Aspheric Coefficients

| | Surface # | | | | |
|---|---|---|---|---|---|
| | 2 | 3 | 4 | 5 | 6 |
| k = | 1.4200E−01 | 1.1232E+01 | −7.3954E+00 | −2.1248E+01 | 2.2035E+00 |
| A4 = | −2.7752E−03 | 4.4174E−02 | 5.9992E−02 | 4.2334E−02 | −3.1541E−02 |
| A6 = | −4.4477E−04 | −3.3846E−02 | −4.2850E−02 | −8.1557E−03 | 9.8372E−03 |
| A8 = | −2.9740E−04 | 1.3921E−02 | 1.9032E−02 | 5.5814E−05 | −3.9765E−03 |
| A10 = | 7.9753E−05 | −3.3678E−03 | −5.1143E−03 | 2.6845E−03 | 1.3675E−03 |
| A12 = | −1.5365E−05 | 3.6462E−04 | 5.9261E−04 | −1.4587E−03 | −2.6545E−04 |
| A14 = | — | — | — | 2.3195E−04 | 2.3058E−06 |

| | Surface # | | | | |
|---|---|---|---|---|---|
| | 7 | 9 | 10 | 11 | 12 |
| k = | −9.9000E+01 | 7.9758E+00 | −5.9177E+01 | −1.0525E+01 | −1.5077E+01 |
| A4 = | −4.0984E−02 | 6.2113E−03 | 5.5090E−02 | −4.7559E−02 | −7.0788E−02 |
| A6 = | 6.8920E−03 | −9.6191E−03 | −1.3369E−02 | 8.3095E−03 | 2.4295E−02 |
| A8 = | 3.0414E−03 | 1.6246E−02 | 1.6459E−02 | 8.8778E−03 | −7.9708E−03 |
| A10 = | −1.1585E−03 | −9.6065E−03 | −1.1937E−02 | −8.5198E−03 | 1.4076E−03 |
| A12 = | 8.3120E−05 | 2.0560E−03 | 3.2755E−03 | 2.8986E−03 | −1.3844E−04 |
| A14 = | — | −1.5047E−04 | −3.1772E−04 | −3.7842E−04 | 6.0067E−06 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 11.20 | |R9/R8| | 2.59 |
| Fno | 3.05 | |(R9 + R10)/(R9 − R10)| | 0.57 |
| HFOV [deg.] | 14.6 | [(R5 − R6) * f]/(R5 * R6) | −3.64 |
| tan(HFOV) | 0.26 | SD/TD | 0.92 |
| V3 | 20.3 | Y52 * 2/EPD | 0.92 |
| (V2 + V4)/2 | 21.92 | Y52/Y11 | 0.92 |
| V2 + V3 + V4 | 64.2 | f/f3 | 2.36 |
| CT5/T23 | 0.70 | ImgH/f | 0.26 |
| CT4/T34 | 0.80 | TL/f | 0.98 |
| T34/T12 | 5.46 | P2 + P4 + P5 | −5.14 |
| (T23 − T45)/(T23 + T45) | 0.19 | (P2 + P4 + P5)/P4 | 7.91 |
| ΣAT/CT3 | 0.92 | |DsR5/DsR6| | 0.58 |
| ΣAT/(T23 + BL) | 0.30 | Ymax [mm] | 1.84 |
| BL/ΣAT | 2.91 | — | — |

13th Embodiment

Figure 25:
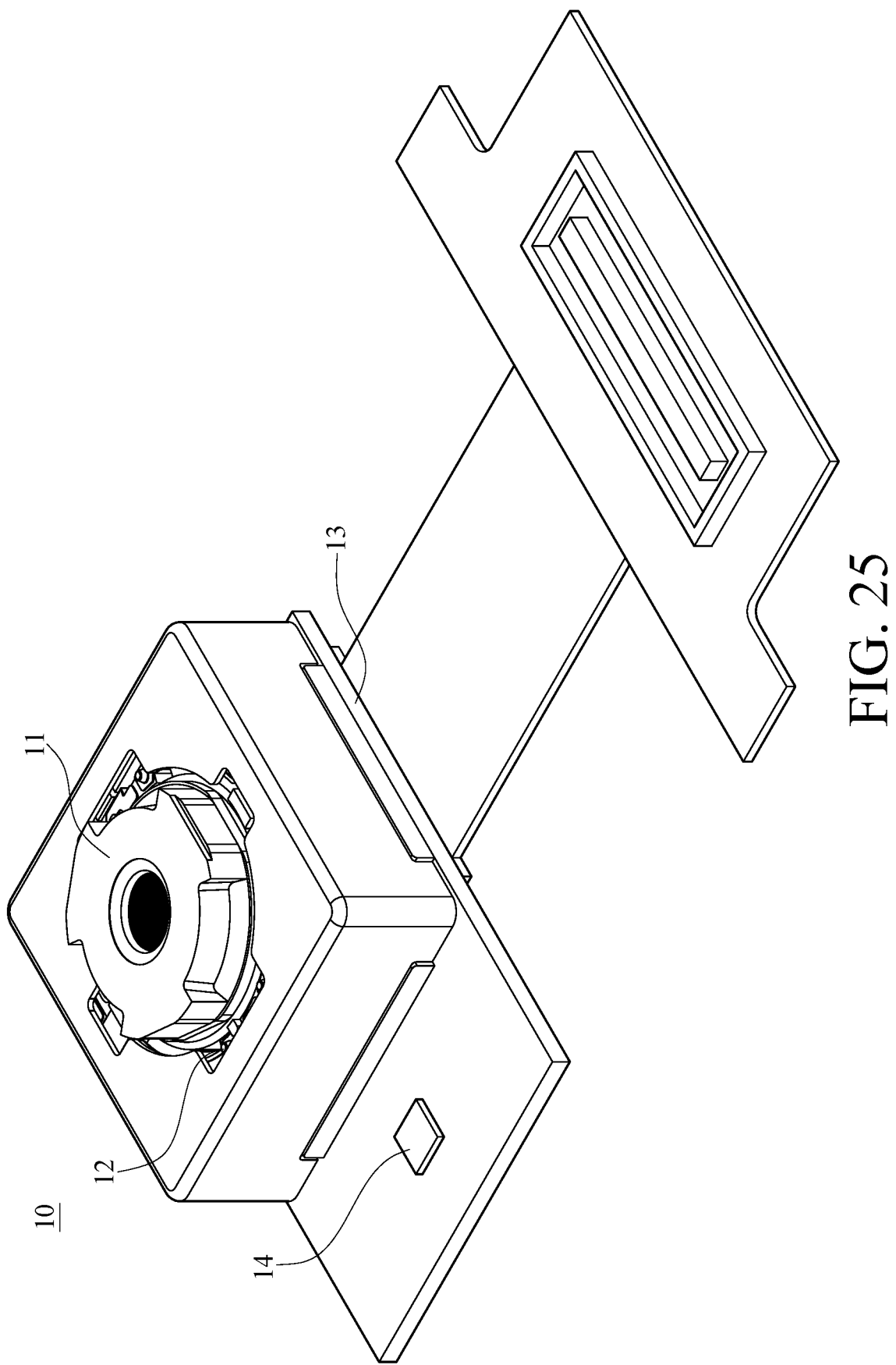
FIG. 25 is a perspective view of an image capturing unit according to the 13th embodiment of the present disclosure.

FIG. 25 is a perspective view of an image capturing unit according to the 13th embodiment of the present disclosure. In this embodiment, an image capturing unit 10 is a camera module including a camera shot 11, a driving device 12, an image sensor 13 and an image stabilization module 14. The camera shot 11 includes the optical imaging lens system disclosed in the first embodiment, a barrel and a holder member (their reference numerals are omitted) for holding the optical imaging lens system. The external light converges into the camera shot 11 of the image capturing unit 10 to generate an image, and the camera shot 11 is supported by the driving device 12 to focus the image on the image sensor 13, and the image is then digitally transmitted to an electronic component.

The driving device 12 can have auto focus function, and the driving device 12 may include voice coil motors (VCM), micro electro-mechanical systems (MEMS), piezoelectric systems or shape memory alloys. The driving device 12 is favorable for the optical imaging lens system to obtain a better imaging position, so that a clear image of the object can be captured by the optical imaging lens system under different object distances. The image sensor 13 (for example, CCD or CMOS) features high sensitivity to light and low noise, and the image sensor 13 can be disposed on the image surface of the optical imaging lens system to provide higher image quality.

The image stabilization module 14, such as an accelerometer, a gyroscope and a Hall sensor, is configured to work with the driving device 12 to provide optical image stabilization (OIS). The driving device 12 working with the image stabilization module 14 is favorable for compensating for pan and tilt of the lens unit 11 to reduce blurring associated with motion during exposure. In some cases, the driving device 12 can be assisted by electronic image stabilization (EIS) with image processing software, thereby improving image quality while in motion or low-light condition.

14th Embodiment

Figure 26:
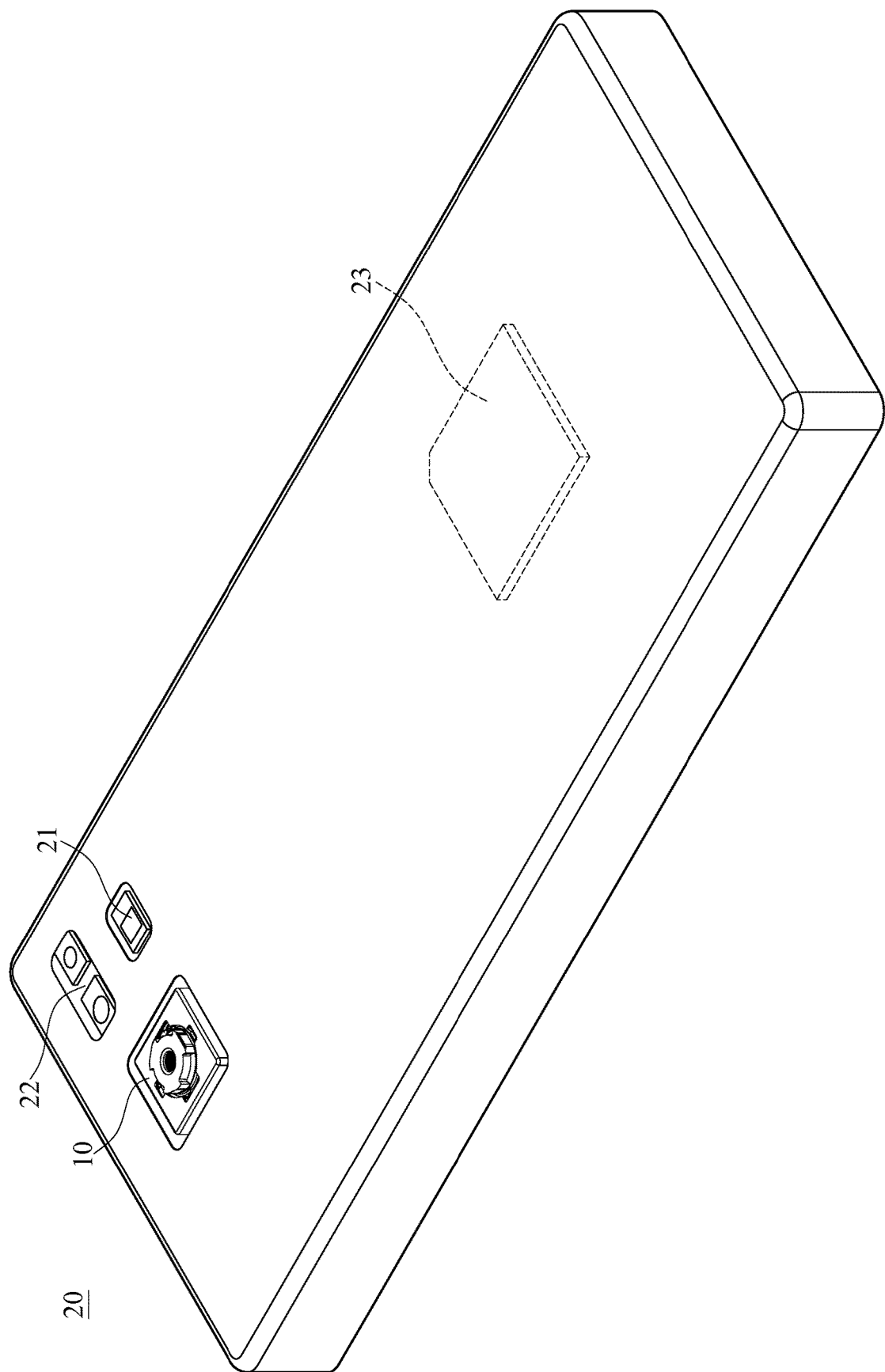
FIG. 26 is a perspective view of an electronic device according to the 14th embodiment of the present disclosure.
Figure 27:
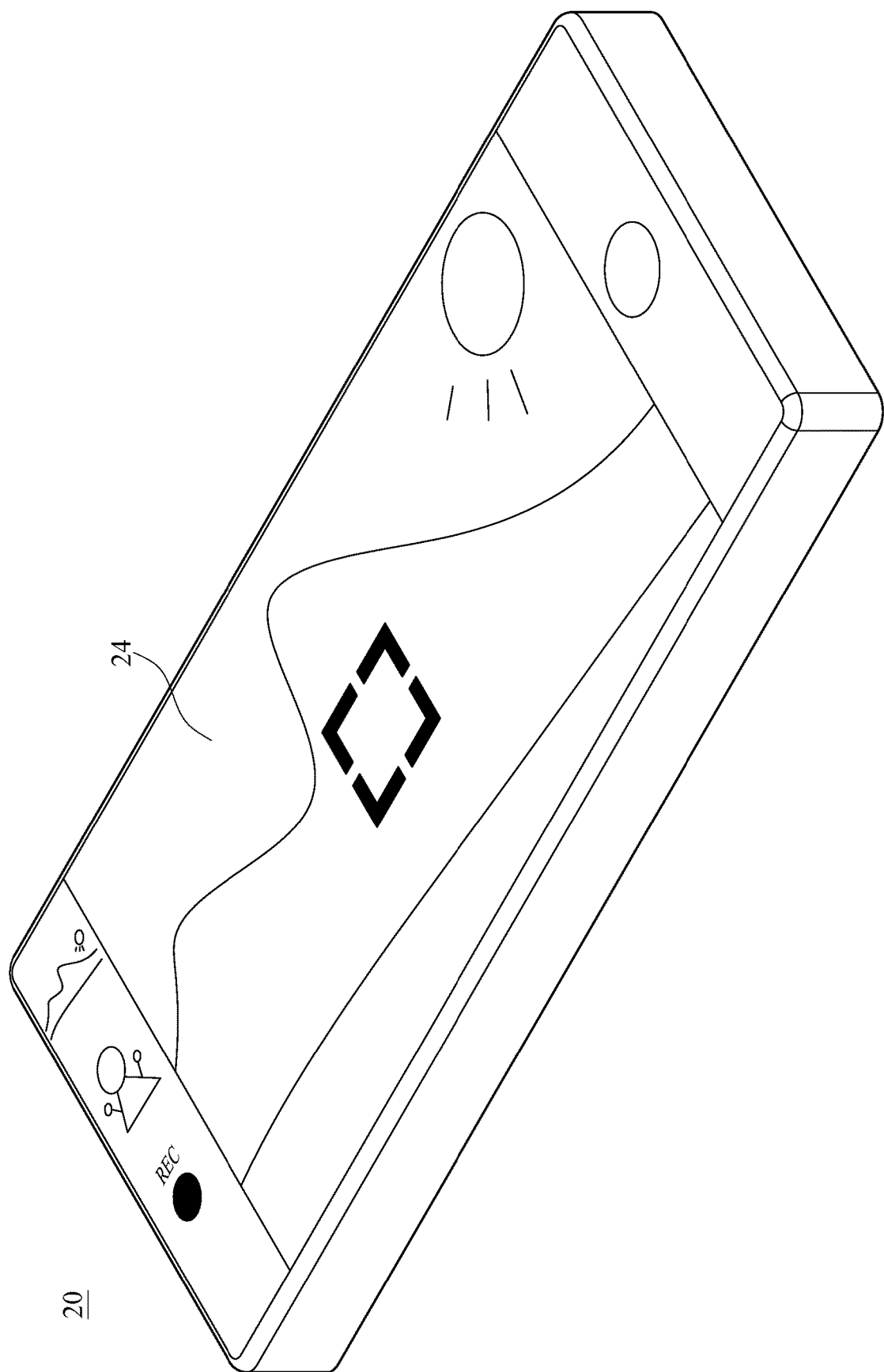
FIG. 27 is another perspective view of the electronic device in FIG. 26.
Figure 28:
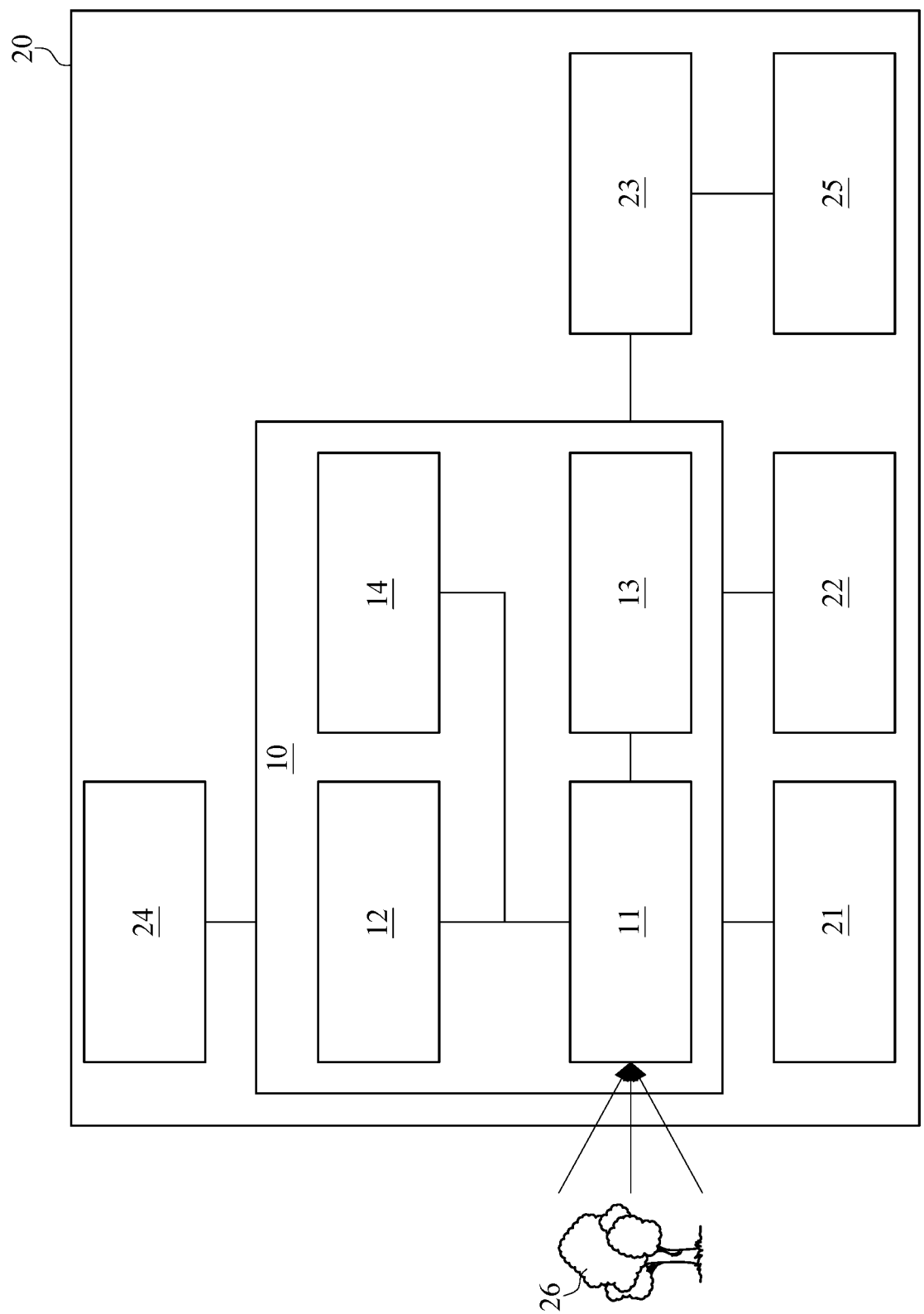
FIG. 28 is a block diagram of the electronic device in FIG. 26.

FIG. 26 is a perspective view of an electronic device according to the 14th embodiment of the present disclosure. FIG. 27 is another perspective view of the electronic device in FIG. 26. FIG. 28 is a block diagram of the electronic device in FIG. 26. In this embodiment, an electronic device 20 is a smart phone including the image capturing unit 10 disclosed in the 13th embodiment, a flash module 21, a focus assist module 22, an image signal processor 23, an user interface 24 and an image software processor 25. In this embodiment, there is one image capturing unit 10 installed on the electronic device 20, and the disclosure is not limited thereto. The electronic device 20 can include multiple image capturing units.

When a user interacts with the user interface 24 to capture images of an object 26, light being converged into the image capturing unit 10 to generate image, and the flash module 21 is activated for supplying additional needed light. The focus assist module 22 detects the distance to the object 26 to achieve fast auto focusing. The image signal processor 23 is configured to optimize image quality of the captured image. The light beam emitted from the focus assist module 22 can be either infrared light or laser. The user interface 24 can be a touch screen or a shutter button, and it can activate the image software processor 25 having multiple functions for image capturing and image processing.

The smart phone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the optical imaging lens system of the image capturing unit 10 is featured with good capability in aberration corrections and high image quality, and can be applied to 3D (three-dimensional) image capturing applications, in products, such as digital cameras, mobile devices, digital tablets, wearable devices, smart televisions, network surveillance devices, vehicle backup cameras, dashboard cameras, motion sensing input devices and other electronic imaging devices.

The foregoing description, for the purpose of explanation, has been described with reference to specific embodiments. It is to be noted that TABLES 1-24 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens system comprising five lens elements, the five lens elements being, in order from an object side to an image side, a first lens element, a second lens element, a third lens element, a fourth lens element and a fifth lens element;
wherein each of the five lens elements has an object-side surface facing toward the object side and an image-side surface facing toward the image side, the first lens element has positive refractive power, the object-side surface of the second lens element is concave in a paraxial region thereof, the third lens element has positive refractive power, the object-side surface of the third lens element is convex in a paraxial region thereof, the object-side surface of the fourth lens element is convex in a paraxial region thereof, the image-side surface of the fourth lens element is concave in a paraxial region thereof, the object-side surface of the fifth lens element is concave in a paraxial region thereof, and the image-side surface of the fifth lens element is convex in a paraxial region thereof;
wherein a central thickness of the fifth lens element is larger than a central thickness of the fourth lens element;
wherein half of a maximum field of view of the optical imaging lens system is HFOV, and the following condition is satisfied:

$$\tan(HFOV)<0.30.$$

2. The optical imaging lens system of claim 1, wherein the image-side surface of the first lens element has at least one inflection point.

3. The optical imaging lens system of claim 1, wherein the second lens element has negative refractive power, the fourth lens element has negative refractive power, and the fifth lens element has negative refractive power.

4. The optical imaging lens system of claim 1, wherein a focal length of the optical imaging lens system is f, a curvature radius of the object-side surface of the third lens element is R5, a curvature radius of the image-side surface of the third lens element is R6, and the following condition is satisfied:

$$-10.0<[(R5-R6)*f]/(R5*R6)<-1.70.$$

5. The optical imaging lens system of claim 1, wherein an axial distance between the first lens element and the second lens element is T12, an axial distance between the third lens element and the fourth lens element is T34, and the following condition is satisfied:

$$0.60<T34/T12<6.0.$$

6. The optical imaging lens system of claim 1, wherein an axial distance between the object-side surface of the first lens element and an image surface is TL, a focal length of the optical imaging lens system is f, and the following condition is satisfied:

0.70<$TL/f$<1.10.

7. The optical imaging lens system of claim 1, wherein an axial distance between the fourth lens element and the fifth lens element is larger than the central thickness of the fifth lens element.

8. The optical imaging lens system of claim 1, wherein an axial distance between the third lens element and the fourth lens element is larger than an axial distance between the first lens element and the second lens element.

9. The optical imaging lens system of claim 1, wherein a central thickness of the first lens element is larger than an axial distance between the second lens element and the third lens element.

10. An image capturing unit, comprising:
the optical imaging lens system of claim 1; and
an image sensor disposed on an image surface of the optical imaging lens system.

11. An electronic device, comprising:
the image capturing unit of claim 10.

12. An optical imaging lens system comprising five lens elements, the five lens elements being, in order from an object side to an image side, a first lens element, a second lens element, a third lens element, a fourth lens element and a fifth lens element;
wherein each of the five lens elements has an object-side surface facing toward the object side and an image-side surface facing toward the image side, the first lens element has positive refractive power, the third lens element has positive refractive power, the object-side surface of the third lens element is convex in a paraxial region thereof, the image-side surface of the third lens element is convex in a paraxial region thereof, the object-side surface of the fifth lens element is concave in a paraxial region thereof, and the image-side surface of the fifth lens element is convex in a paraxial region thereof;
wherein an absolute value of a focal length of the fourth lens element is larger than an absolute value of a focal length of the first lens element, an absolute value of a curvature radius of the image-side surface of the second lens element is larger than an absolute value of a curvature radius of the object-side surface of the third lens element, and a central thickness of the fifth lens element is larger than a central thickness of the fourth lens element;
wherein half of a maximum field of view of the optical imaging lens system is HFOV, and the following condition is satisfied:

tan(HFOV)≤0.28.

13. The optical imaging lens system of claim 12, further comprising an aperture stop, wherein the image-side surface of the fourth lens element is concave in a paraxial region thereof, an axial distance between the aperture stop and the image-side surface of the fifth lens element is SD, an axial distance between the object-side surface of the first lens element and the image-side surface of the fifth lens element is TD, and the following condition is satisfied:

0.70<$SD/TD$<1.0.

14. The optical imaging lens system of claim 12, wherein the second lens element has negative refractive power, the fourth lens element has negative refractive power, and the fifth lens element has negative refractive power.

15. The optical imaging lens system of claim 12, wherein a curvature radius of the object-side surface of the fifth lens element is R9, a curvature radius of the image-side surface of the fifth lens element is R10, and the following condition is satisfied:

0.20<|$(R9+R10)/(R9-R10)$|<5.0.

16. The optical imaging lens system of claim 12, wherein a maximum image height of the optical imaging lens system is ImgH, a focal length of the optical imaging lens system is f, an axial distance between the object-side surface of the first lens element and an image surface is TL, and the following conditions are satisfied:

0.10<$ImgH/f$<0.50; and 0.70<$TL/f$<1.10.

17. The optical imaging lens system of claim 12, wherein a sum of axial distances between every two of the five lens elements of the optical imaging lens system that are adjacent to each other is ΣAT, a central thickness of the third lens element is CT3, a maximum effective radius of the object-side surface of the first lens element is Y11, a maximum effective radius of the image-side surface of the fifth lens element is Y52, and the following conditions are satisfied:

0.10<$\Sigma AT/CT3$<7.50; and 0.70<$Y52/Y11$<1.10.

18. The optical imaging lens system of claim 12, wherein an axial distance between the fourth lens element and the fifth lens element is larger than an axial distance between the first lens element and the second lens element.

19. The optical imaging lens system of claim 12, wherein the absolute value of the focal length of the fourth lens element is larger than an absolute value of a focal length of the second lens element.

20. An optical imaging lens system comprising five lens elements, the five lens elements being, in order from an object side to an image side, a first lens element, a second lens element, a third lens element, a fourth lens element and a fifth lens element;
wherein each of the five lens elements has an object-side surface facing toward the object side and an image-side surface facing toward the image side, the first lens element has positive refractive power, the second lens element has negative refractive power, the third lens element has positive refractive power, the object-side surface of the third lens element is convex in a paraxial region thereof, the image-side surface of the fourth lens element is concave in a paraxial region thereof, the object-side surface of the fifth lens element is concave in a paraxial region thereof, and the image-side surface of the fifth lens element is convex in a paraxial region thereof;
wherein the optical imaging lens system further comprises an aperture stop disposed at an object side of the third lens element, an axial distance between the fourth lens element and the fifth lens element is larger than a central thickness of the fourth lens element;
wherein half of a maximum field of view of the optical imaging lens system is HFOV, a sum of axial distances between every two of the five lens elements of the optical imaging lens system that are adjacent to each other is ΣAT, an axial distance between the second lens element and the third lens element is T23, an axial distance between the image-side surface of the fifth lens element and an image surface is BL, and the following conditions are satisfied:

$\tan(HFOV) < 0.30$; and $0.30 \leq \Sigma AT/(T23+BL) < 0.75$.

21. The optical imaging lens system of claim 20, wherein the fourth lens element has negative refractive power, and the fifth lens element has negative refractive power.

22. The optical imaging lens system of claim 20, wherein an axial distance between the first lens element and the second lens element is T12, an axial distance between the third lens element and the fourth lens element is T34, and the following condition is satisfied:

$0.60 < T34/T12 \leq 3.10$.

23. The optical imaging lens system of claim 20, wherein an absolute value of a focal length of the fourth lens element is larger than an absolute value of a focal length of the first lens element, the sum of axial distances between every two of the five lens elements of the optical imaging lens system that are adjacent to each other is $\Sigma AT$, the axial distance between the image-side surface of the fifth lens element and the image surface is BL, and the following condition is satisfied:

$0.70 < BL/\Sigma AT < 3.20$.

24. The optical imaging lens system of claim 20, wherein a central thickness of the first lens element is larger than the axial distance between the second lens element and the third lens element.

25. The optical imaging lens system of claim 20, wherein an Abbe number of the fifth lens element is larger than an Abbe number of the third lens element.

26. The optical imaging lens system of claim 20, wherein an absolute value of a focal length of the fourth lens element is larger than an absolute value of a focal length of the third lens element.

* * * * *